United States Patent [19]

Takakura et al.

[11] Patent Number: 5,337,406
[45] Date of Patent: Aug. 9, 1994

[54] DOCUMENT PROCESSING APPARATUS FOR SIMULTANEOUSLY DISPLAYING GRAPHIC DATA, IMAGE DATA, AND CHARACTER DATA FOR A FRAME

[75] Inventors: Hiroshi Takakura, Yokohama; Toshihiko Komatsu, Tokyo, both of Japan

[73] Assignee: Canon Kabushiki Kaisha, Tokyo, Japan

[21] Appl. No.: 38,044

[22] Filed: Mar. 24, 1993

Related U.S. Application Data

[63] Continuation of Ser. No. 745,964, Aug. 12, 1991, abandoned, which is a continuation of Ser. No. 269,681, Nov. 10, 1988, abandoned.

[51] Int. Cl.$^5$ ............................................. G06F 15/62
[52] U.S. Cl. .................................... 395/148; 395/147
[58] Field of Search ............... 395/133, 135, 144–149, 395/155, 157, 161; 340/721, 723, 748–750; 382/44

[56] References Cited

U.S. PATENT DOCUMENTS

| | | | |
|---|---|---|---|
| 4,086,660 | 4/1978 | McBride | 364/900 |
| 4,189,727 | 2/1980 | Vaughn, Jr. | 364/900 |
| 4,220,417 | 9/1980 | Sprott et al. | 364/900 |
| 4,823,303 | 4/1989 | Terasawa | 364/521 |
| 4,829,470 | 5/1989 | Wang | 364/521 X |

FOREIGN PATENT DOCUMENTS 0225191  6/1987  European Pat. Off. .

*Primary Examiner*—Heather R. Herndon
*Attorney, Agent, or Firm*—Fitzpatrick, Cella, Harper & Scinto

[57] ABSTRACT

A document processing apparatus includes an microprocessing unit, a main memory, an external memory, a cathode ray tube display, and input units (e.g., a pointing device and a keyboard). In this apparatus, graphic (e.g., an illustration) data, image (e.g., a photographic image) data, and character (e.g., a sentence) data for a frame formed on a sheet are controlled. Frame size data is also stored in the above memories. The microprocessing unit designates the size data or one of the graphic, image, and character data to be obtained.

62 Claims, 88 Drawing Sheets

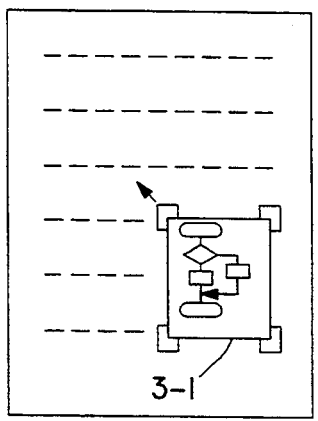

FIG.3A

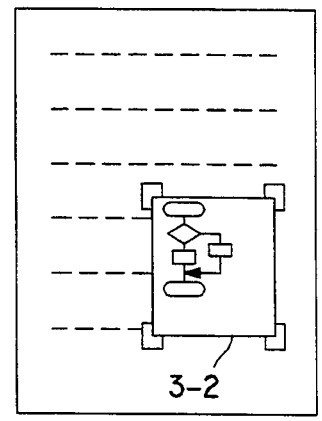

FIG.3B

(b)  Refer to the previous section, and define a real matrix 4-1
$A = \begin{bmatrix} a & b \\ c & d \end{bmatrix}$ in such a way that [x,y] -> [x,y]A is the rotation described. 4-2
4-3

FIG.4A

4-4
We are often asked for some back-
ground on the origin of the word widget.
We have found that many people associate
it with widgeons, an interesting kind of
wild duck (Figure 1). This is an interesting, though inaccurate, explanation. The
president of Widget International,
Paul Reynolds, has offered his own ex- 4-5
planation that should satisfy everyone:
widget is a word that has existed since
the beginning of human language. Before
there were individual names for things,
everything was a widget. People would ask,
for example, "Would you please hand me
that widget, so that I can fix this widget."

FIG.4B

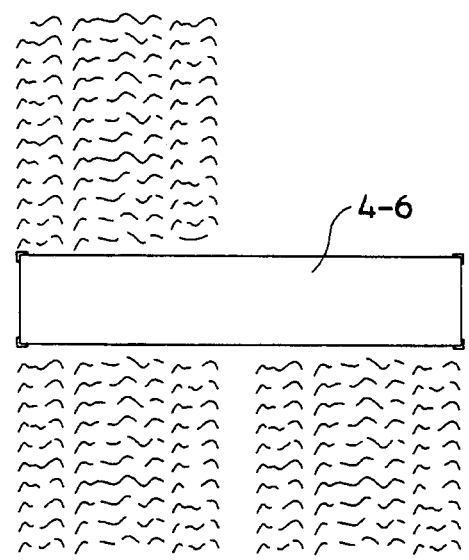

FIG.4C

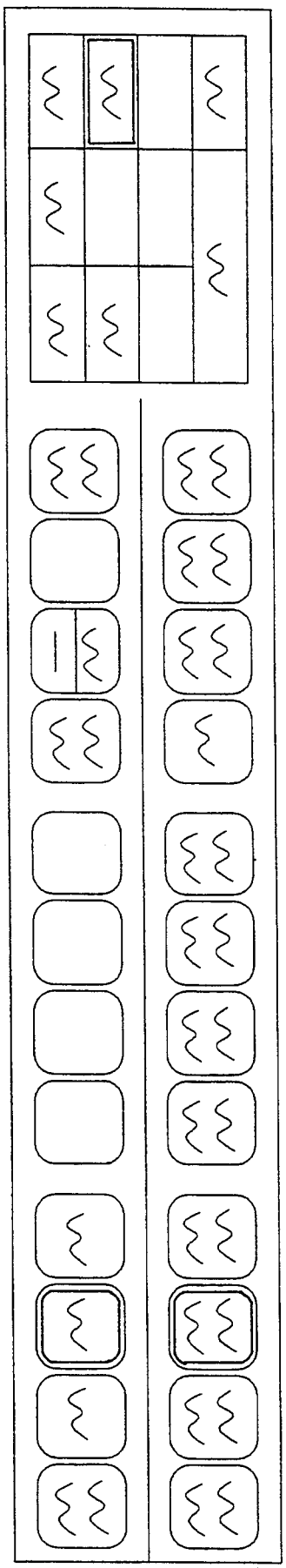
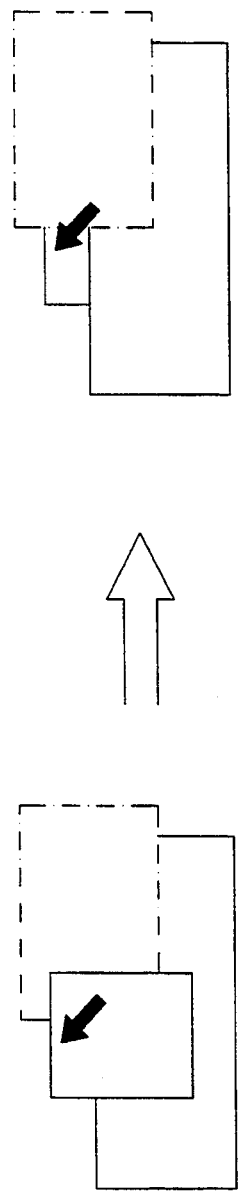
FIG.8D

FIG.10D
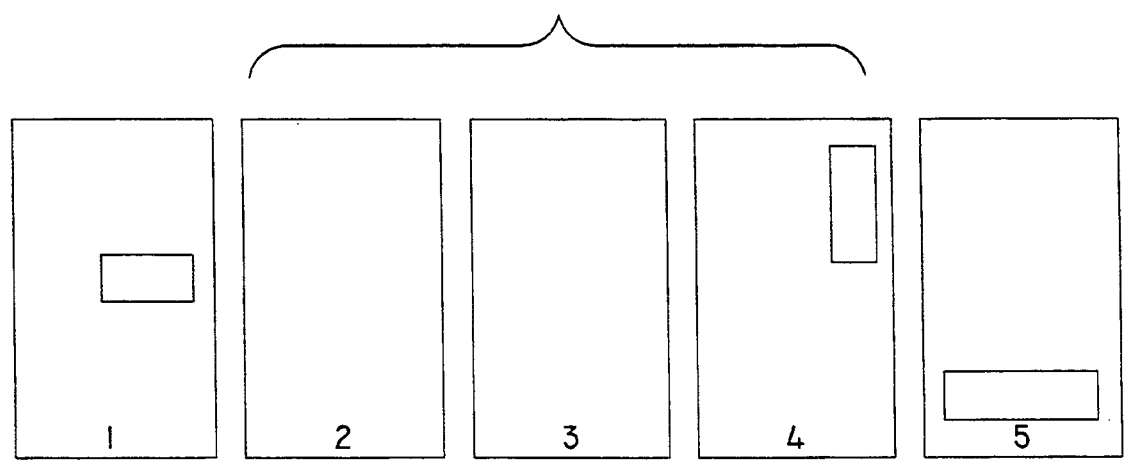
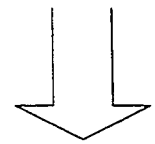
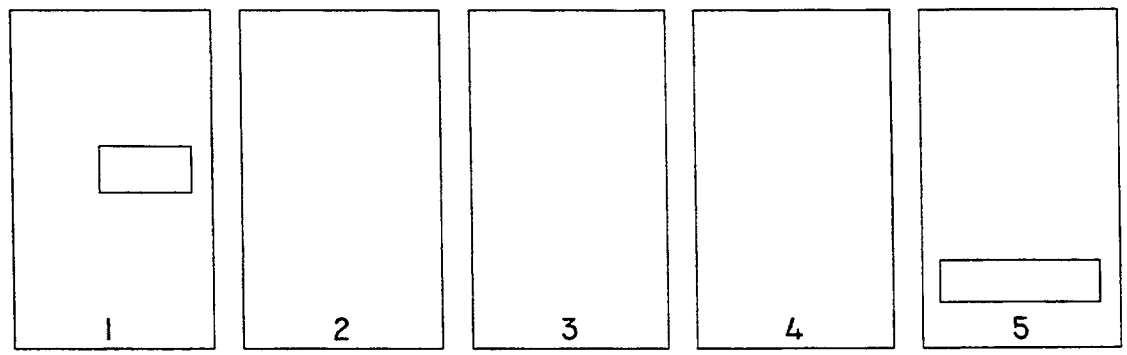

FIG. 22

| | |
|---|---|
| FRAME CONTROL INFORMATION | 22-1 |
| FRAME LINE TYPE | 22-2 |
| FRAME LINE WIDTH | |
| FRAME POSITION (X COORDINATE) | 22-3 |
| FRAME POSITION (Y COORDINATE) | |
| FRAME SIZE (WIDTH) | 22-4 |
| FRAME SIZE (HEIGHT) | |
| INHIBITED AREA (UPPER) | 22-5 |
| INHIBITED AREA (LOWER) | |
| INHIBITED AREA (LEFT) | |
| INHIBITED AREA (RIGHT) | |
| FORMAT ADDRESS | 22-6 |
| SENTENCE DATA ADDRESS | |
| GRAPH DATA ADDRESS | |
| IMAGE DATA ADDRESS | |
| FORMAT SIZE | 22-7 |
| SENTENCE DATA SIZE | |
| GRAPHIC DATA SIZE | |
| IMAGE DATA SIZE | |

FIG. 24

| | |
|---|---|
| FLOATING FRAME DATA LENGTH | 24-1 |
| FLAG | 24-2 |
| FRAME LINE TYPE | 24-3 |
| FRAME LINE WIDTH | |
| FRAME SIZE (WIDTH) | 24-4 |
| FRAME SIZE (HEIGHT) | |
| OFFSET (CHARACTER DIRECTION) | 24-5 |
| OFFSET (LINE DIRECTION) | |
| FRAME SIZE (NUMBER OF CHARACTERS) | 24-6 |
| FRAME SIZE (NUMBER OF LINES) | |
| INHIBITED AREA (UP) | 24-7 |
| INHIBITED AREA (DOWN) | |
| INHIBITED AREA (LEFT) | |
| INHIBITED AREA (RIGHT) | |
| FORMAT SIZE | 24-8 |
| SENTENCE DATA SIZE | |
| GRAPHIC DATA SIZE | |
| IMAGE DATA SIZE | |

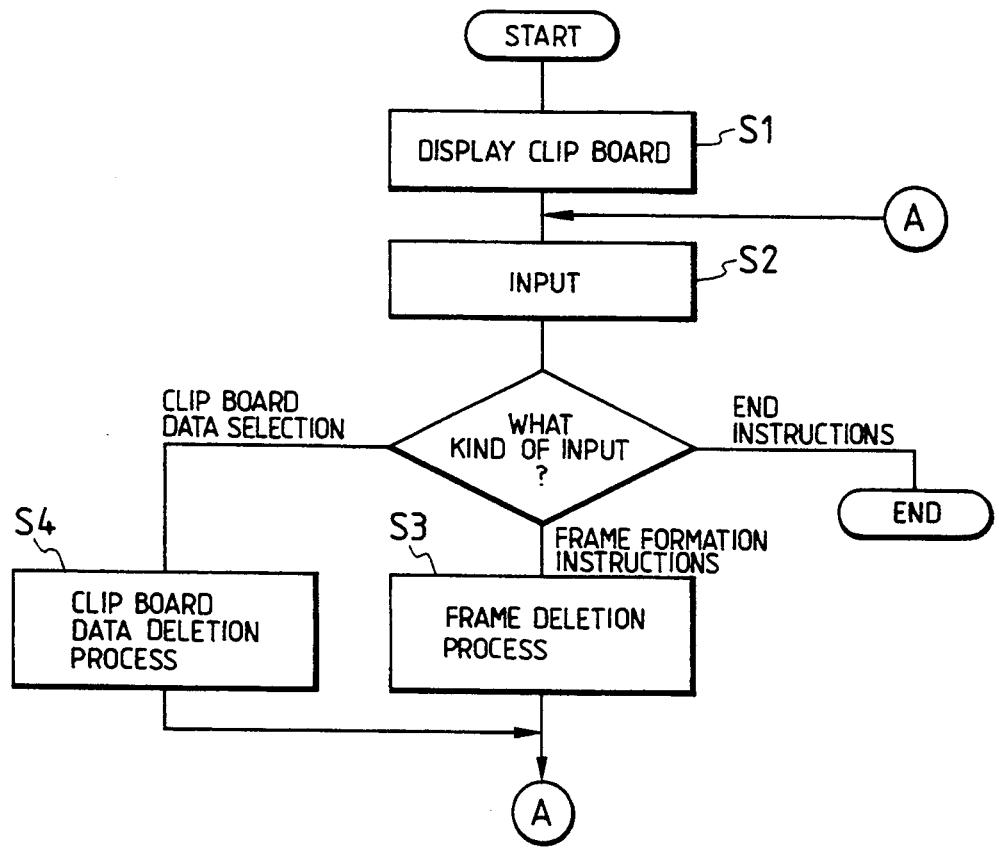

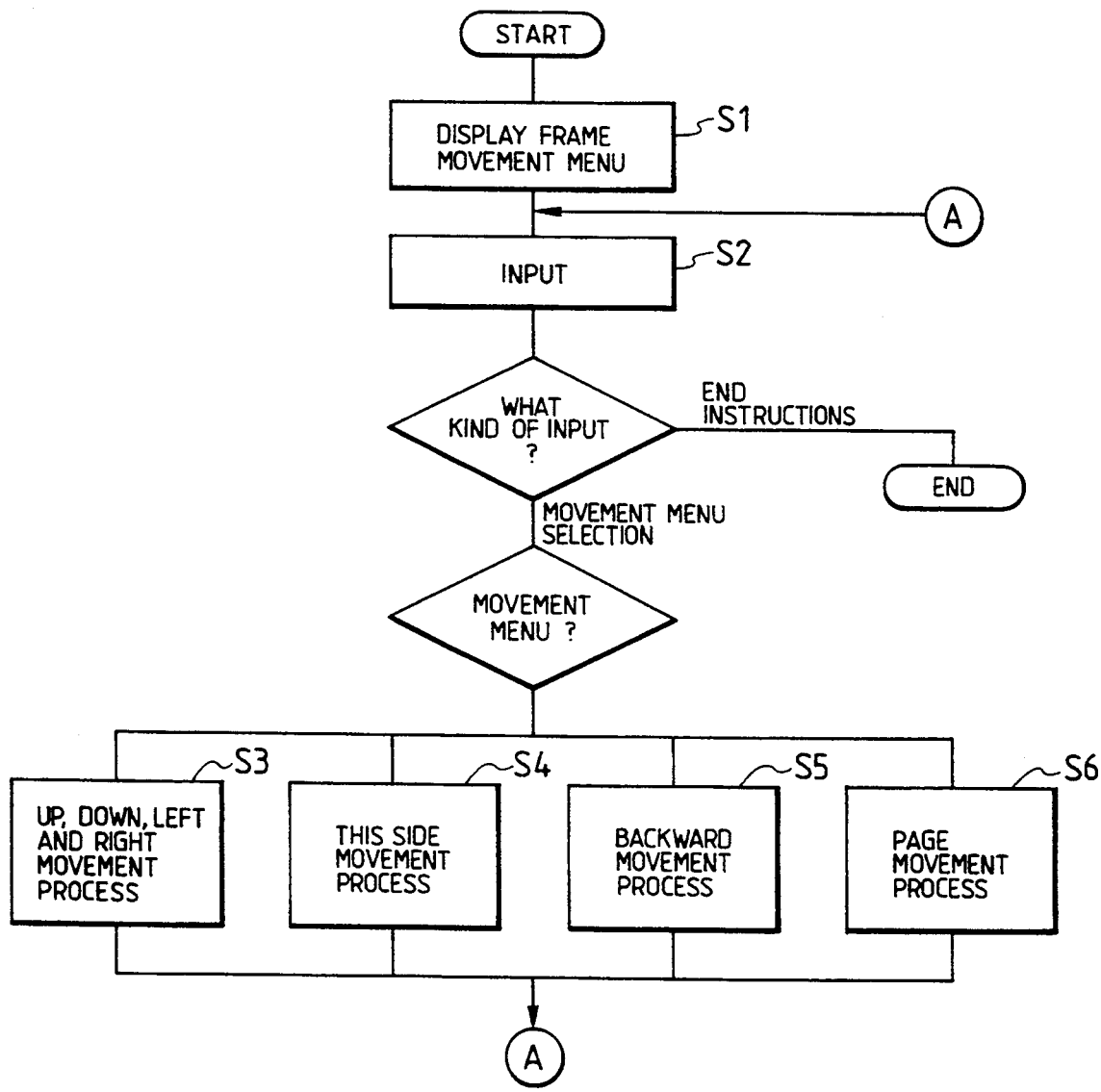

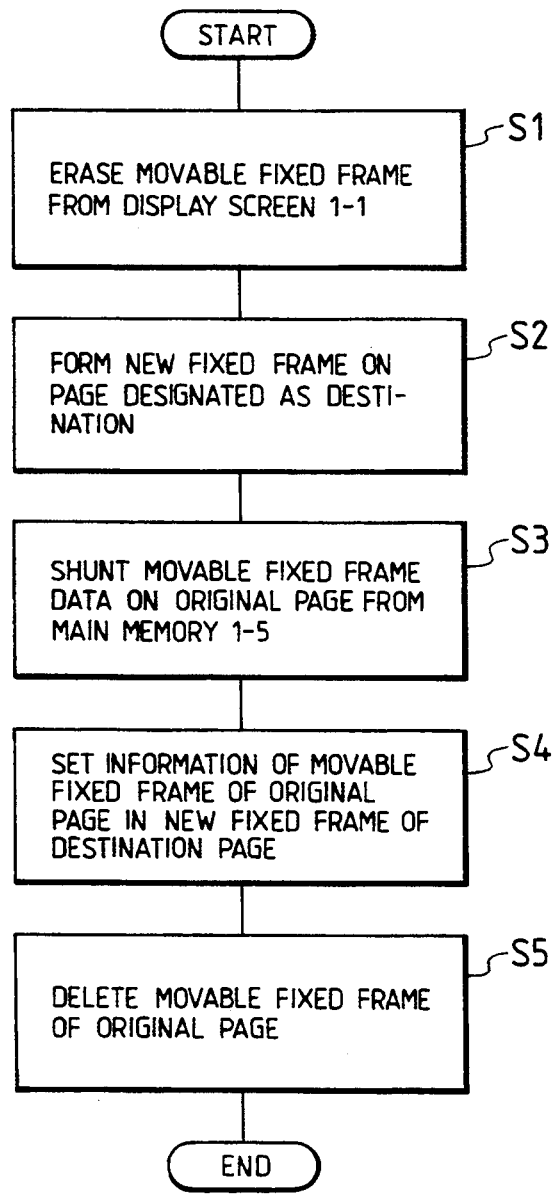

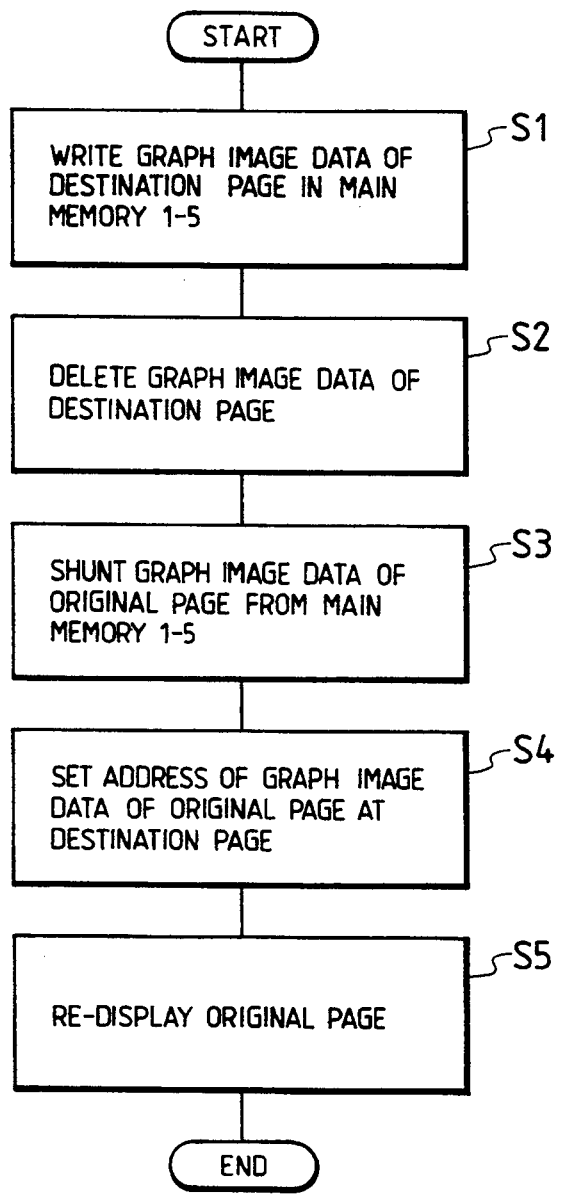

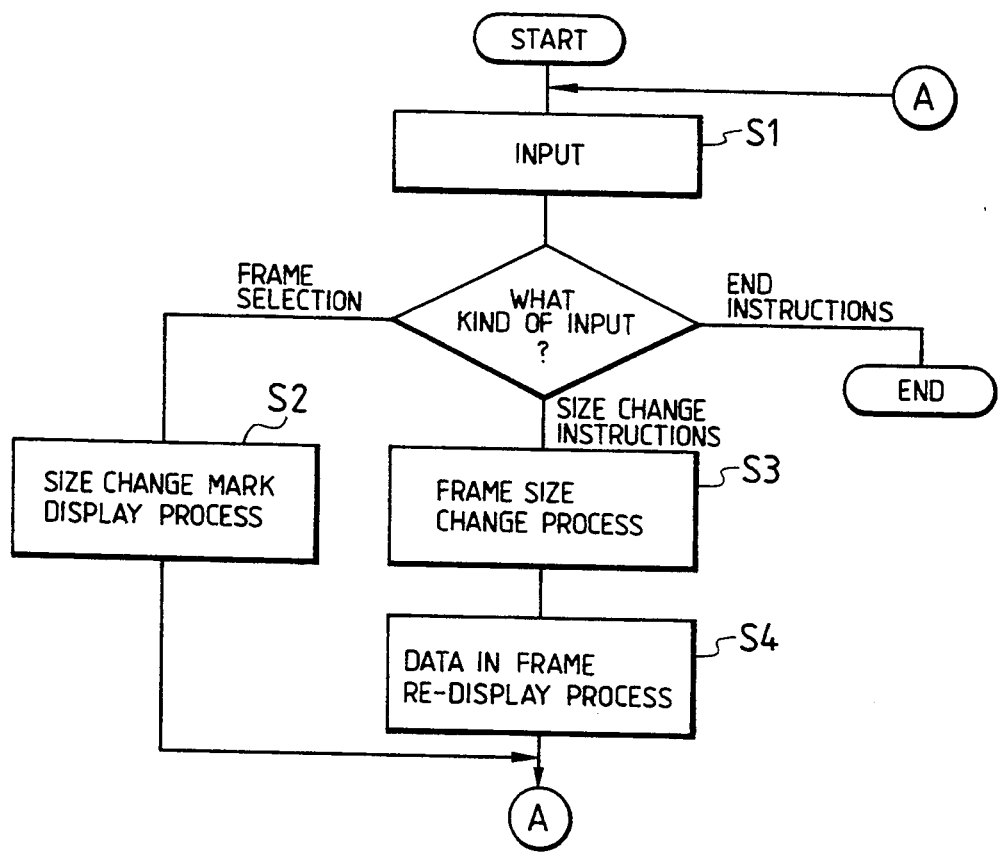

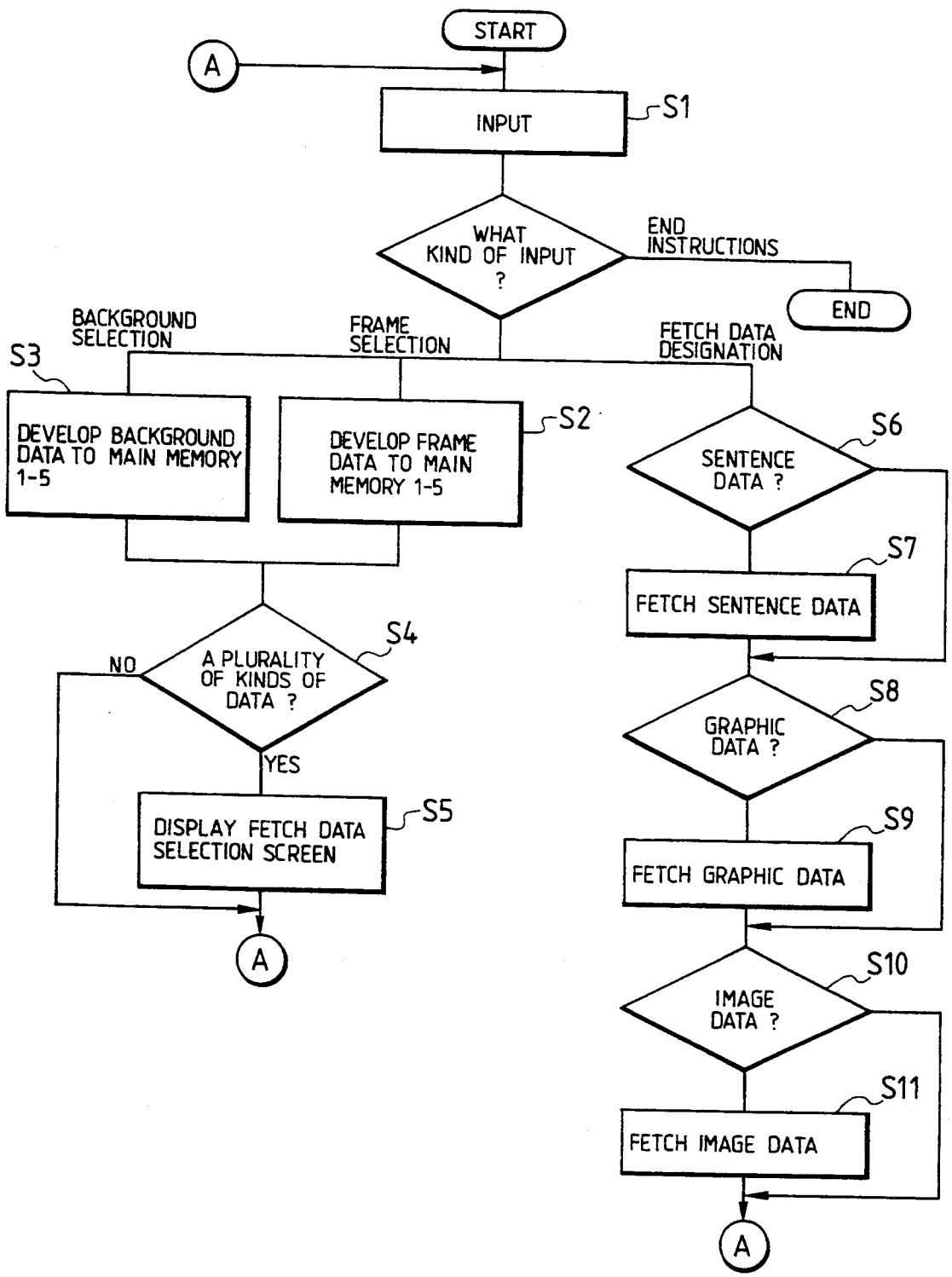

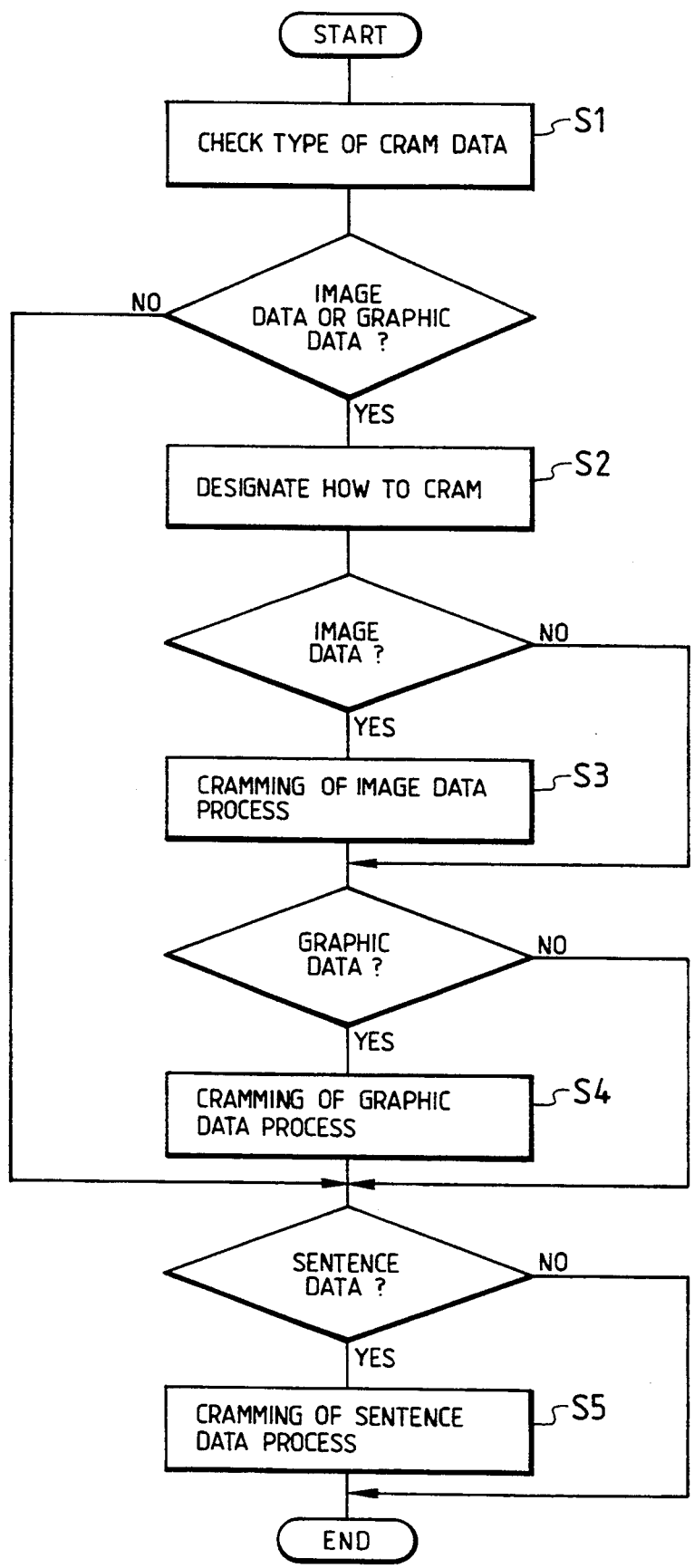

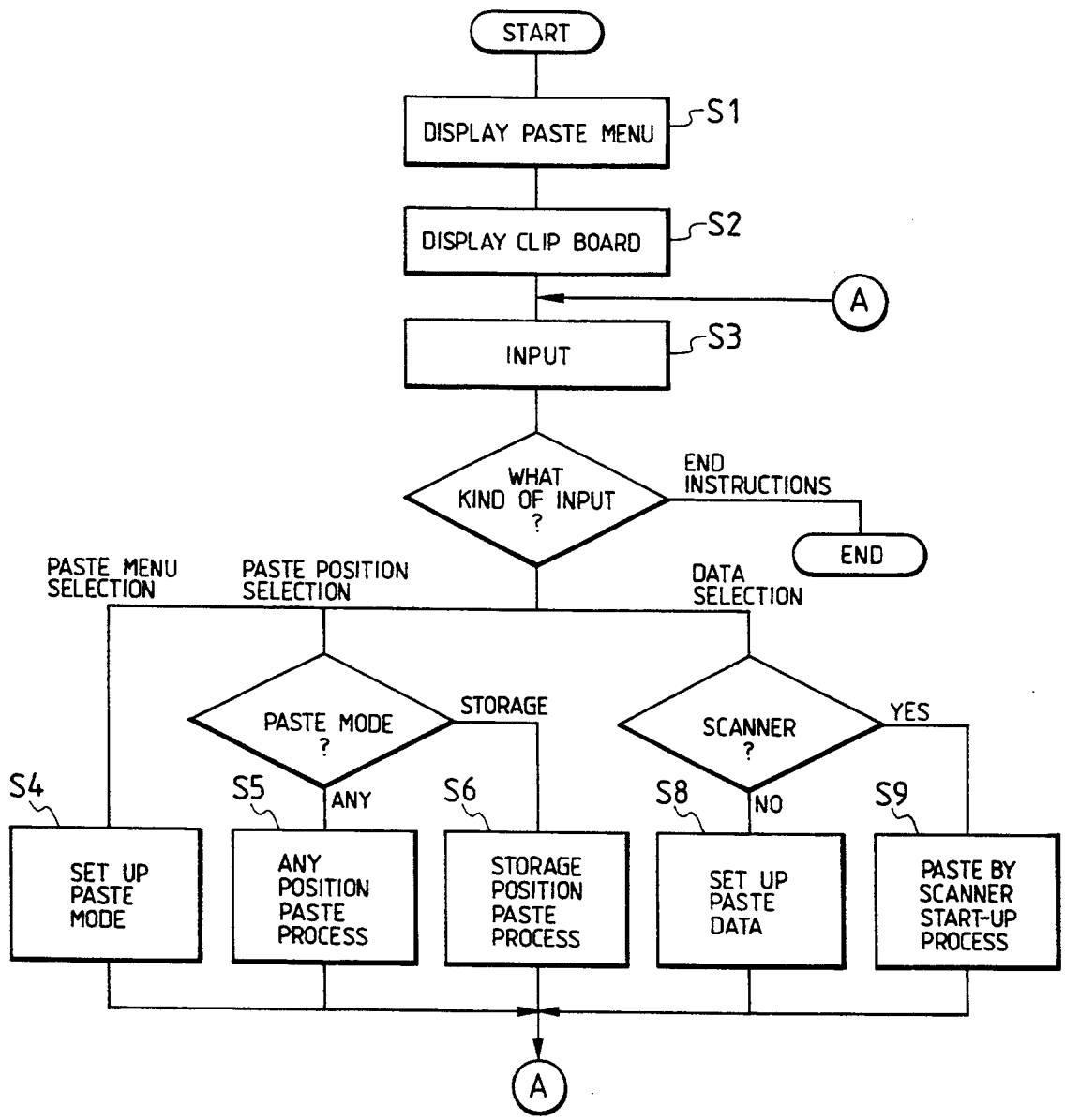

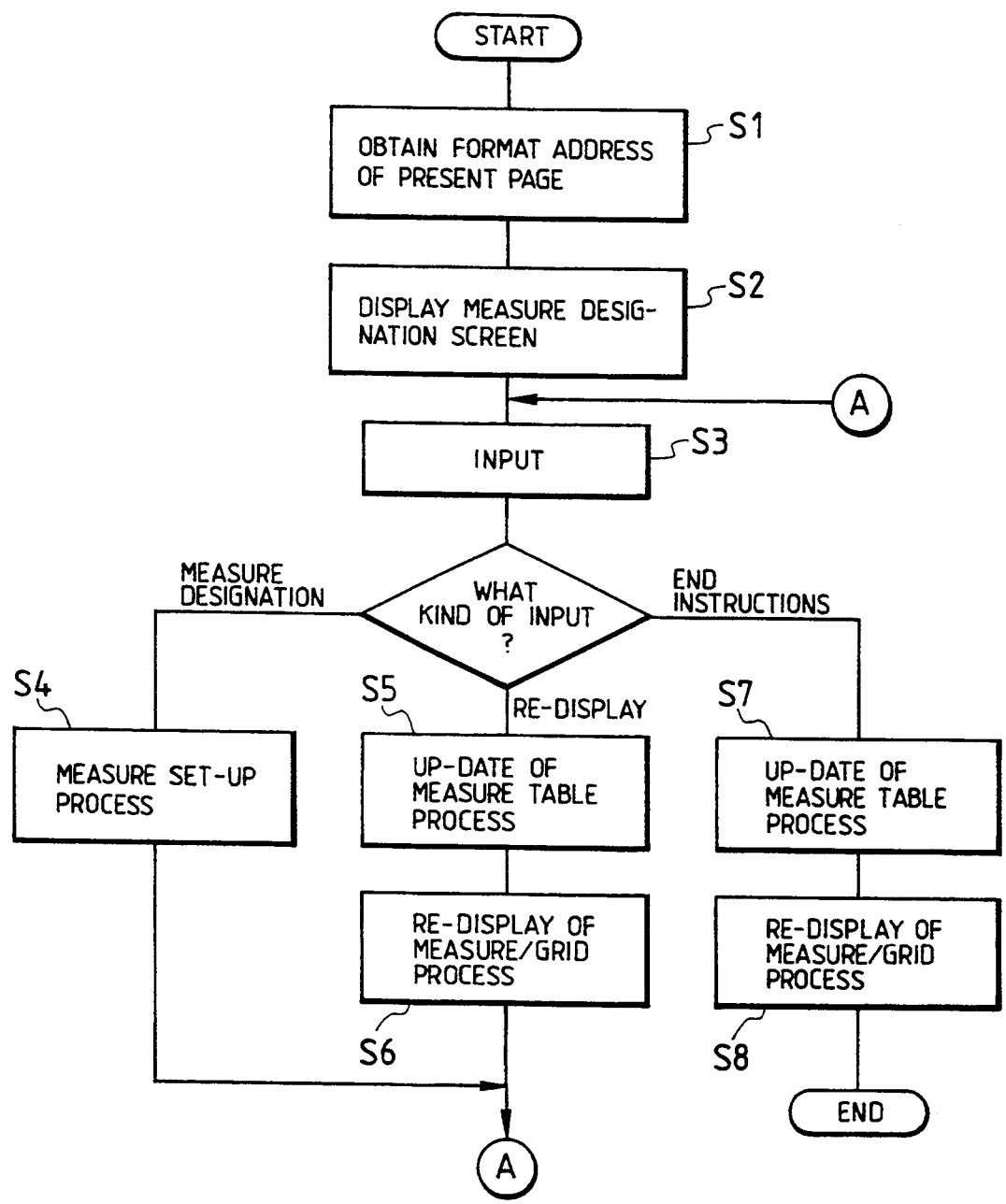

FIG. 35B

| | |
|---|---|
| GRID FITTED MODE | 35-1 |
| ORIGIN POSITION | 35-2 |
| UNIT OF COORDINATES | 35-3 |
| REDUCED SCALE | 35-4 |
| UNIT OF INPUT | 35-5 |
| GRID SPACE | 35-6 |
| OFFSET OF GRID ORIGIN | 35-7 |
| COORDINATES OF GRID ORIGIN | 35-8 |

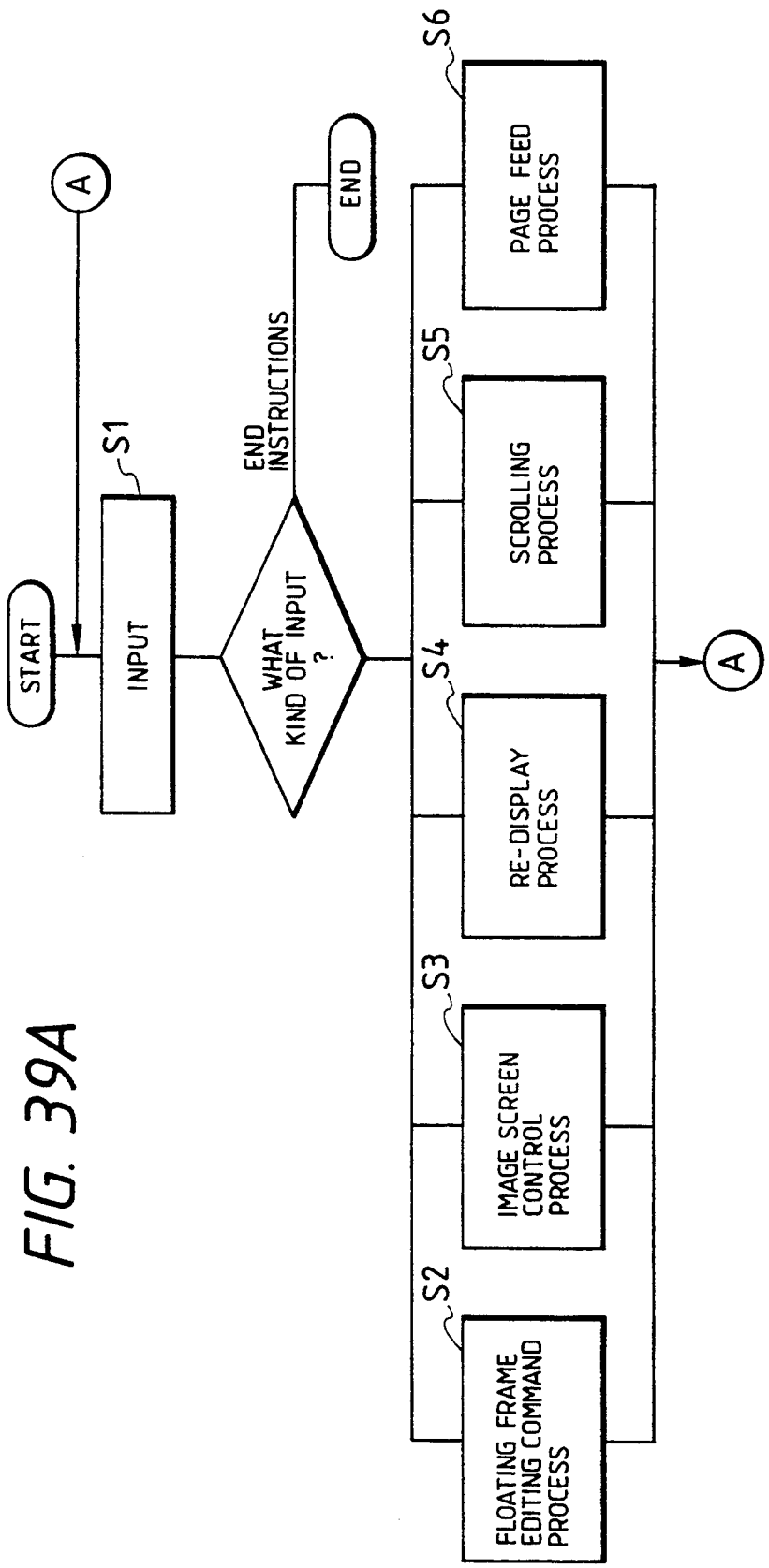

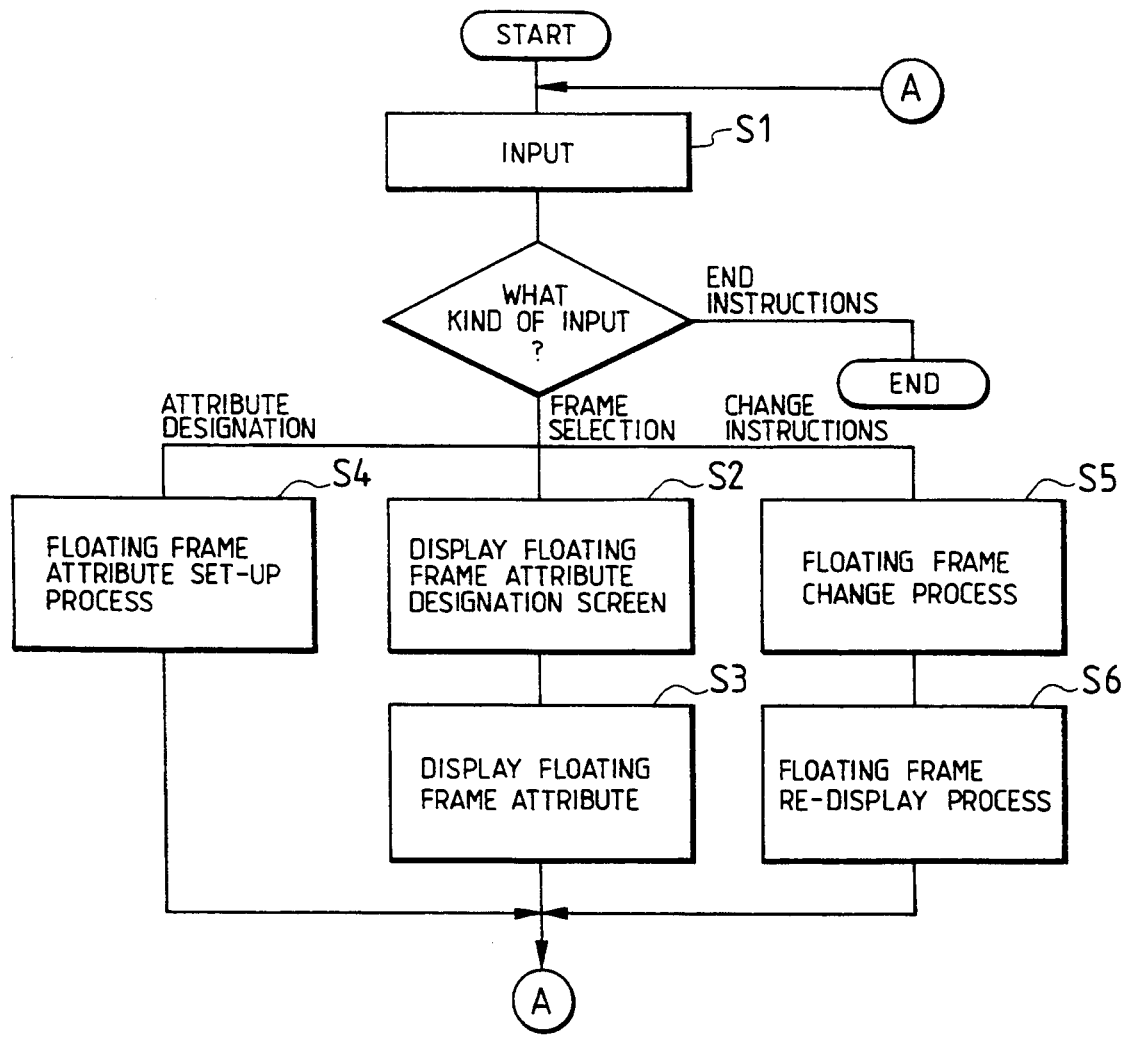

DOCUMENT PROCESSING APPARATUS FOR SIMULTANEOUSLY DISPLAYING GRAPHIC DATA, IMAGE DATA, AND CHARACTER DATA FOR A FRAME

This application is a continuation of application Ser. No. 07/745,964 filed Aug. 12, 1991, now abandoned, which is a continuation of application Ser. No. 07/269,681 filed Nov. 10, 1988, now abandoned.

BACKGROUND OF THE INVENTION

1. Field of the Invention

The present invention relates to a document processing apparatus for processing document data such as character (sentence) data, graphic (figure) data, and photographic image data (to be referred to as image data hereinafter).

2. Related Background Art

In a conventional wordprocessor, ruled line segments are connected to form a table frame when the table frame constituted by vertical and horizontal lines is formed in a document. When graphic data such as a map and an illustration and image data such as a photograph are pasted in a document, a rectangular frame (block) closed by block marks representing frame elements is drawn. An attribute such as a frame of an image and a graph and identifiers such as names for establishing correspondence with image and graphic data separately prepared are set in the block. At the time of printing, image and graphic data corresponding to the frame are pasted during printing.

According to the above technique, frame element positions may deviate from desired positions due to insertion or deletion of characters, due to data the destruction of, or no display may be performed. In addition, because each block is constituted by a combination of characters as block elements, it is impossible to overlap blocks or to move block independently of the movement of sentences in the case of the addition or insertion of a sentence. It is also very difficult to perform centering or rightward shifting of a block and assign other functions to the block with respect to paper or a sheet.

Along with the recent developments in microprocessors and peripheral devices such as cathode ray tubes (CRTs) and printers, highly advanced document processing based on work stations has been practiced. This processing is called WSIWYG (What You See Is What You Get). Input and editing operations can be performed in a real time manner while the printing result of a document is kept displayed on a screen.

A block has independent information as block information in a document and can be independently processed. FIG. 2 shows block information of document processing in a conventional work station. Block information includes a block priority 2-1 which represents a priority order of blocks if blocks overlap each other, a flag 202 representing whether a block is a block floating on the basis of a sentence in a document (to be referred to as a floating block hereinafter) or a block permanently pasted at a given position of a given page independently of sentences (to be referred to as a fixed block hereinafter), a page number/floating block number which represents a page number of a page to which the fixed block is pasted or a floating block number in the case of the floating block, X and Y coordinates 2-4 in an upper left block, i.e., a paste position of the block when the upper left end of the fixed block on paper is defined as an origin, block width and height 2-5 defining the size of the block, and a block data address 2-6 as a pointer representing an actual data position within the block.

A conventional block has only one block data attribute selected from a table, a graph, a sentence, and an image. A plurality of attributes cannot be assigned to each block. Therefore, it is impossible to add explanatory sentences to, e.g, a graph or image. As a matter of fact, it is impossible to delete data within the block or move data from one block to another block when sentences, graphs, and images overlap each other.

In the conventional station, either fixed blocks or floating blocks are used. No data transfer between the fixed and floating blocks can be performed. Therefore, no distinction between the fixed and floating blocks on the display screen is provided.

Block data is generated using a block start point such as an upper left end as an origin once a block is formed. When a block size is changed in favor of document layout or input/editing convenience, the block size can be changed in four directions, i.e., upper, lower, right, and left directions. However, a space cannot be formed in, e.g., an extended portion, or space is not eliminated. Even if a block 3-1 in FIG. 3A is expanded to the upper left direction to form a space in the upper left position, internal graphic data in the block is moved in the upper left direction, as indicated by a block 3-2 in FIG. 3B, resulting in inconvenience.

A block having almost the same size as paper is often required in a document. In a conventional system, however, it is difficult to form such a block since start and end points are designated by a pointing device such as a mouse. In addition, it is almost impossible to increase the block size accurately equal to the paper size.

A U.S. Application titled "Document Processing Apparatus", commonly assigned to the present assignee discloses a technique wherein a sheet was constituted by a plurality of layers to be displayed or printed, e.g., a sentence layer, a graphic layer, an image layer, and a form layer. In this case, when a layer pasted to a given specific page is subjected to an input/editing operation such as insertion or deletion of data and is required to be moved to another page, the conventional station is incapable of performing such processing.

It is also impossible for the conventional work station to move only a given block while data of layer of the given block pasted on a sheet of the plurality of layers or to move only layer data while the block is fixed.

The following floating blocks are available in the conventional work stations.

(1) As shown in FIG. 4A, a floating block mark 4-1 and a floating block 4-2 are included in a sentence 4-3, and the floating block 4-2 is dealt like a character. In this case, phrases are adjacent to the floating block 4-2. If a block size is large enough to interfere with the upper and lower lines, line feeding is performed by a required number of lines, so that the block does not interfere with the upper and lower lines. Deletion or movement of the floating block 4-2 is performed by that of the block mark 4-1.

(2) As shown in FIG. 4B, a floating block mark 4-4 is inserted at a position by floating block designation. An actual floating block 4-5 is inserted as an independent block outside this line in a full measure or one-column layout. Deletion or movement of the floating block is performed by that of a floating mark 4-4 in the same manner as in case (1).

According to the conventional techniques as described above, the floating block is dealt as a character or the independent block in a full measure.

When the floating block in case (2) is arranged in layout of a half or smaller measure, the sentences before a floating block 4-6 are displayed in a full measure, thus resulting in poor appearance, as shown in FIG. 4C.

A fixed block (frame) is moved such that the fixed frame is designated by a pointing device such as a mouse. In this case, a moving distance is visually determined by an operator. If a plurality of fixed blocks are present on one page, it is cumbersome and very difficult to move the blocks while the relative positional relationship between the blocks is maintained.

When a plurality of fixed blocks are intentionally overlapped with each other, the overlapping order is the order of generation of the blocks. However, once the fixed blocks overlap each other, any way of changing the overlapping order is not available. If the overlapping order is wrong, the fixed blocks must be formed from the beginning.

When a fixed block is moved or copied from one page to another page, the fixed block is cut and pasted as needed. However, it is very difficult to paste the fixed block at identical positions of the respective pages because position determination is guess work.

When a fixed block across the adjacent pages is cut according to a conventional technique, cutting and pasting are performed, or page movement is performed. In the former manipulation, a page in which a block to be cut must be designated, cutting of the block must be designated, a page in which the cut block is to be pasted must be designated, and paste of the block must be designated, thereby complicating the operational procedures. In the latter case, data after a given page is copied or moved only to another and subsequent pages. It is therefore very difficult to rearrange a plurality of fixed blocks on arbitrary pages. If possible, time-consuming and cumbersome operations are required.

No conventional technique is available to constitute a sheet by a plurality of layers such as a sentence layer, a graphic layer, an image layer, and a form layer to be simultaneously displayed or printed. Even a frame is not constituted by a plurality of layers, thus posing the following problems. That is, it is impossible to fetch only a frame size, a document, a graph, or an image, or a combination thereof.

When the frame size is changed upon formation of a frame, the internal data is moved upon a change in frame size, as indicated by the frame 3-2 in FIG. 3B. It is impossible to add graphic data in a blank portion formed by increasing the frame in, e.g., the upper left direction.

When the internal data is sentence data and the frame is expanded in the upper left position, it is desirable to move the sentence data upon expansion of the frame (on the basis of the format).

As described above, the document format and, in particular, the "printing plate" position, character feed, and line feed must be intentionally determined according to the conventional techniques when framing, frame movement, and the like are taken into consideration. In addition, if graphic data is included in a frame, the relative position between the graphic and character data, and alignment thereof must be taken into consideration. Therefore, it is very difficult to visually guess positioning in framing and frame movement. Operations for framing and frame movement are very difficult due to the same reasons as described above when the graphic data position is determined with a frame on white paper (i.e., no input data) or when a frame is determined for an original having a predetermined size.

When a frame and data inside the frame are fetched and are pasted to another document or the like, positional information is not preserved. Once the layout is determined and if an illustration, a drawing, and logo data such as a company name which require predetermined positioning are present, the layout must be determined again at the time of the pasting. In addition, since the layout is visually determined by an operator, identical positioning operations are not assured. When data in the frame is displayed together with a movement position, display of such data is delayed.

When a floating frame is to be changed into a fixed frame, data in the floating frame must be fetched and pasted into a fixed frame. However, positional information of the floating frame cannot be preserved, and it is difficult to paste the data at identical positions in the fixed frame.

As described above, in order to move a frame to another page according the conventional techniques, the frame is cut out, a desired destination page is designated, and the cut frame is pasted on the desired page. Alternatively, simultaneous processing can be performed such that frames from a given page are sequentially shifted to the desired and subsequent pages. A plurality of frames which are formed on a given page and each of which has three layers, e.g., a character layer, a graphic layer, and an image layer cannot be simultaneously moved to another page, resulting in inconvenience. In addition, background data such as an image (except for characters), a graph, and the like cannot be moved to another page.

When the above frame described above is formed, a margin may be assured within the frame in which sentences are written. However, the frame and sentence data outside the frame are close too much, or a distance between the frame and character data outside the frame is permanently set. When a space is to be formed between the sentence data and the frame, a cumbersome operation for changing the frame size and moving the internal data is required. When lines such as a solid line and a broken line are present in the frame, the frame size cannot be changed. Therefore, the distance between the frame and data outside the frame cannot often be changed in practice.

As described above, no conventional technique is proposed to constitute a sheet by a plurality of layers such as a sentence layer, a graphic layer, an image layer, and a form layer to be simultaneously displayed or printed. For this reason, an inhibited area cannot be arranged outside the frame to save sentences in the inhibited area. It is impossible to write a supplementary drawing consisting of a graph or to draw a leader line in the inhibited area.

As described above, no conventional technique is proposed to constitute a sheet by a plurality of layers such as a sentence layer, a graphic layer, an image layer, and a form layer to be simultaneously displayed or printed. In addition, no conventional frame is assigned with a plurality of layers.

For this reason, it is impossible to paste or cram all or some of the plurality of layers in the preset frame. In addition, cram processing cannot be performed according to layers.

In a conventional technique, when the frame and data therein are fetched and pasted in another document, their positional information is not preserved. Once the layout is determined and if an illustration, a drawing, and logo data such as a company name which require predetermined positioning are present, the layout must be determined again at the time of pasting. In addition, since the layout is visually determined by an operator, identical positioning is not assured. When data in the frame is displayed together with a movement position, display of such data is delayed.

When a floating frame is to be changed into a fixed frame, data in the floating frame must be fetched and pasted into a fixed frame. However, positional information of the floating frame cannot be preserved, and it is difficult to paste the data at identical positions in the fixed frame.

When image data is crammed according to a conventional technique, the read data is cut out and registered. The registered data is crammed in a frame to be crammed. Therefore, there is no concept of simultaneously processing a document, a graph, and an image such that a frame is formed during formation of a document, an image is input, and then a document is formed by checking matching between the image and the document without interrupting the operations.

As described above, in order to move a frame to another page according conventional techniques, the frame is cut out, a desired destination page is designated, and the cut frame is pasted on the desired page. Alternatively, simultaneous processing can be performed such that frames from a given page are sequentially shifted to the desired and subsequent pages. A plurality of frames which are formed on a given page and each of which has three layers, e.g., a character layer, a graphic layer, and an image layer cannot be simultaneously moved to another page, resulting in inconvenience. In addition, background data such as an image (except for characters), a graph, and the like cannot be moved to another page.

SUMMARY OF THE INVENTION

It is an object of the present invention to provide a document processing apparatus in consideration of the above situation, wherein a sheet can be constituted by a plurality of layers to be simultaneously displayed or printed, and similarly, a frame can also be constituted by a plurality of layers, thereby selectively fetching desired layer data for the frame.

It is another object of the present invention to provide a document processing apparatus in consideration of the above situation, wherein whether internal data is moved or not can be controlled upon a change in frame size in accordance with the types of internal data when the formed frame is changed.

It is still another object of the present invention to provide a document processing apparatus in consideration of the above situation wherein size information such as a grid point can be displayed to match the frame layout with the size information when a frame is arranged in an original having a predetermined size.

It is still another object of the present invention to provide a document processing apparatus capable of matching frame layout with format information.

It is still another object of the present invention to provide a document processing apparatus in consideration of the above situation wherein positional information can be stored regardless of the types of frame.

It is still another object of the present invention to provide a document processing apparatus capable of confirming a layout state on paper pasted on the basis of the positional information of the frame beforehand when a frame is cut and pasted to the sheet.

It is still another object of the present invention to provide a document processing apparatus capable of converting a floating frame into a fixed frame on the basis of the positional information of the frame.

It is still another object of the present invention to provide a document processing apparatus capable of visualizing data in a frame after the frame display (paste) position is confirmed.

It is still another object of the present invention to provide a document processing apparatus in consideration of the above situation wherein a destination of a frame can be designated while a page on which the frame is present is kept displayed.

It is still another object of the present invention to provide a document processing apparatus in consideration of the above situation wherein a plurality of frames present on a given page can be simultaneously moved.

It is still another object of the present invention to provide a document processing apparatus wherein a plurality of frames present on one page can be simultaneously moved.

It is still another object of the present invention to provide a document processing apparatus capable of easily fetching graphic and image data except for the frame data and character data of a frame included in a one-page document.

It is still another object of the present invention to provide a document processing apparatus wherein a sentence inhibited area is arranged on a sheet having a plurality of layers outside a frame for a sentence, a graph, and an image which can be simultaneously displayed or printed, and a graphic input or the like can be performed in the inhibited area.

It is still another object of the present invention to provide a document processing apparatus capable of performing cram control such as variable magnification and format-dependency control in accordance with the types of data such as a sentence, a graph, and an image at the time of cram processing.

It is still another object of the present invention to provide a document processing apparatus wherein graphic data can be crammed in a frame in accordance with a frame size, and characters are rearranged in the destination frame in accordance with character format.

It is still another object of the present invention to provide, in consideration of the above situation, a document processing apparatus capable of designating a movement destination frame while a page on which the frame is present is kept displayed.

It is still another object of the present invention to provide a document processing apparatus capable of simultaneously moving a plurality of frames present on a given page.

It is still another object of the present invention to provide a document processing apparatus capable of simultaneously moving a plurality of frames present on one page.

It is still another object of the present invention to provide a document processing apparatus capable of easily fetching graphic and image data except for frame data and character data of a frame present in a one-page document.

It is still another object of the present invention to provide a document processing apparatus in consideration of the above situation wherein data can be selectively crammed or pasted on a sheet in units of a plurality of layers such as a sentence layer, a graphic layer, and an image layer assigned to the frame.

It is still another object of the present invention to provide a document processing apparatus in consideration wherein positional information can be stored regardless of the types of frame.

It is still another object of the present invention to provide a document processing apparatus wherein the layout state of a sheet pasted on the basis of the positional information of the frame beforehand can be confirmed before the frame is cut and pasted to the sheet.

It is still another object of the present invention to provide a document processing apparatus capable of converting a floating frame into a fixed frame on the basis of the positional information of the frame.

It is still another object of the present invention to provide a document processing apparatus wherein the intraframe data can be visualized after a frame display (paste) position is confirmed.

It is still another object of the present invention to provide a document processing apparatus in consideration of the above situation wherein data read from a scanner can be directly crammed into a frame.

It is still another object of the present invention to provide a document processing apparatus wherein image data can be read even during document formation and a cut image frame can be associated with a frame in the document.

It is still another object of the present invention to provide a document processing apparatus wherein document formation and image reading can be easily continuously performed, and an image cut by a frame corresponding to a frame having a layer structure of the character, the graph, and the image in the document can be input to layers of the image data of the frame in the document.

It is still another object of the present invention to provide a document processing apparatus in consideration of the above situation wherein a destination frame can be designated while a page on which a frame to be moved is kept displayed.

It is still another object of the present invention to provide, in consideration of the above situation, a document processing apparatus capable of simultaneously moving a plurality of frames present in a given page.

It is still another object of the present invention to provide a document processing apparatus capable of simultaneously moving a plurality of frames present on one page.

It is still another object of the present invention to provide a document processing apparatus capable of easily fetching graphic and image data except for frame data and character data included in a frame present in a one-page document.

BRIEF DESCRIPTION OF THE DRAWINGS

FIGS. 3A and 3B are views for explaining a display of a frame size change in document processing in the conventional work station;

FIGS. 4A to 4C are views for explaining a display of a floating block in document processing in the conventional work station;

FIGS. 8A to 8G are views for explaining a display screen when the fixed frame is moved;

FIGS. 10A to 10E are views for explaining a display screen when a command menu in "editing in units of a page" or page editing 6-5 is selected;

FIG. 22 is a view showing a fixed frame control table;

FIG. 24 is a view for explaining a structure of a floating frame command parameter;

FIG. 28 is a flow chart for explaining fixed frame deletion processing;

FIGS. 29A to 29I are flow charts for explaining fixed frame movement processing;

FIG. 30 is a flow chart for explaining fixed frame size processing;

FIGS. 32A and 32C are flow charts for explaining fixed frame fetch processing;

FIGS. 33A and 33B are flow charts for explaining fixed frame cram processing;

FIG. 34A is a flow chart for explaining fixed frame paste processing;

FIGS. 35A and 35B are flow charts for explaining measure processing;

FIGS. 39A and 39B are flow charts for explaining the overall operations of floating frame editing processing;

FIG. 42 is a flow chart for explaining floating frame change processing;

DETAILED DESCRIPTION OF THE PREFERRED EMBODIMENTS

The present invention will be described in detail with reference to the accompanying drawings. A document in the present invention is defined as a data group constituted by at least one of sentences (characters), graphs, or images. The present invention provides an apparatus for electronically performing operations for drawing a sentence, a graph, an image with a pen or the like on a sheet on a desk by men. Therefore, terms "sheet", "cut", "fetching", "pasting", "framing", "cram", etc. are associated with electronic display control on, e.g, a cathode ray tube (CRT). The document processing apparatus according to the present invention may be a single unit, a system consisting of a plurality of units, equipment achieved through, e.g., a Local Area Network (LAN), or equipment including all of the above systems if they achieve the object of the present invention.

Figure 1:
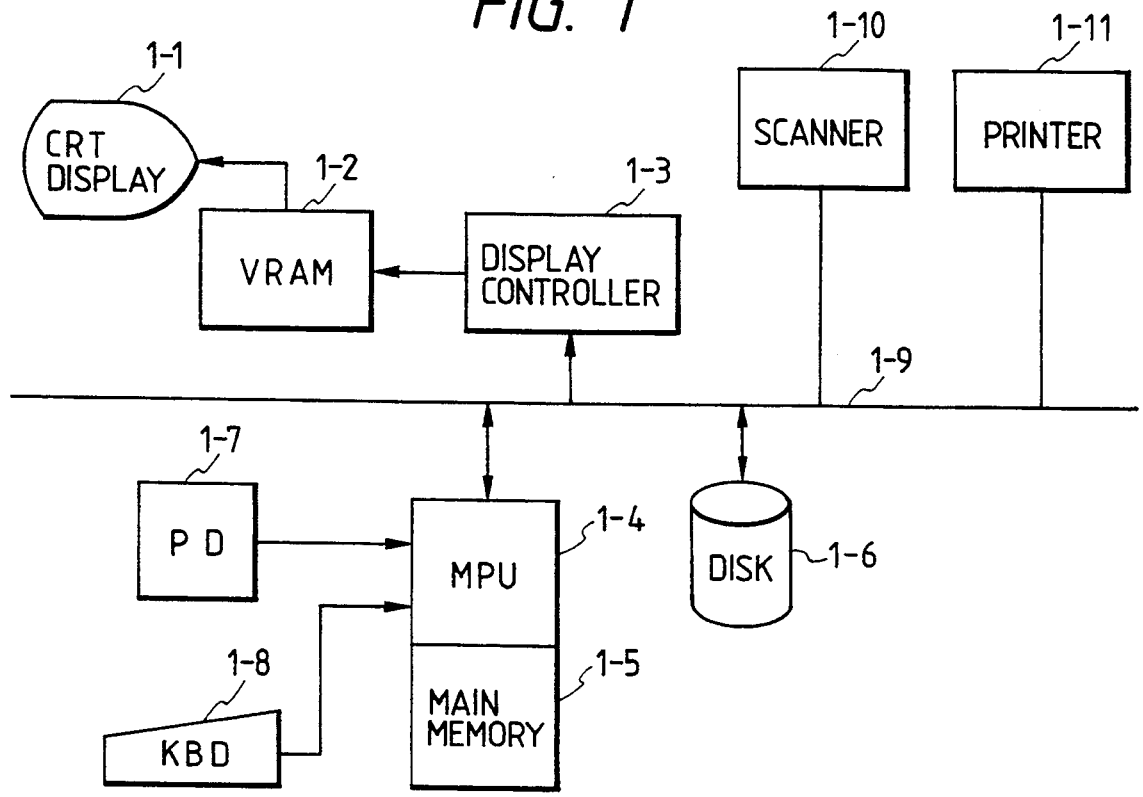
FIG. 1 is a block diagram of a document processing apparatus which can employ the present invention.
Figure 2:
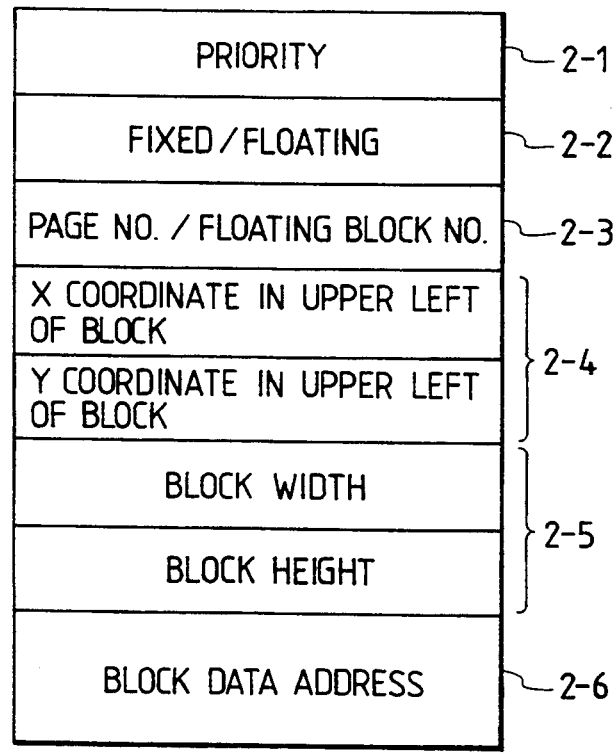
FIG. 2 is a view for explaining block (frame) information in document processing in a conventional work station.

FIG. 1 is a block diagram showing a document processing apparatus according to an embodiment of the present invention. A CRT display 1-1 is connected to a Video Random Access Memory (VRAM) 1-2, and the VRAM 1-2 is connected to a display controller 1-3. The display controller 1-3 is connected to an Input/Output (I/O) bus 109. A scanner 1-10 and a printer 1-11 are connected to the I/O bus 109. A microprocessor (MPU) 1-4 as a main unit of the apparatus and a main memory 105 are also connected to the I/O bus 1-9. A magnetic disk unit (DISK) 1-6 as an external memory is also connected to the I/O bus 1-9. A pointing device (PD) 1-7 and a keyboard (KBD) 1-8 are connected to the microprocessor 1-4.

The CRT display 1-1 raster-scans document data and displays it. The VRAM stores pattern development information of one frame of the CRT display 101. The display controller 1-3 controls the pattern development operation of the VRAM 1-2 and pattern read access to the CRT display 1-1. The microprocessor 1-4 performs document editing control and data control, i.e., controls the overall operations of the document processing apparatus. The main memory 1-5 stores control programs (to be explained with reference to flow charts later on) and document data. The DISK 1-6 stores document files and the like. The PD 1-7 also serves as a designating means for designating an arbitrary position on the CRT 1-1.

Although the term "composition" generally indicates one process of typographic printing and can be defined as "types are picked up on the basis of an original, and an order, character cramming, the number of lines, character spacing, line spacing, and positions are accurately determined according to instructions in the original, thereby composing one balanced document", the above processes are electronically performed in the present invention.

Figure 5:
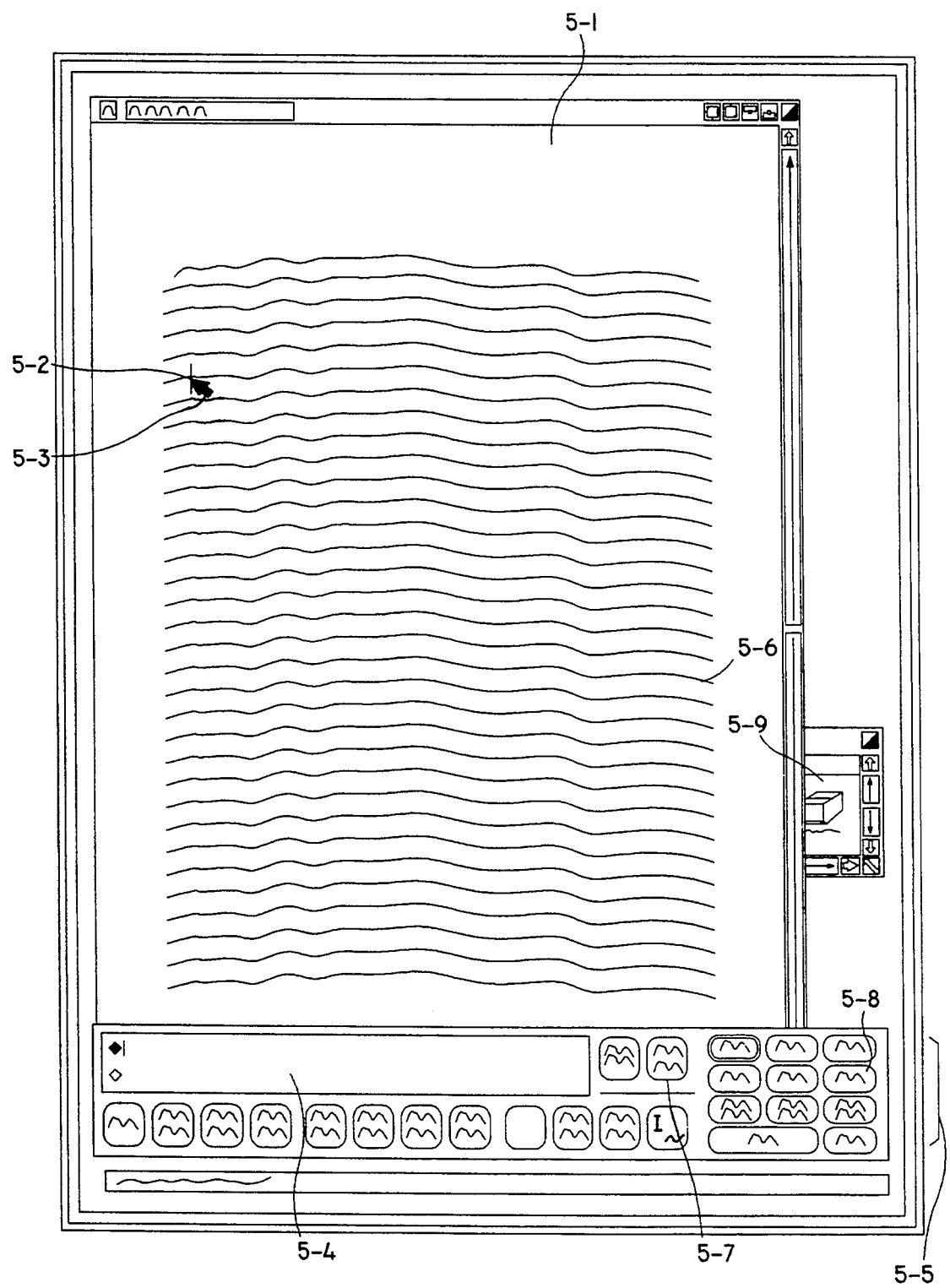
FIG. 5 is a view for explaining an input/edit screen in an embodiment of the present invention.

FIG. 5 and subsequent drawings are views for explaining operations of the embodiment using detailed display contents. FIG. 5 shows an input editing screen of this embodiment. A display screen 5-1 corresponds to a document sheet. Input document data (character data in this case) 5-6 is illustrated. A document editing cursor 5-2 represents an input editing position of the presently input data. A pointing cursor 5-3 is moved in association with the PD 1-7 in FIG. 1 and sets movement of a document editing cursor, an editing range, and a con, hand together with a switch (not shown) of the PD 1-7. An input screen 5-4 temporarily displays data from the KBD 1-8 and performs kana-kanji conversion of the display data if such conversion is designated. The converted data is supplied to the display screen 5-1. Display data represented by rectangles and squares on a con, hand menu 5-5 represent editing commands and serve as labels for inputting commands by corresponding key inputs on the KBD1-8.

In order to designate a floating block (frame), a floating frame 5-7 in the con, hand menu 5-5 is selected. However, in order to designate a fixed block (frame), a fixed frame 5-8 in the command menu 5-5 is selected. A command 5-9 for another printer or the like is displayed in a multiwindow display, and this applies to other drawings. However, multiwindow display is not directly associated with the present invention, and a description thereof will be omitted.

Figure 6:
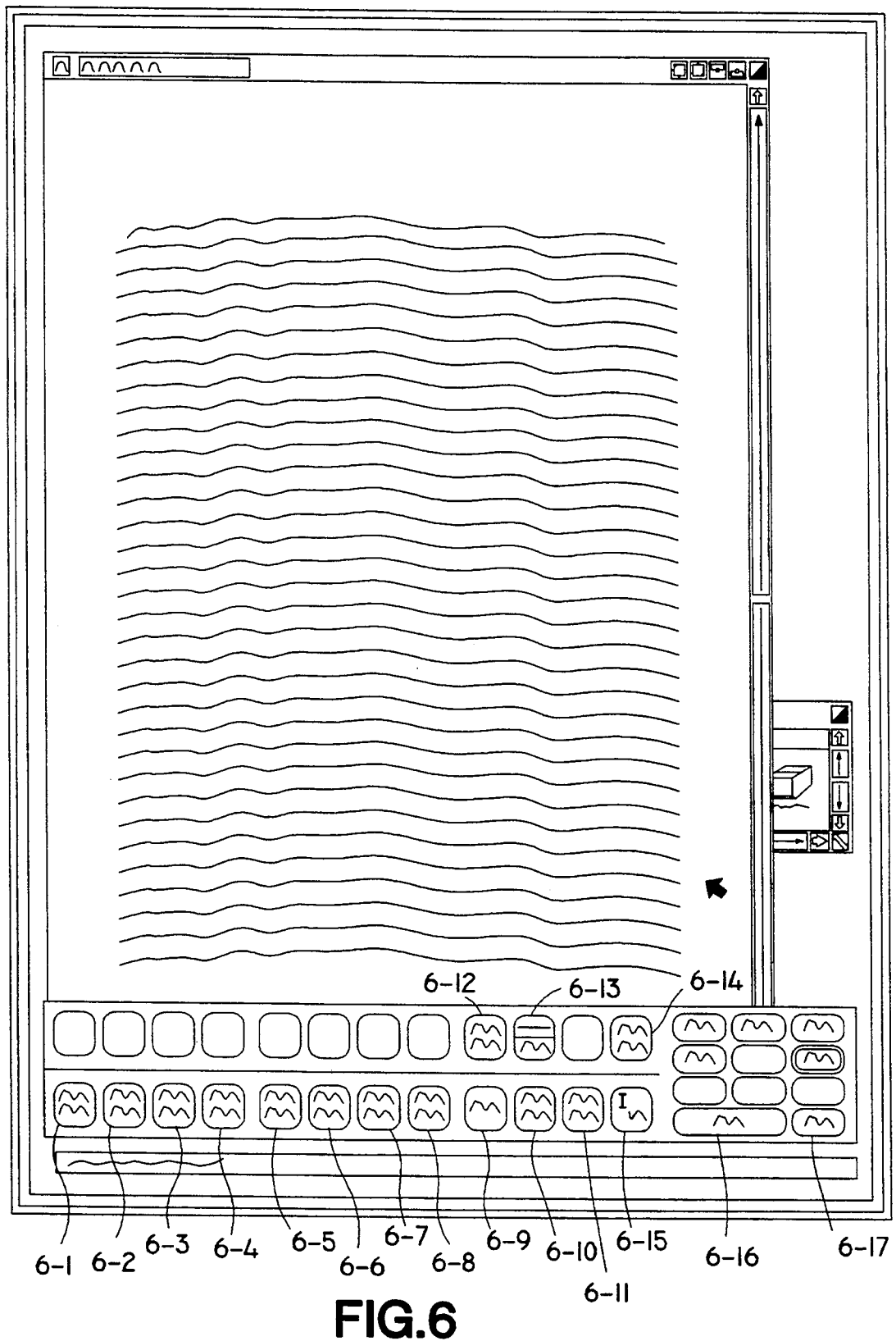
FIG. 6 is a view for explaining a display screen when a command menu in a fixed frame 5-7 is selected in FIG. 5.
Figure 7A:
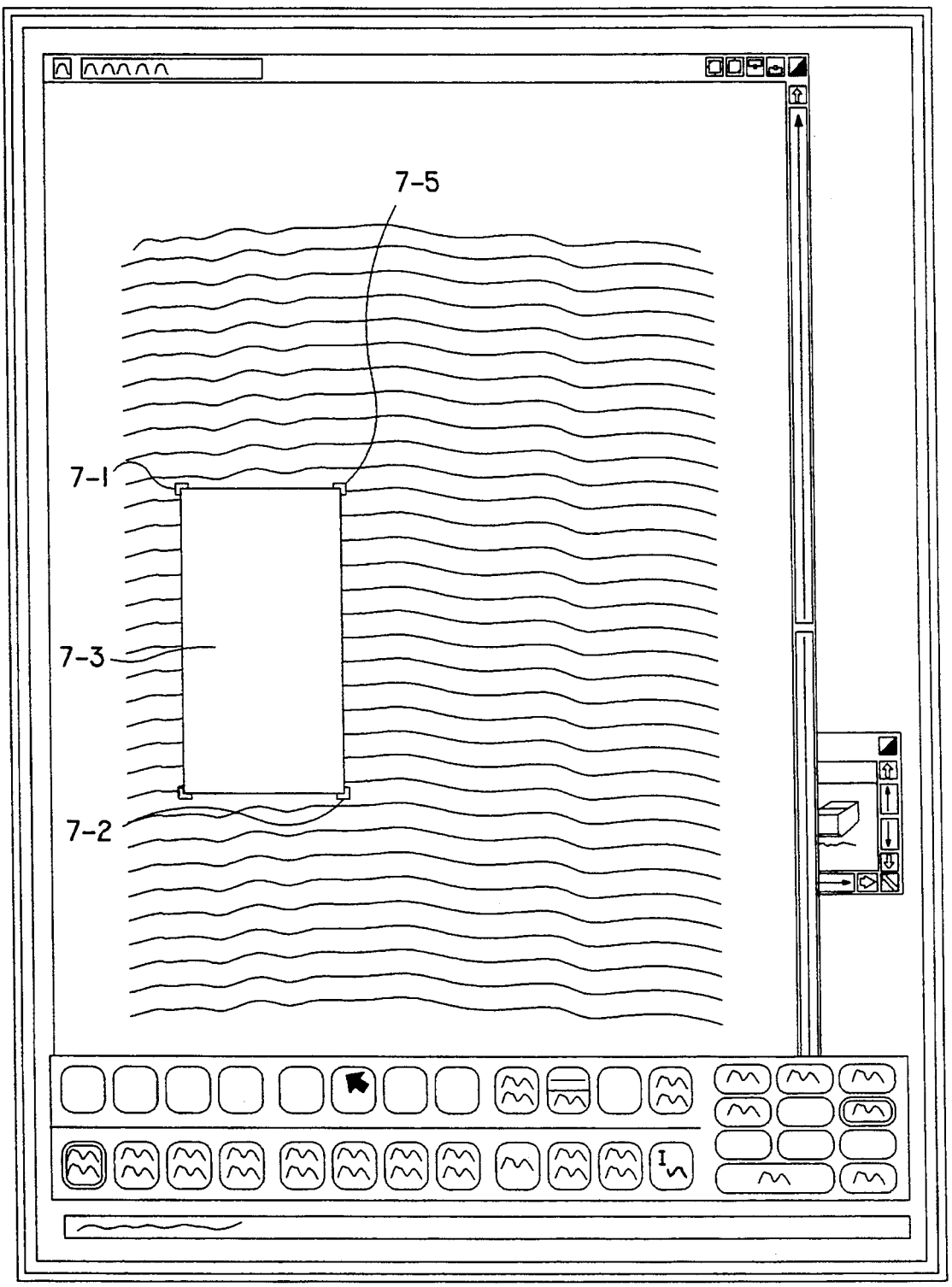
FIGS. 7A and 7B are views for explaining a display screen when a fixed frame is formed or this frame is temporarily stored.
Figure 7B:
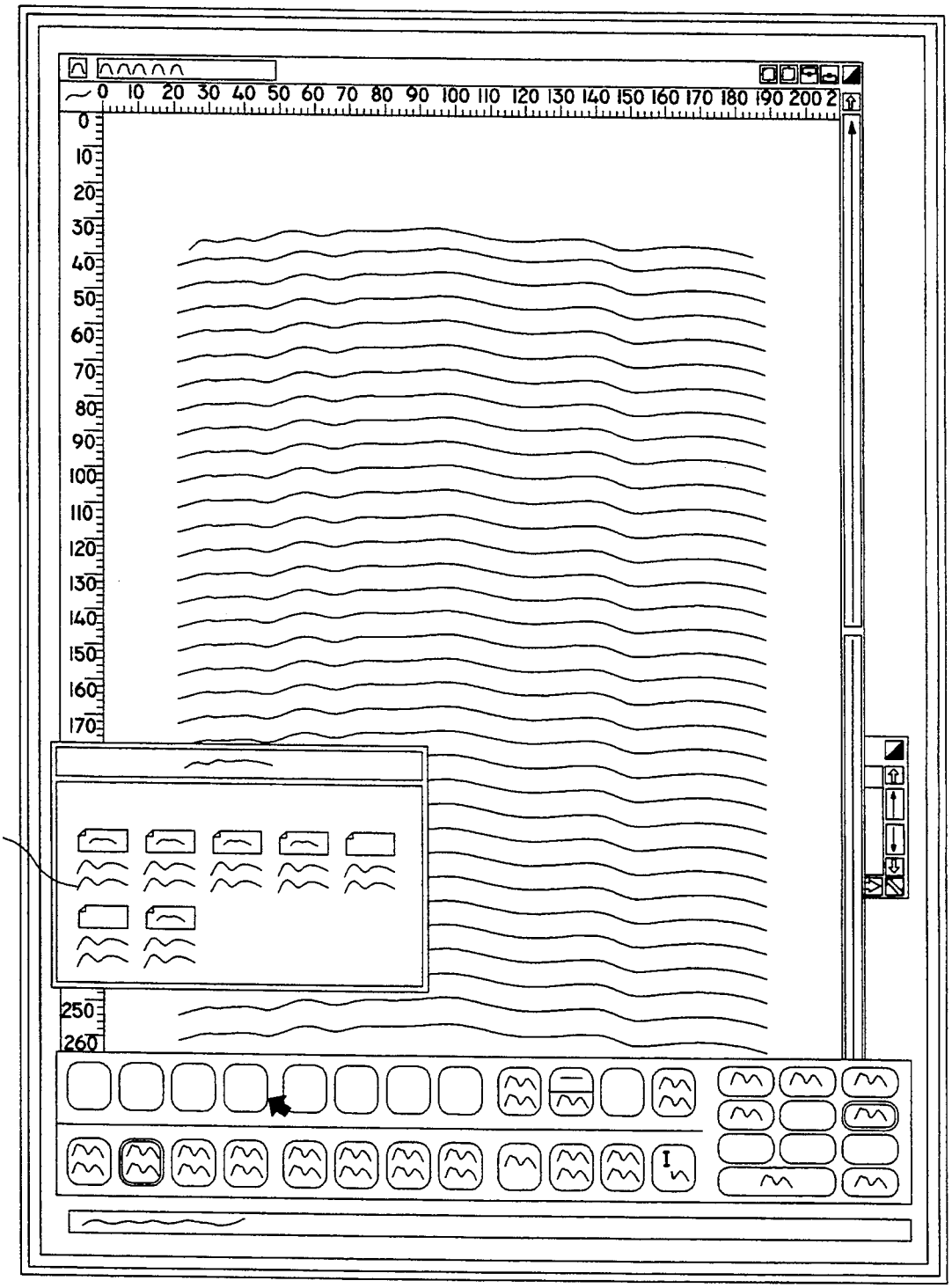

FIG. 6 shows a display screen when the fixed frame 5-8 is selected in the command menu in FIG. 5. A "fixed frame framing" command 6-1 is used to form a fixed frame 7-3 by selecting a start point 7-1 and an end point 7-2 with the PD 1-7. A "fixed frame deletion" command (6-2 in FIG. 6) is used to designate and delete the fixed frame from the screen with the PD 1-7. FIG. 7B is a view showing a state wherein the fixed frame 7-3 in FIG. 7A is deleted. The measure is displayed in FIG. 7B, but can be eliminated according to image control. The fixed frame can be fetched in a clip board 7-4 (FIG. 7B) as a temporary storage area in the DISK 1-6. In the "fixed frame deletion" command, the fixed frame fetched in the clip board 7-4 can also be deleted.

Figure 8A:
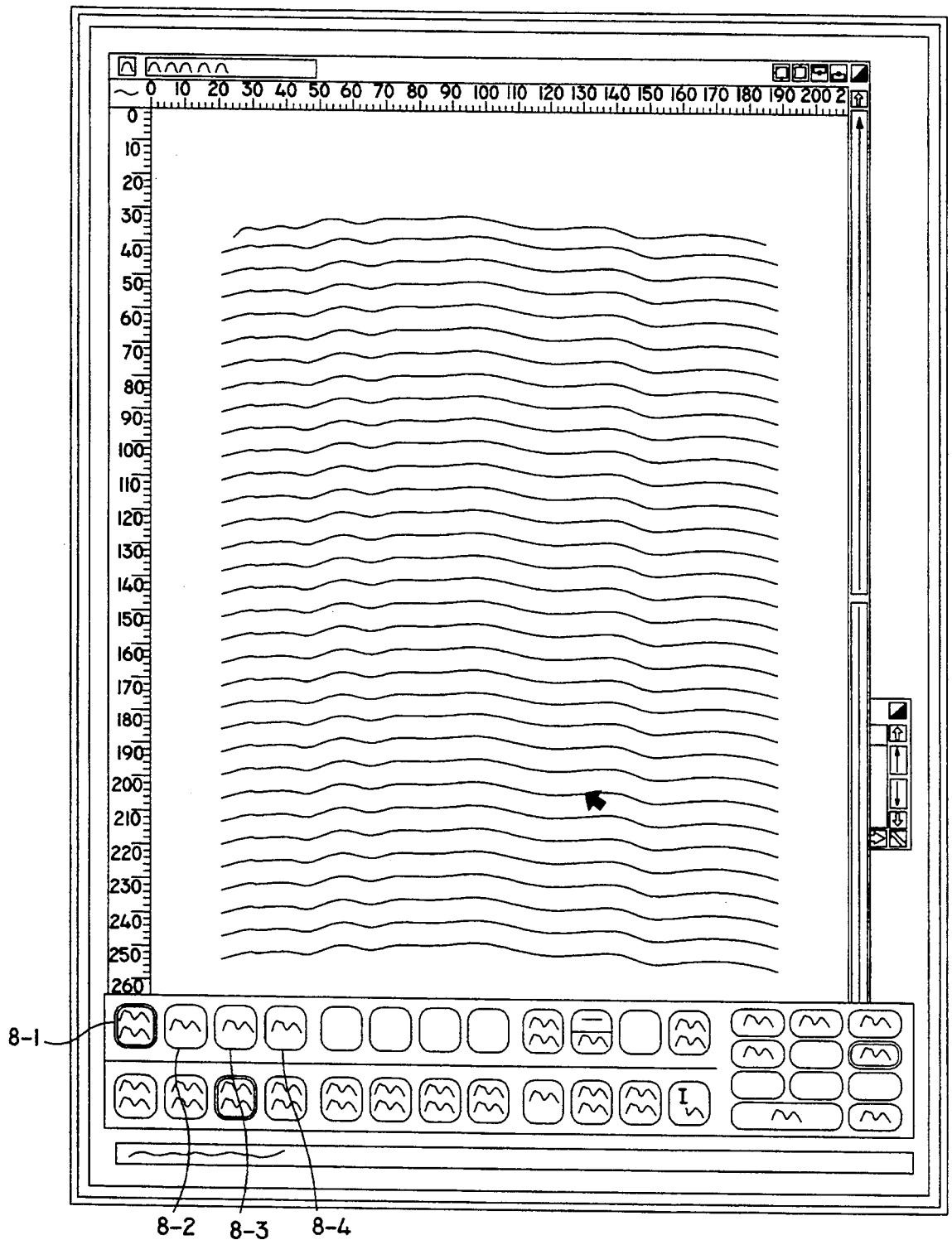
Figure 8B:
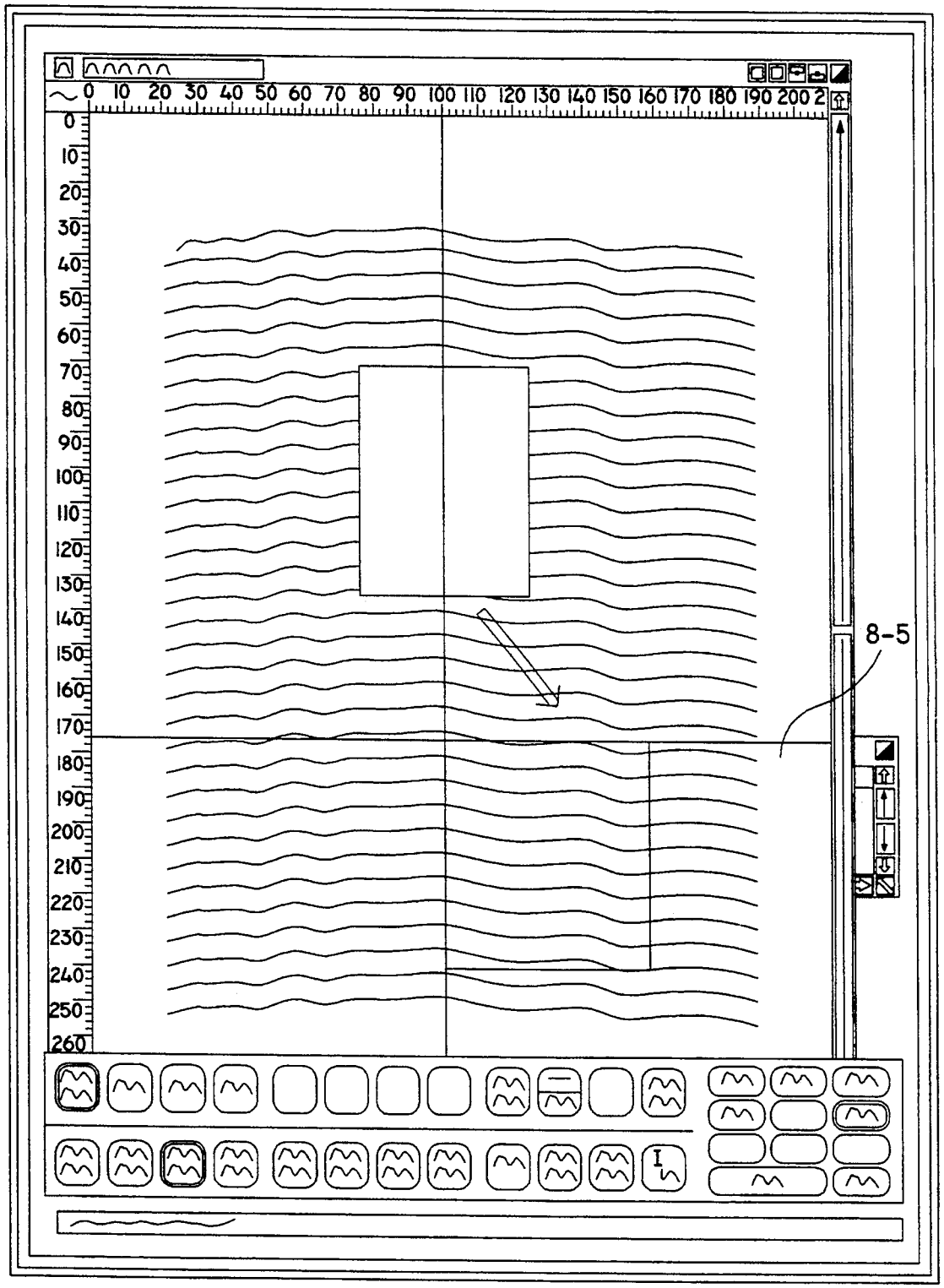

FIG. 8A is a display screen when a "fixed frame movement" command 6-3 is selected. The frame is not illustrated since it is described in the menu (8-1 to 8-4). An "upper, lower, left, and right" command 8-1 indicates that the fixed frame is arbitrarily moved in the upper, lower, left, or right direction (indicated by an arrow) within the page, as shown in FIG. 8B. When this command is effected, a cursor of the PD 1-7 can be changed into a cross cursor so as to allow easy positioning.

Figure 8C:
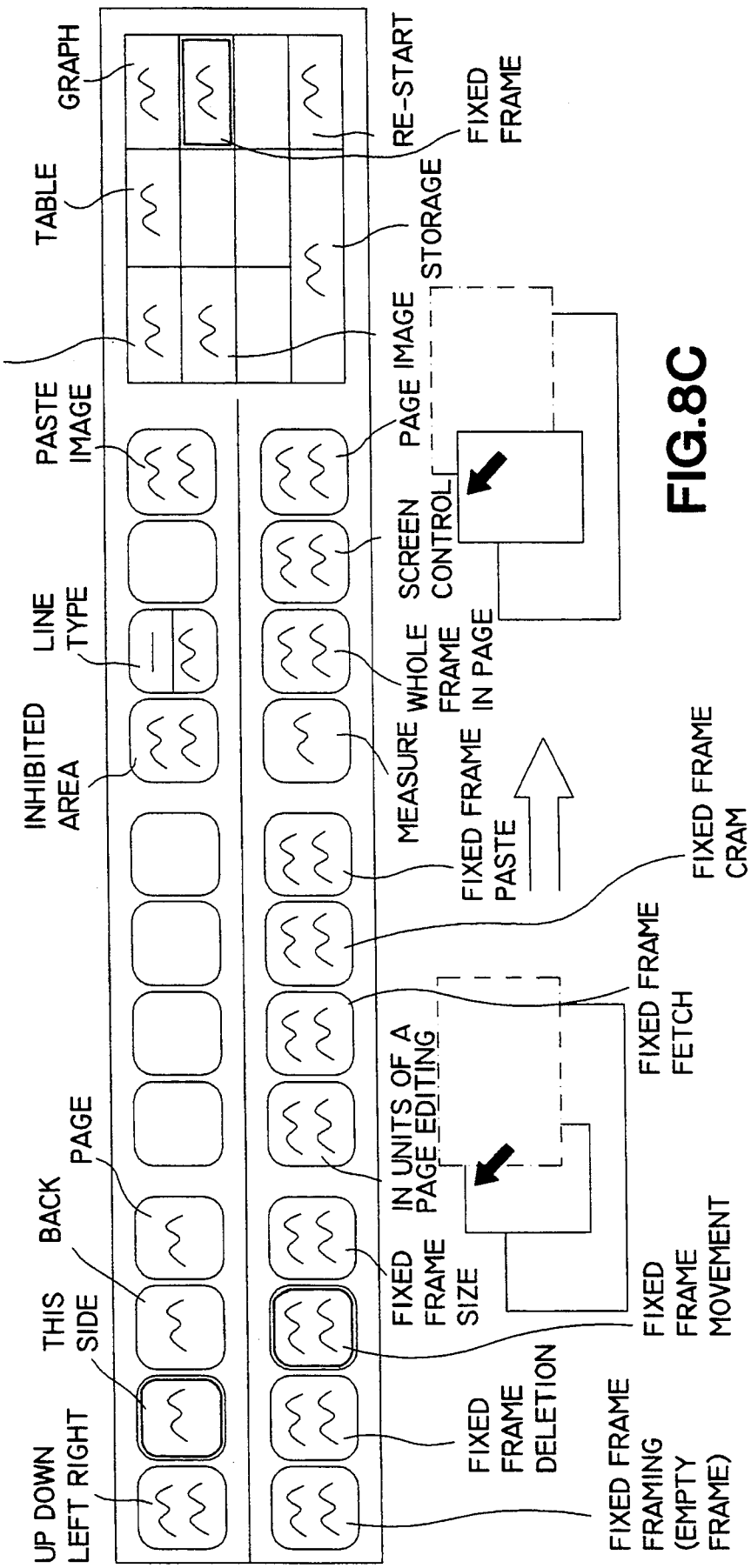
Figure 8E:
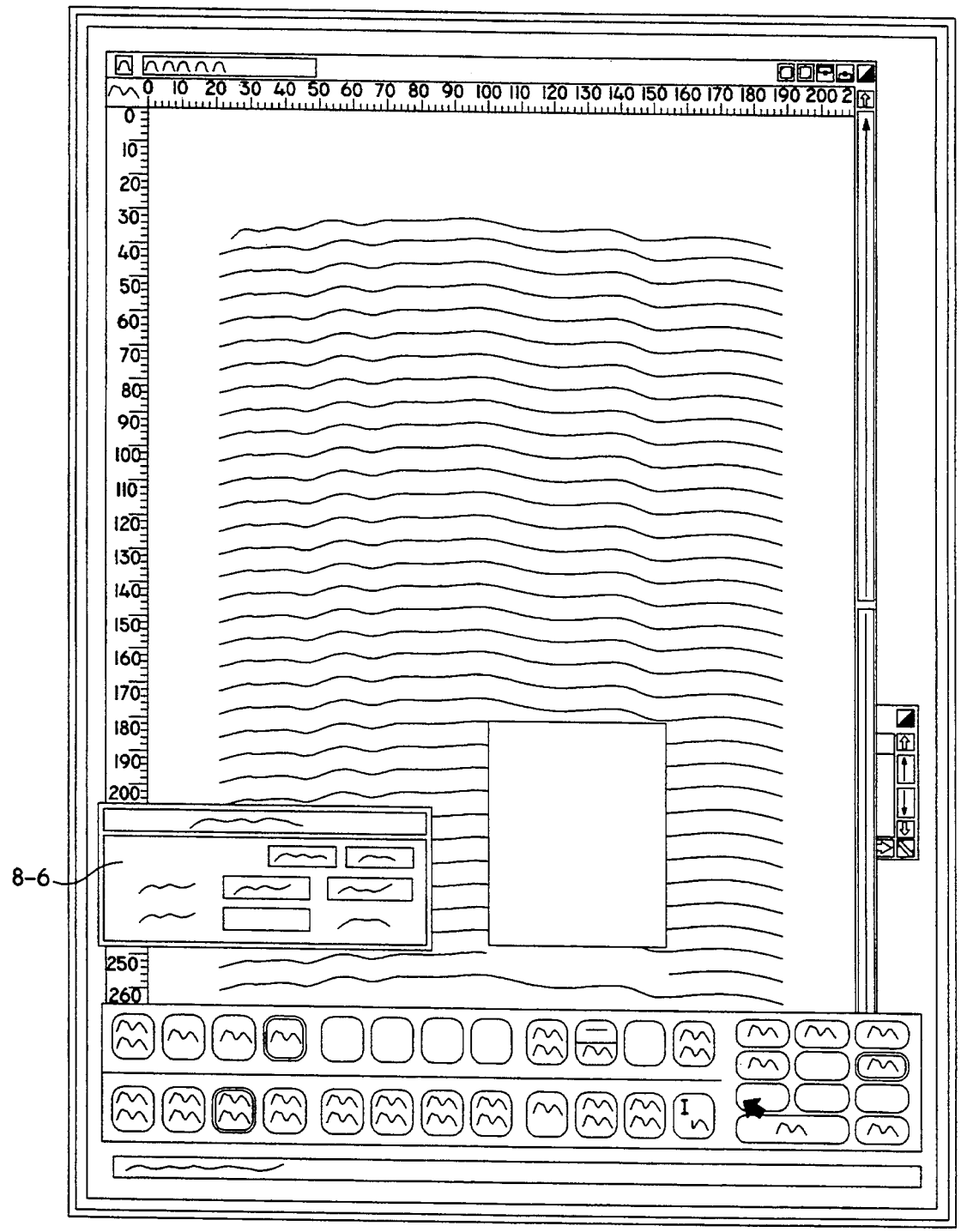

A "this side" command 8-2 in FIG. 8A and a "back" command 8-3 are used to change the designated frame to "this side" or "back" by a switch (not shown) of the PD 1-7 when the overlapping frames are present, as shown in FIGS. 8C and 8D. A "page" command 804 is used to move a fixed frame or data on a layer (graph or image) called background data to any page, as shown in FIG. 8E.

Figure 8F:
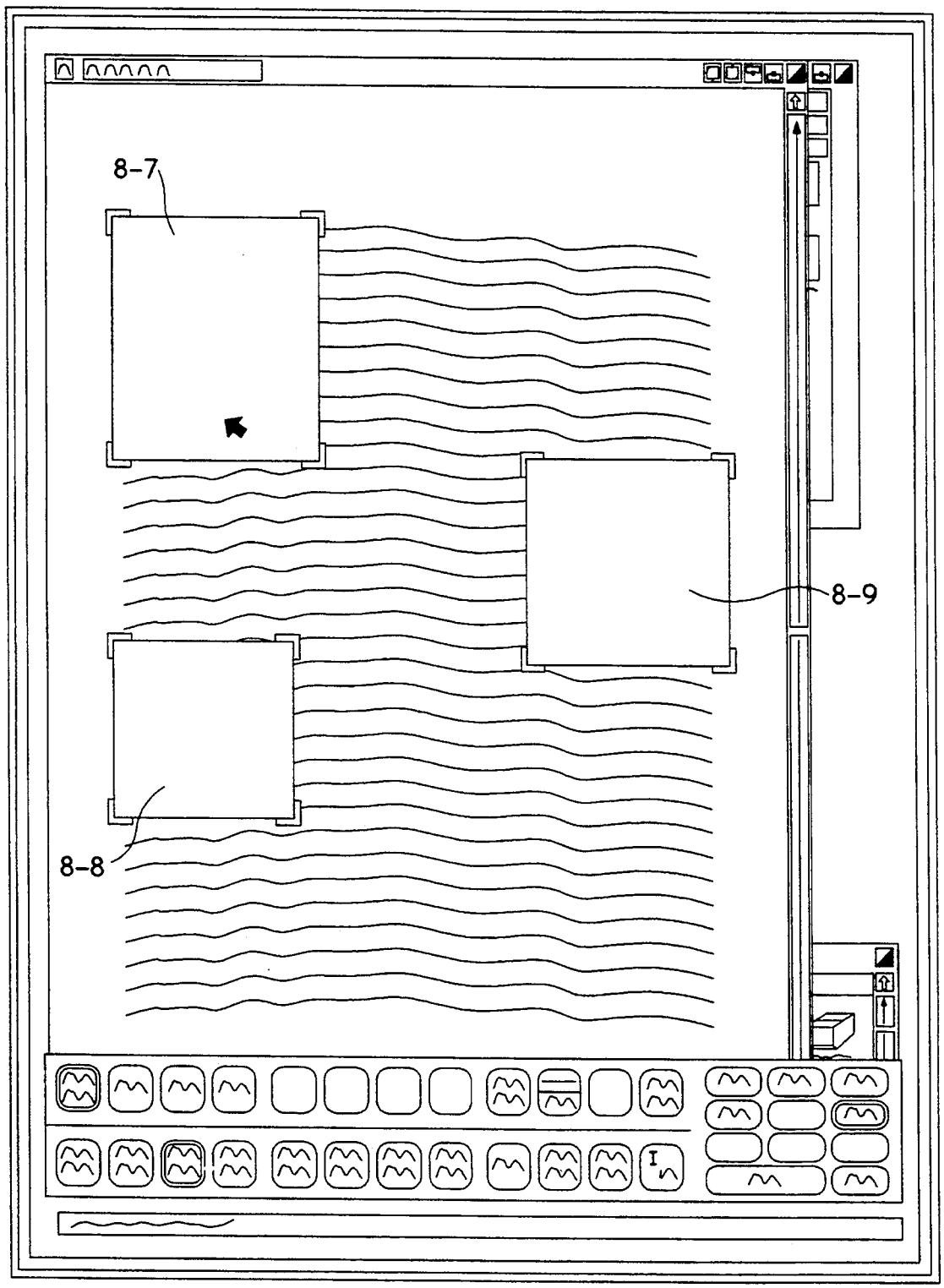
Figure 8G:
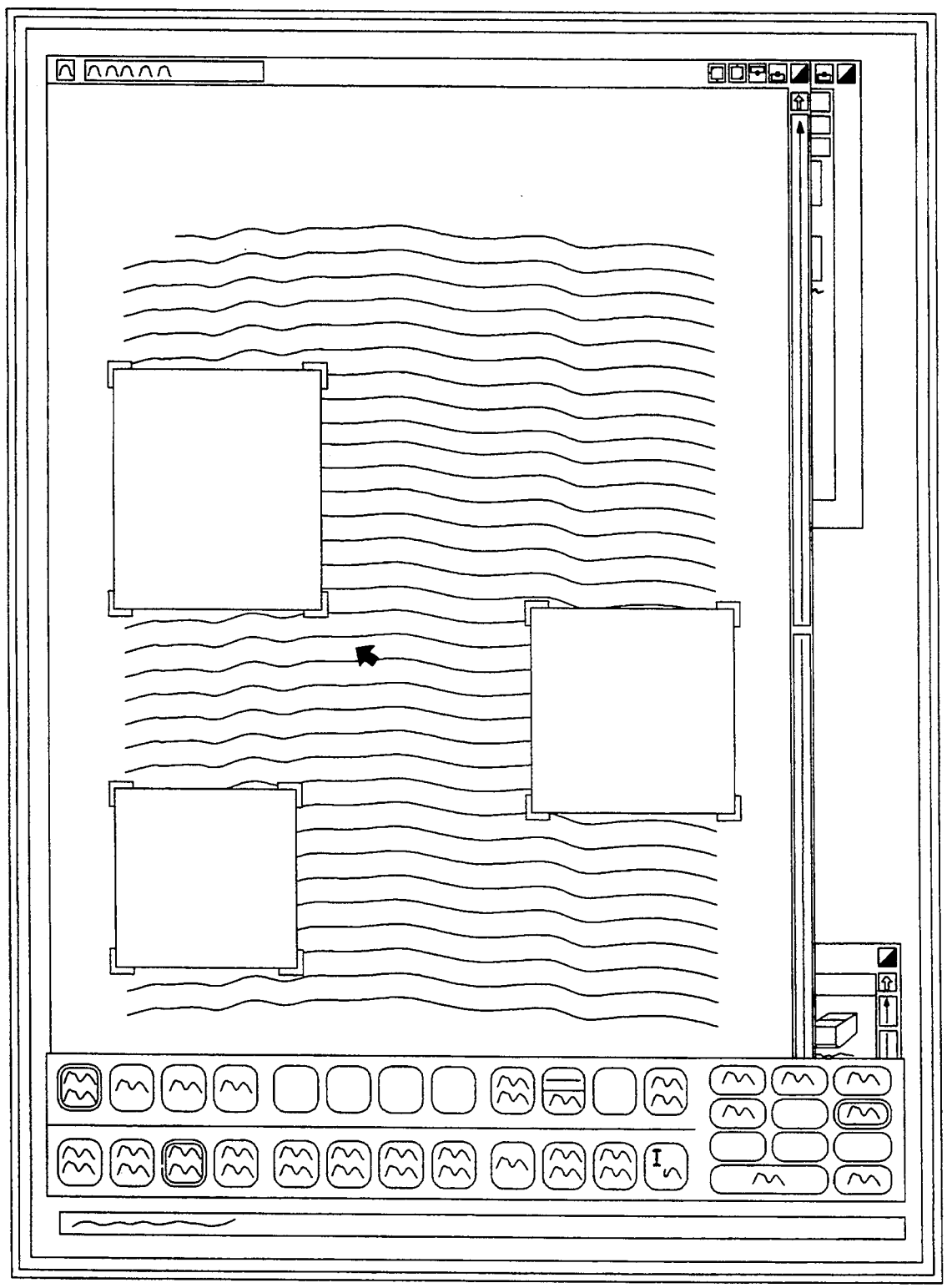

FIGS. 8F and 8G are views for explaining an operation for simultaneously dealing with a plurality of frames. A fixed frame 8-7, 8-8 or 8-9 is selected by the PD 1-7. When a "continue" key (not shown) of the KBD 1-8 and the PD 1-7 are used together, the above fixed frames can be sequentially selected one by one. FIG. 8F shows a result wherein the fixed frames 8-7, 8-8, and 8-9 are selected.

Selection of the plurality of fixed frames may be performed by designating diagonal points as start and end points to select all rectangular blocks designated by these points.

The plurality of selected fixed frames can be sequentially canceled by a combination of a "continue" key (not shown) and the PD 1-7.

FIG. 8G shows a "fixed frame movement" command 6-3 for a plurality of frames and the movement result.

A "fixed frame size" command 6-4 in FIG. 6 is used to enlarge or reduce the formed frames.

Figure 9A:
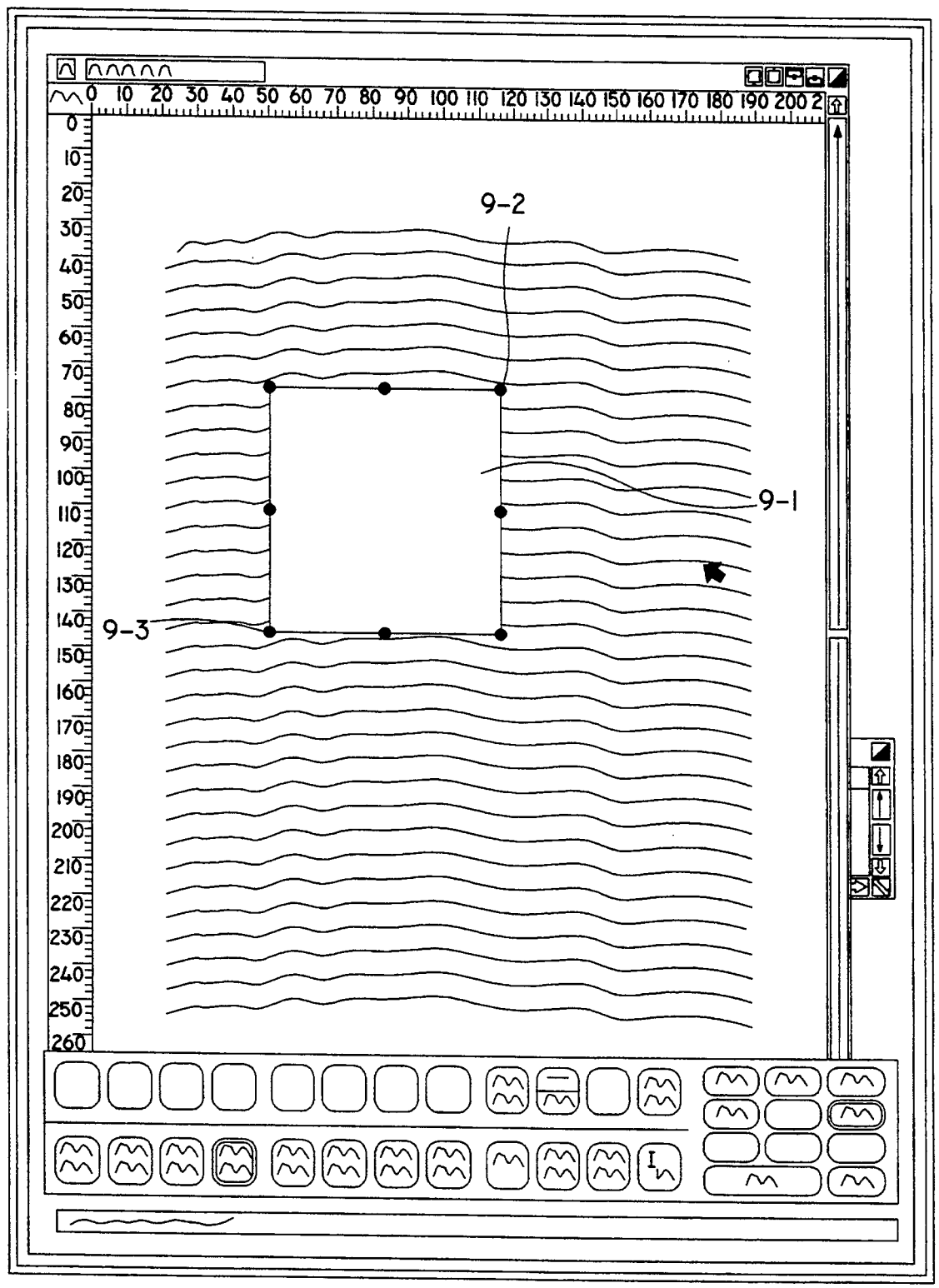
FIGS. 9A to 9D are views for explaining a display screen when a fixed frame size is changed.

FIG. 9A is a view for explaining a change in size of a fixed frame 9-1. Black dots added to the sides of the designated fixed frame 9-1 indicate directions of enlargement or reduction. When a black dot 9-2 is designated to change the frame size, the frame size is changed while a black dot 9-3 opposite to the black dot 9-2 is fixed. However, when the black dot 9-3 is designated to change the frame size, the frame size is changed while the black dot 9-2 is fixed. That is, the diagonal point is changed to change the origin (fixed point) in a flip-flop manner.

Figure 9B:
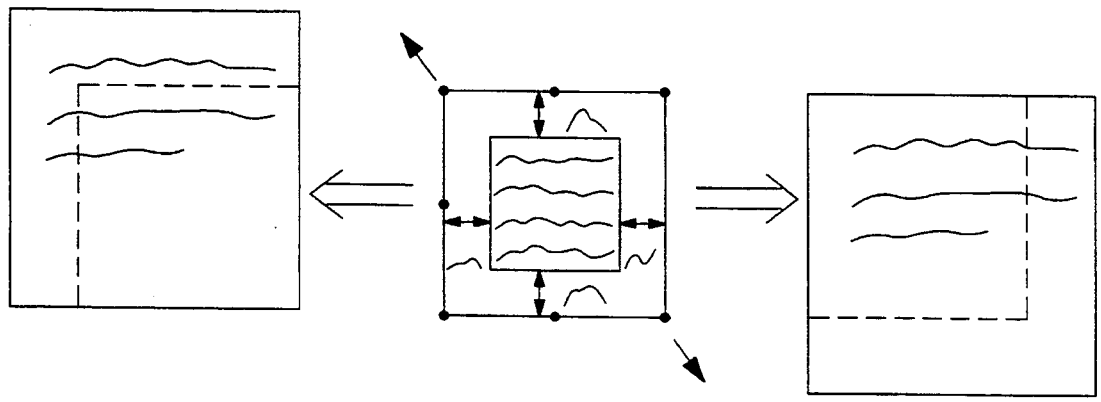
Figure 9C:
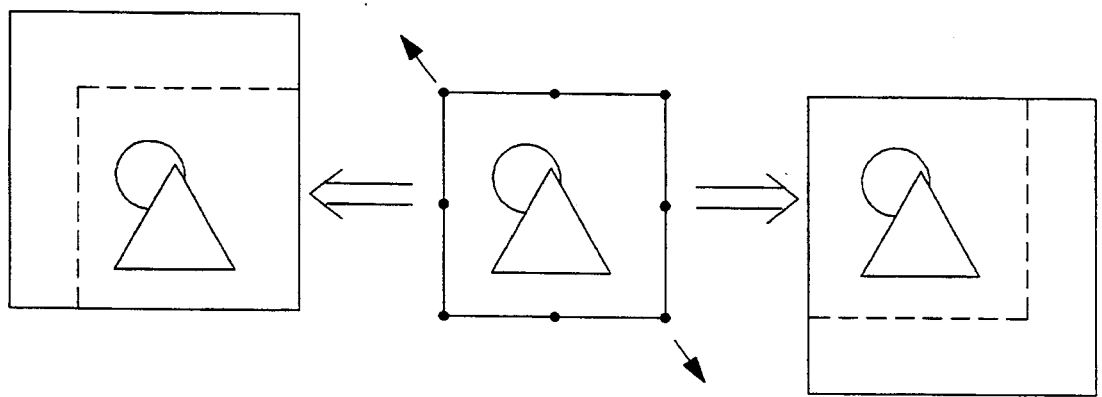
Figure 9D:
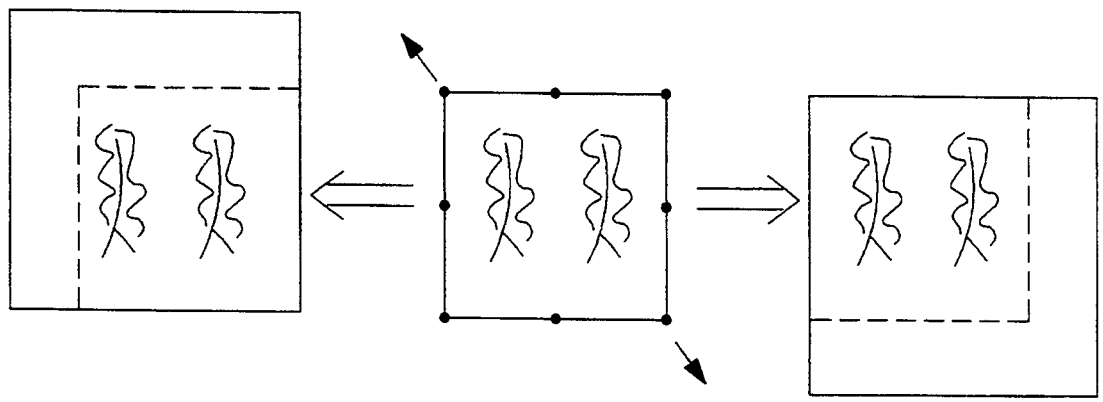

The relationship between the frame size change and movement of data is shown in FIGS. 9B, 9C, and 9D. If the data inside the frame is sentences, the fixed frame is regarded as a so-called "small composition", and this fixed frame may be expanded in the upward or downward direction by the definitions of the lengths of "top, bottom, left, and right" in the small composition format to obtain the same result if the enlarged frames are identical. When data in the frame is graphic data (FIG. 9C) or image data (FIG. 9D), a space is formed in the direction of expansion, and a detailed description thereof will be made later on. When the frame size is reduced, the space is eliminated in the direction of reduction.

The operation for graphic and image data applies to the case of a table.

An "editing in units of a page" or page editing command 6-5 in FIG. 6 is used to move or delete the layer data in units of pages. When this command is input, a menu shown in FIG. 10A appears. When movement is selected for the fixed frame, only the fixed frame can be moved, as shown in FIG. 10B. It should be noted that numerals 1, 2, 3, 4, and 5 are page numbers. In the case of a layer (graphic or image data) called background data, only the layer can be moved, as shown in FIG. 10C. When both the fixed frame and the background data are selected, they can be moved.

FIG. 10D shows a view for explaining deletion of a fixed frame. When a deletion command, a deletion page, a fixed frame, and background data are selected to delete the fixed frame and the layer on the designated page.

Figure 10A:
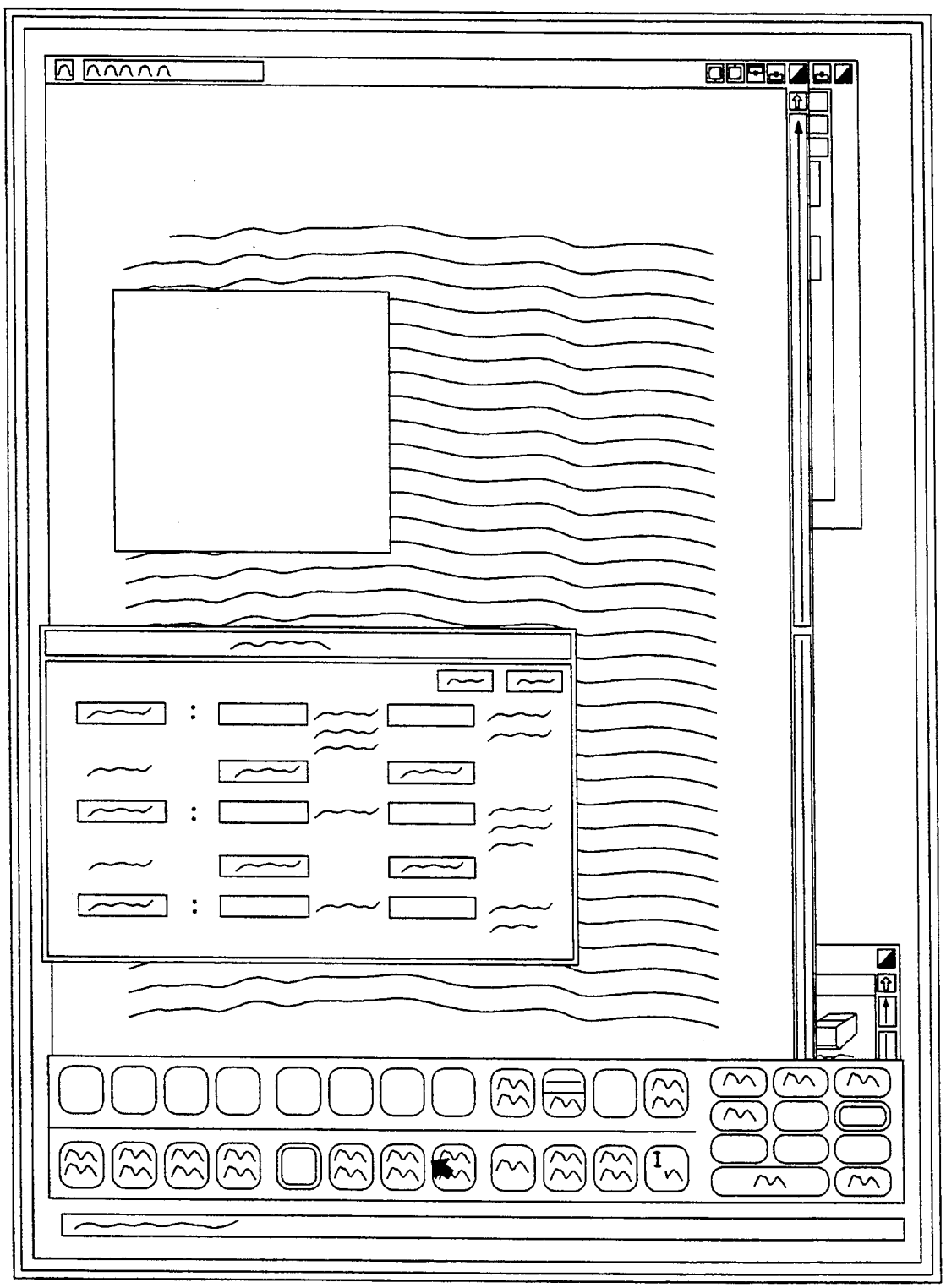
Figure 10B:
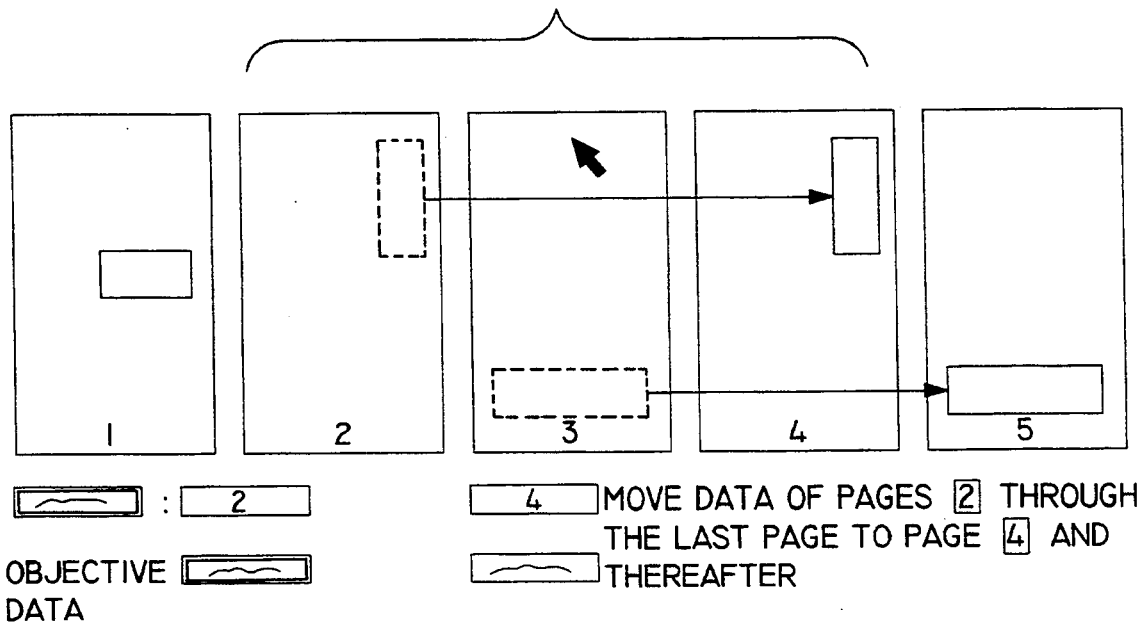
Figure 10C:
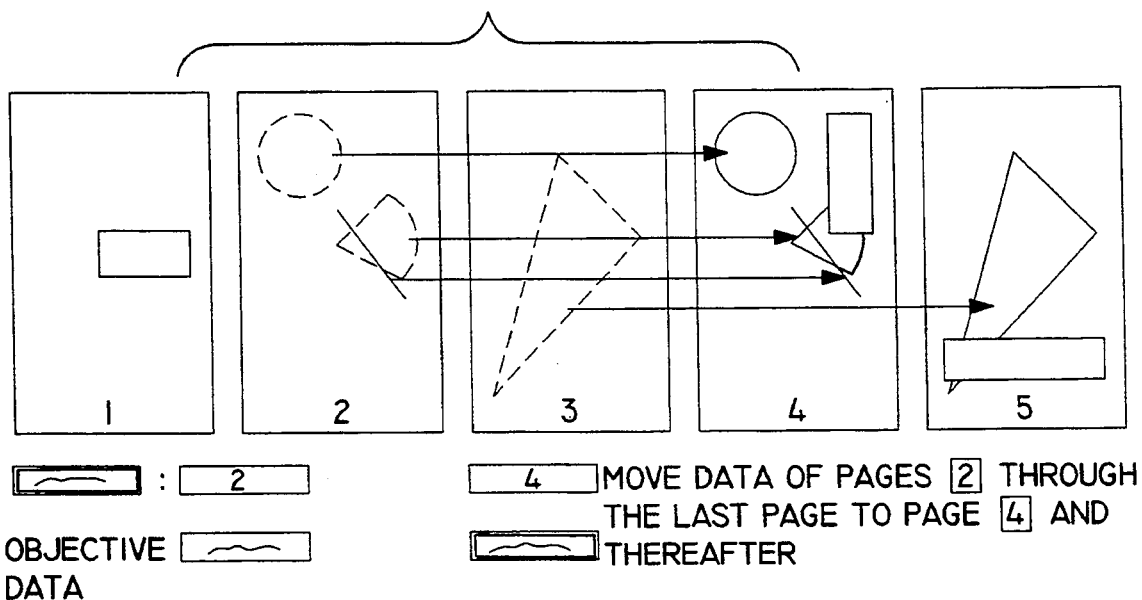
Figure 10E:
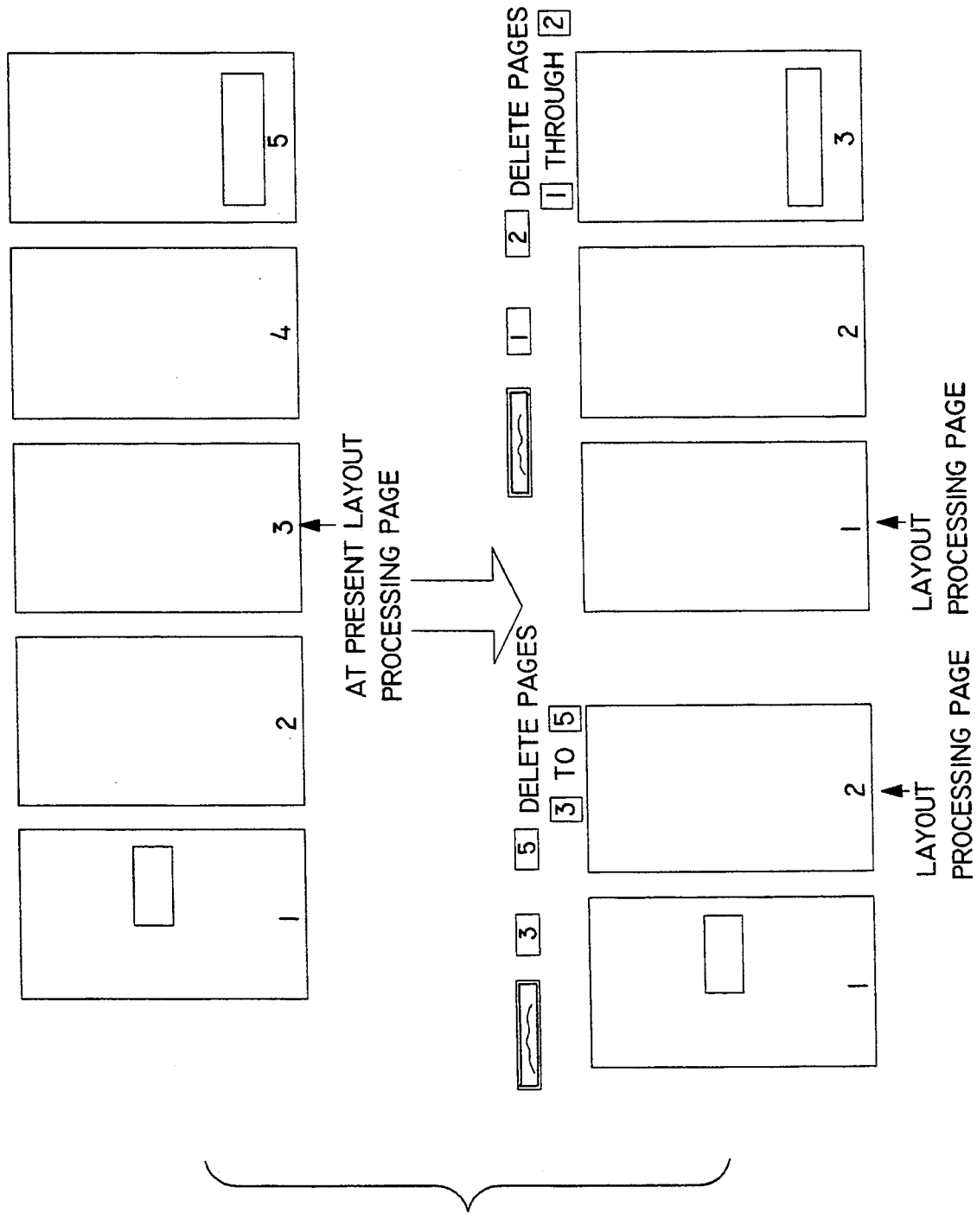

FIG. 10E is a view for explaining page deletion. All data on the designated page can be deleted.

Figure 11A:
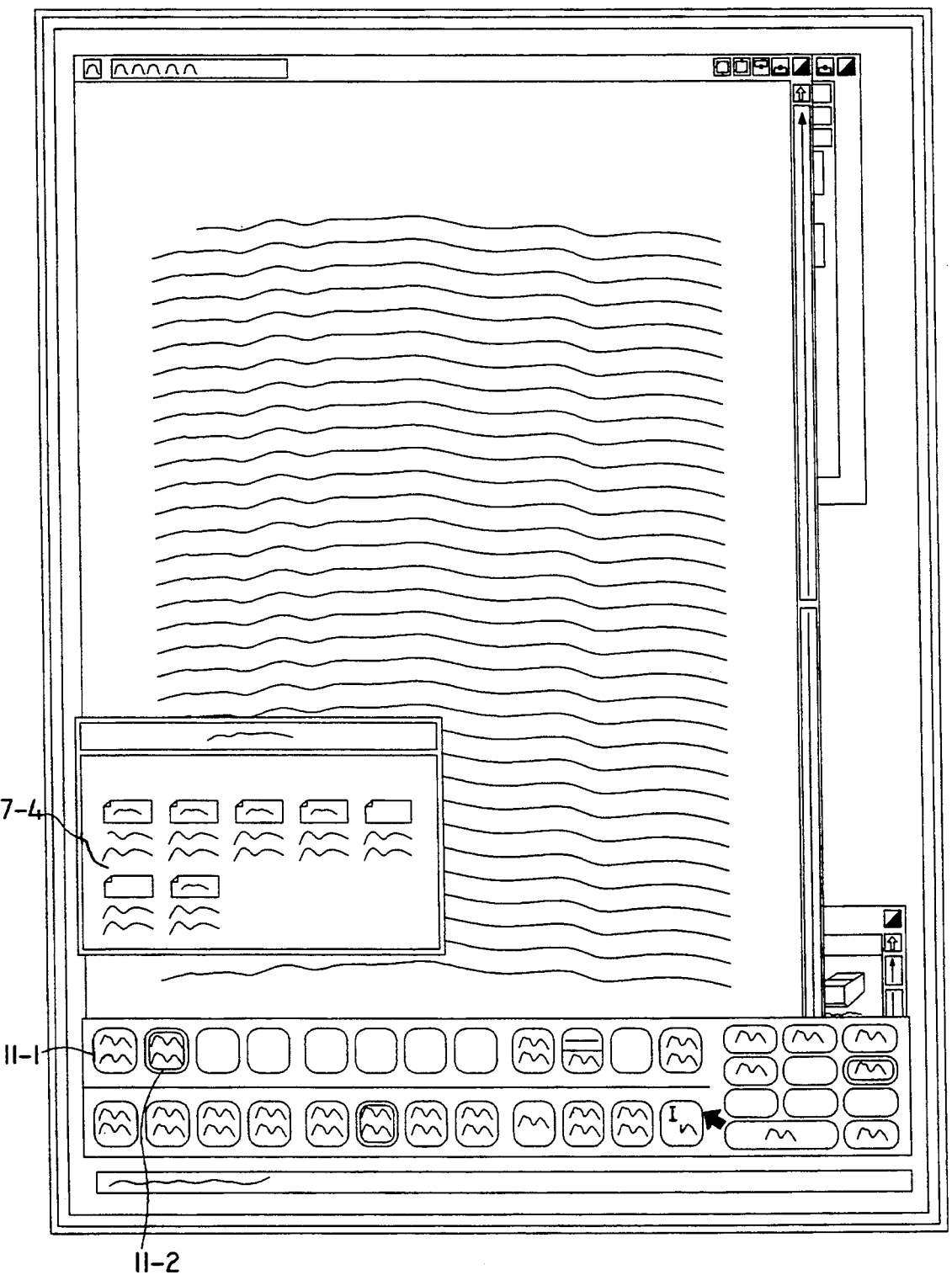
FIGS. 11A and 11B are views for explaining a display screen when a command menu of a fixed frame fetch 6-6 in FIG. 6 is selected.
Figure 11B:
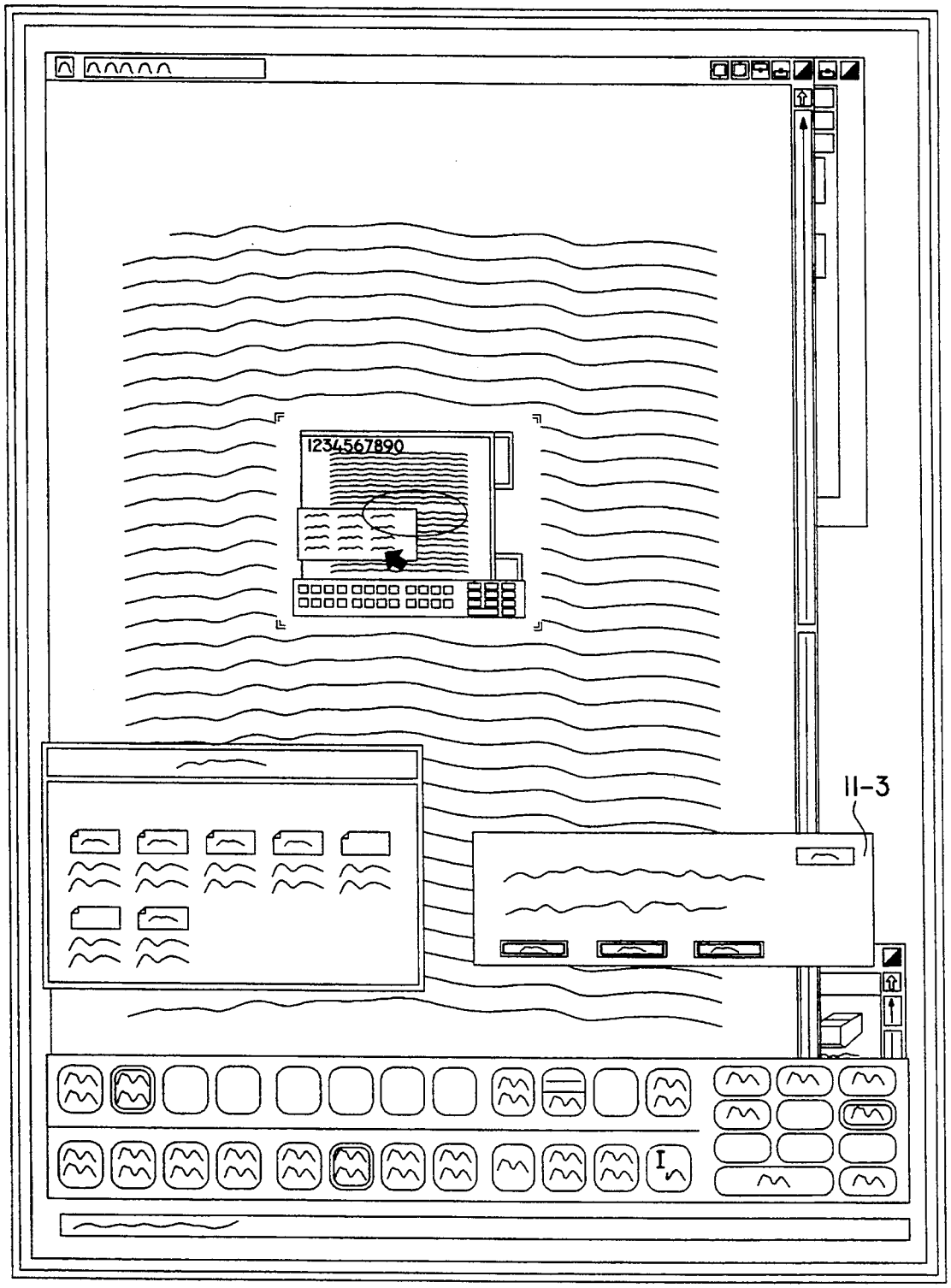

When a "fixed frame fetch" command 6-6 is selected, a clip board 7-4 appears, as shown in FIG. 11A. When an "external frame fetch" command 11-1 is selected, only the frame information can be fetched without fetching the data in the fixed frame. When the fetched frame is pasted, only an empty fixed frame is pasted. When a "whole fetch" command 11-2 is selected, the types of data within the designated frame are displayed, as shown in FIG. 11B. The data in the frame can be selectively fetched together with the frame. All data (image data, graphic data, and character data) can be selected as default values. It should be noted that "fetch" is to fetch the frame stored in, e.g., a clip board.

Figure 12A:
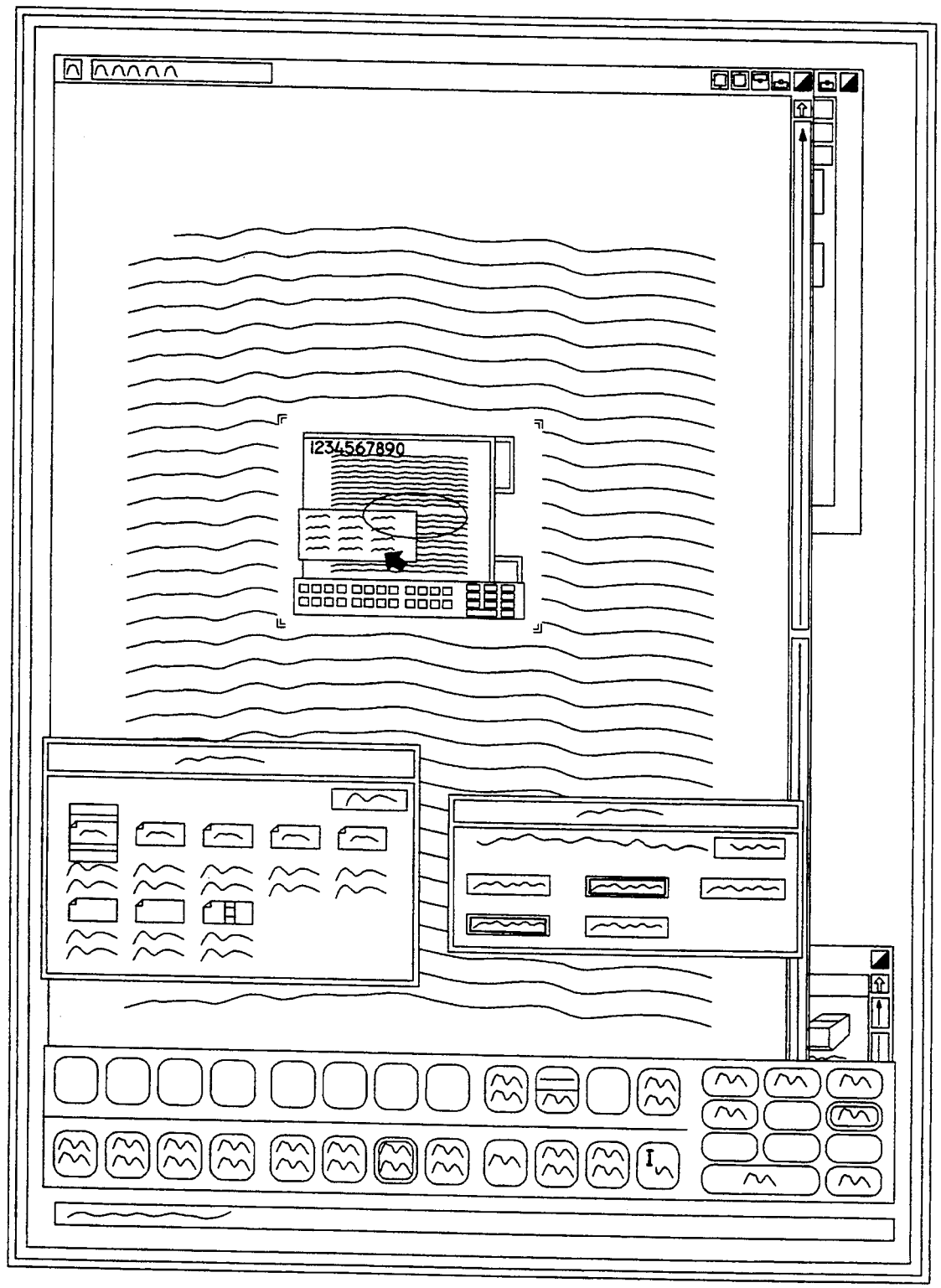
FIGS. 12A to 12D are views for explaining cram processing of a fixed frame.

A "fixed frame cram" command 6-7 in FIG. 6 is used to designate the same variable magnification factors in the vertical and horizontal directions, variable magnifications factors independently designated in the vertical and horizontal directions, or 1-to-1 magnification in the vertical and horizontal directions of the frame in the designated file in the clip board 7-4 when a file (e.g., a "sample document" file) stored in the clip board 7-4 is crammed in the designated frame, as shown in FIG. 12A. When the same variable magnification factors in the vertical and horizontal directions are designated, the original shape is preserved. However, the resultant frame may be unbalanced with respect to the frame. When the variable magnification factors are independently designated in the vertical and horizontal directions, the resultant data can be properly fitted in the frame. In this case, however, the original shape may be deformed. When no variable magnification factors are designated, the original data is often partially omitted from the frame or an excessive space may be formed in the frame. When the original size is changed at variable magnification factors, the data may not be fitted within the frame. For this reason, an enlargement or reduction priority mode may be selected. The enlargement priority mode indicates that the data outside the frame is cut in place of insertion of the data fully within the frame. The reduction priority mode indicates that the data size is variably reduced to fit all data within the frame.

Figure 12B:
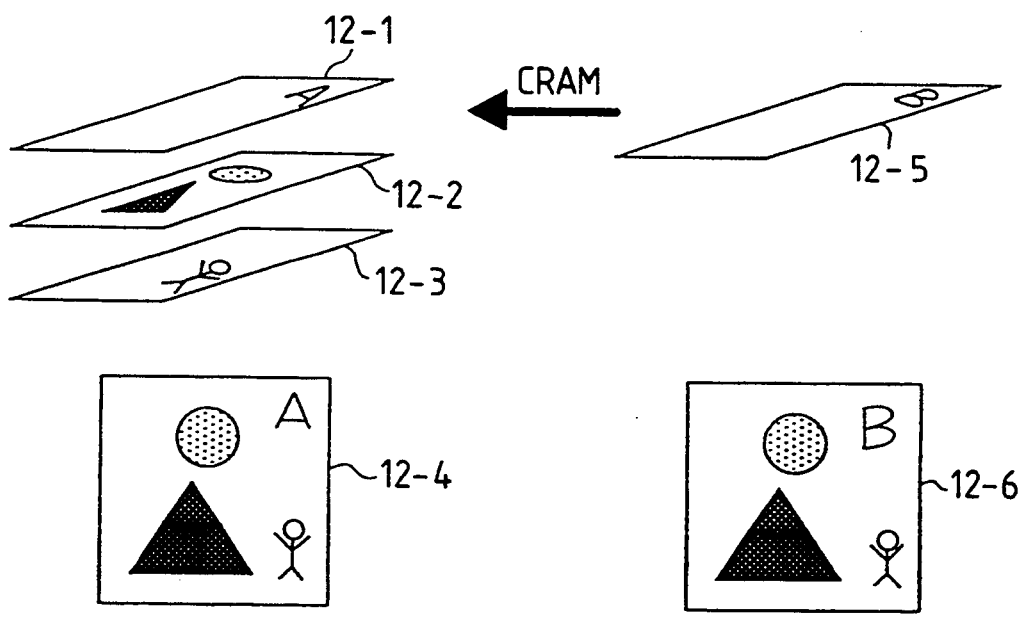

FIG. 12B is a view for explaining cram processing and the layers of the fixed frame. When frame data consisting of a sentence layer 12-5 cut by a "fixed frame cram" command 6-7 is crammed in a fixed frame 12-4 consisting of a sentence (character) layer 12-1, a graphic layer 12-2, and an image layer 12-3, only the sentence layer is changed. The resultant frame 12-4 is converted into a fixed layer 12-5. In this manner, data can be crammed in units of layers, so that composite data can be easily obtained by using a plurality of layers.

If dummy layers corresponding to the graphic layer 12-2 and the image layer 12-3 are prepared, a layer which is not generated upon cramming can be deleted, as a matter of fact.

Figure 12C:
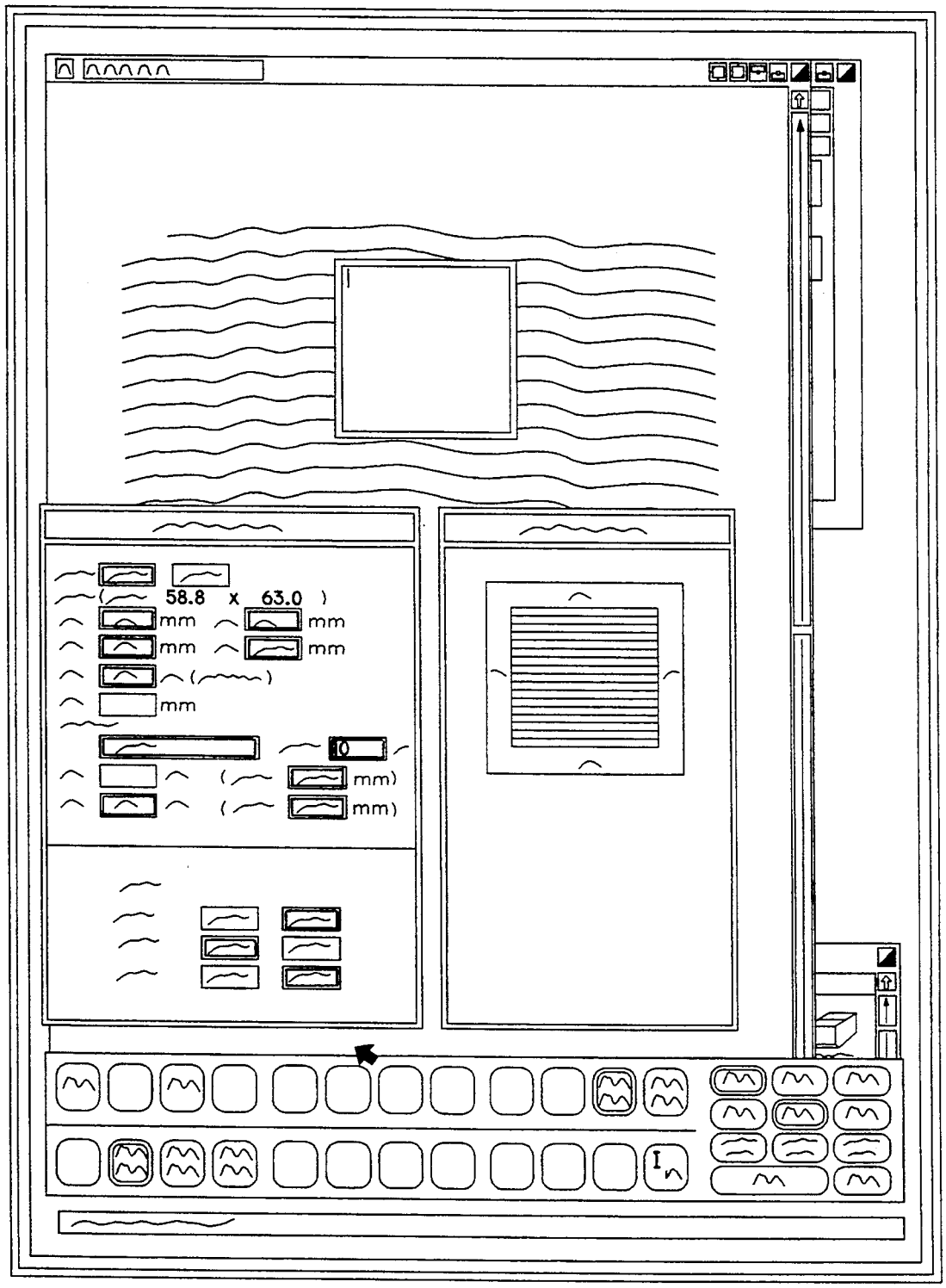

FIG. 12C shows part of a sentence layer format for a frame. The sentence layer is formatted by the corresponding format for paste or cram. A standard format is set for framing, and a cut format is set for paste or cram.

Figure 12D:
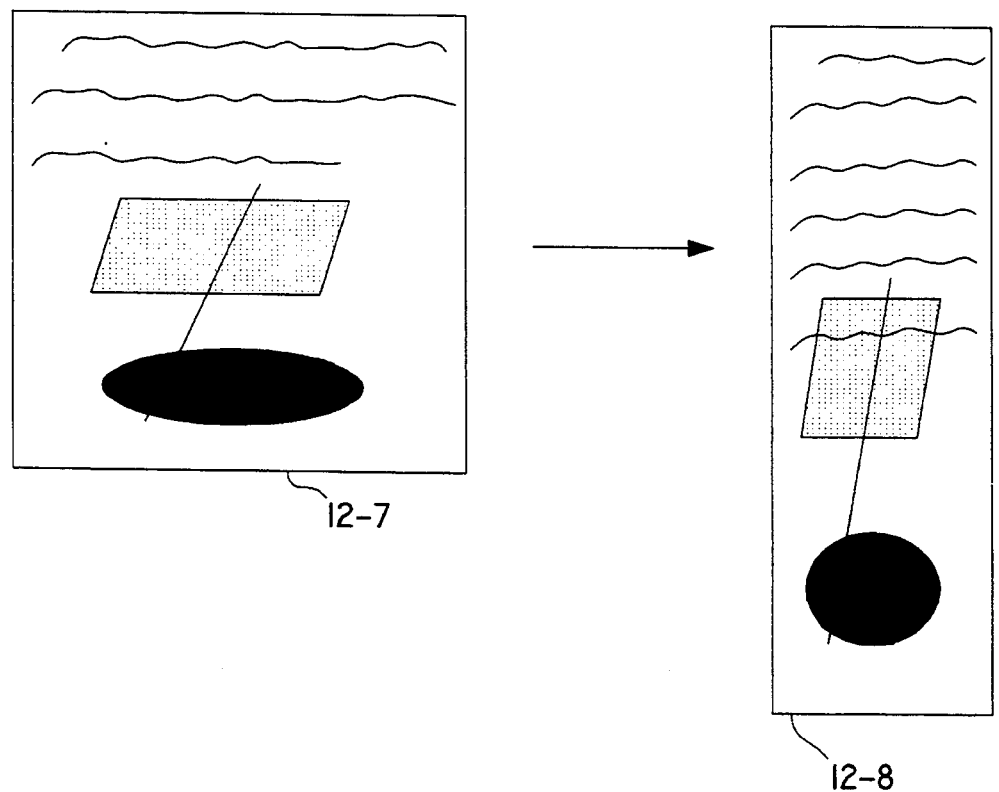

FIG. 12D shows a result wherein a frame 12-7 consisting of a sentence layer and a graphic layer is crammed in a fixed frame 12-8 by the "fixed frame cram" command 6-7. The graphic layer size is variably changed in accordance with the frame size. However, the sentence layer is formatted on the basis of the cut format. In this case, the graphic layer size is changed to obtain a similar graphic layer. However, as a matter of course, the graphic layer can be crammed without variably magnifying its size or by variably magnifying the layer to obtain a similar layer.

The operations for the graphic data can also be applied to an image and a table. The sentence can be developed in the frame 12-8 in accordance with an original format (e.g., a format of the frame 12-7). Therefore, the characters are not deformed, or line spacing and character spacing are not changed to provide characters with good appearance. The image and the graph can be variably magnified on the basis of the frame size, and the image and the graph are not partially omitted and can be fitted in accordance with the frame size.

Figure 13A:
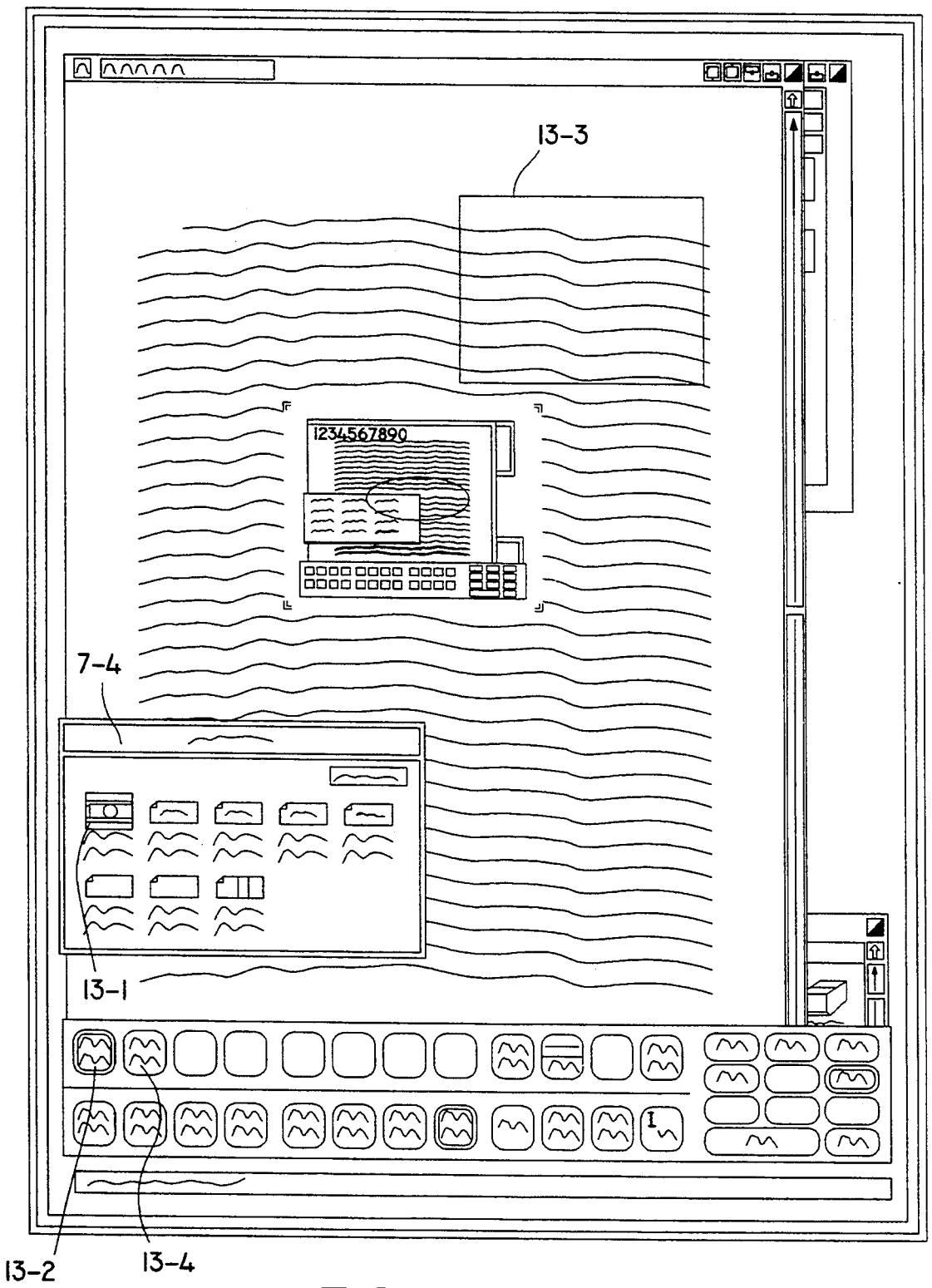
FIGS. 13A and 13B are views for explaining paste processing of a fixed frame.

The "fixed frame paste" con, hand 6-8 in FIG. 6 indicates that the file in a clip board 7-4 is pasted in the same state wherein the file is cut, as shown in FIG. 13A. An "any position" command 13-2 is selected, a cursor of the PD 7-1 becomes a cursor 13-3 having the same size as that of the frame of a designated file 3-1 on the clip board 7-4. Therefore, this cursor can be used as a reference for pasting a layout.

Figure 13B:
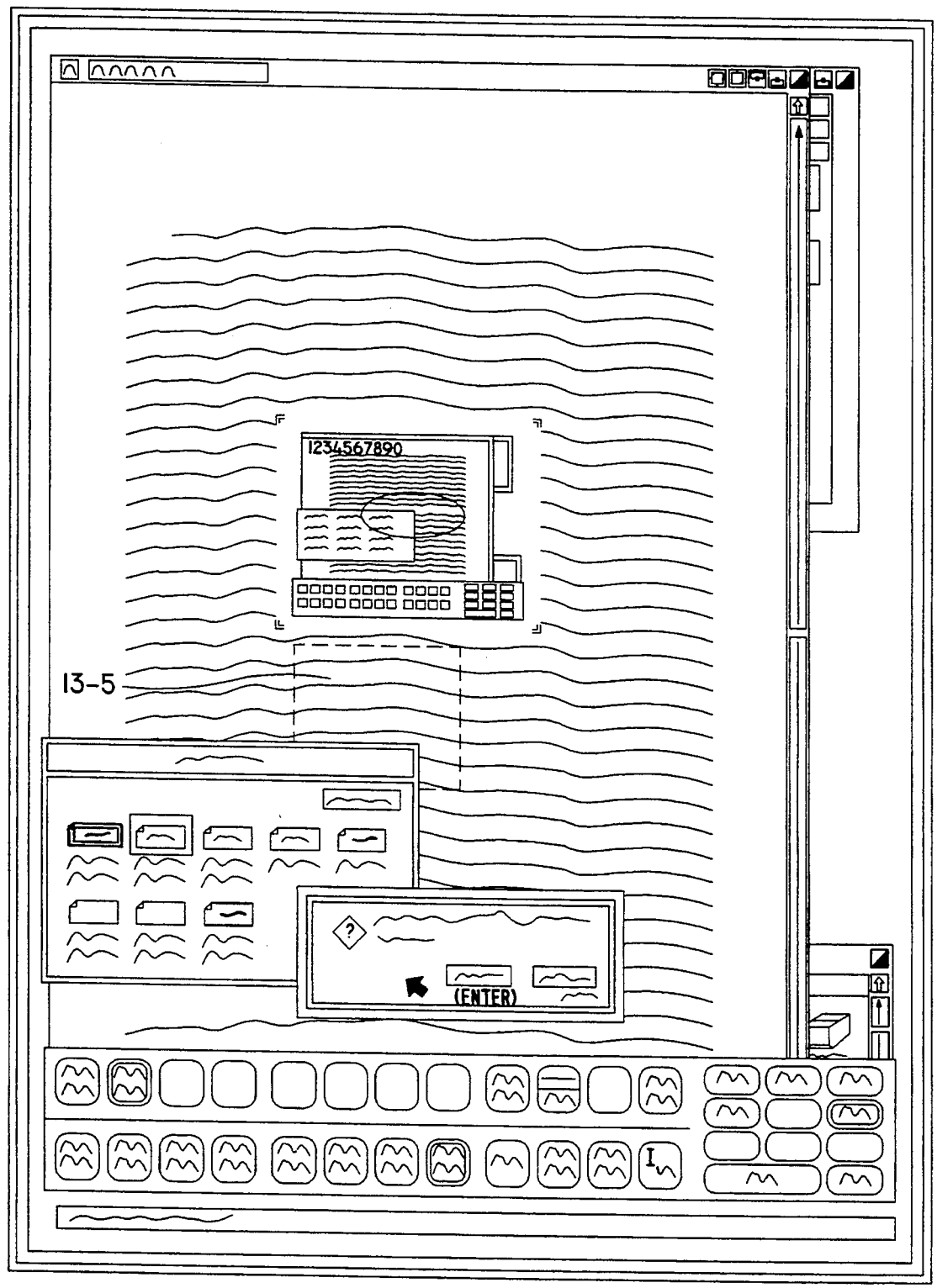

A "storage position" command 13-4 is selected, and the position of the frame sheet and the frame size at the time of cutting as indicated by 13-5 in FIG. 13B are displayed, thereby explicitly representing the position. Therefore, the cut frame can be pasted without being changed. Therefore, frames having identical sizes can be formed at identical positions of desired pages.

The "fixed frame cram" command 6-7 or the "fixed frame paste" command 6-8 can be used to read image data directly from a scanner to cram or paste the read data.

When the "measure" command 6-9 in FIG. 6 is selected, matrix points called a grid are dislayed on the screen, and the display mode can be controlled. An "independent definition" command in FIG. 14 can be used to set desired values of the measure, and a "format storage" command is used to set the grid from the document format. When the grid is determined by the format, a "printing plate" surface, a text character pitch, and a line pitch must be taken into consideration. When framing or pasting is performed by using a grid, the boundaries of the "printing plate" surfaces, characters, and lines can have a good appearance.

A "whole frame in page" command 6-10 in FIG. 6 designates selection of all frames on the screen.

A "screen control" con, hand 6-11 in FIG. 6 designates the manner of the screen display. For example, twice display, four-times display, ½ display, ¼ display, grid display, grid nondisplay, layer display, layer nondisplay, and the like can be designated. A "page" con, hand 6-15 in FIG. 6 is used to display the page presently processed and can designate shift to any page.

Figure 15:
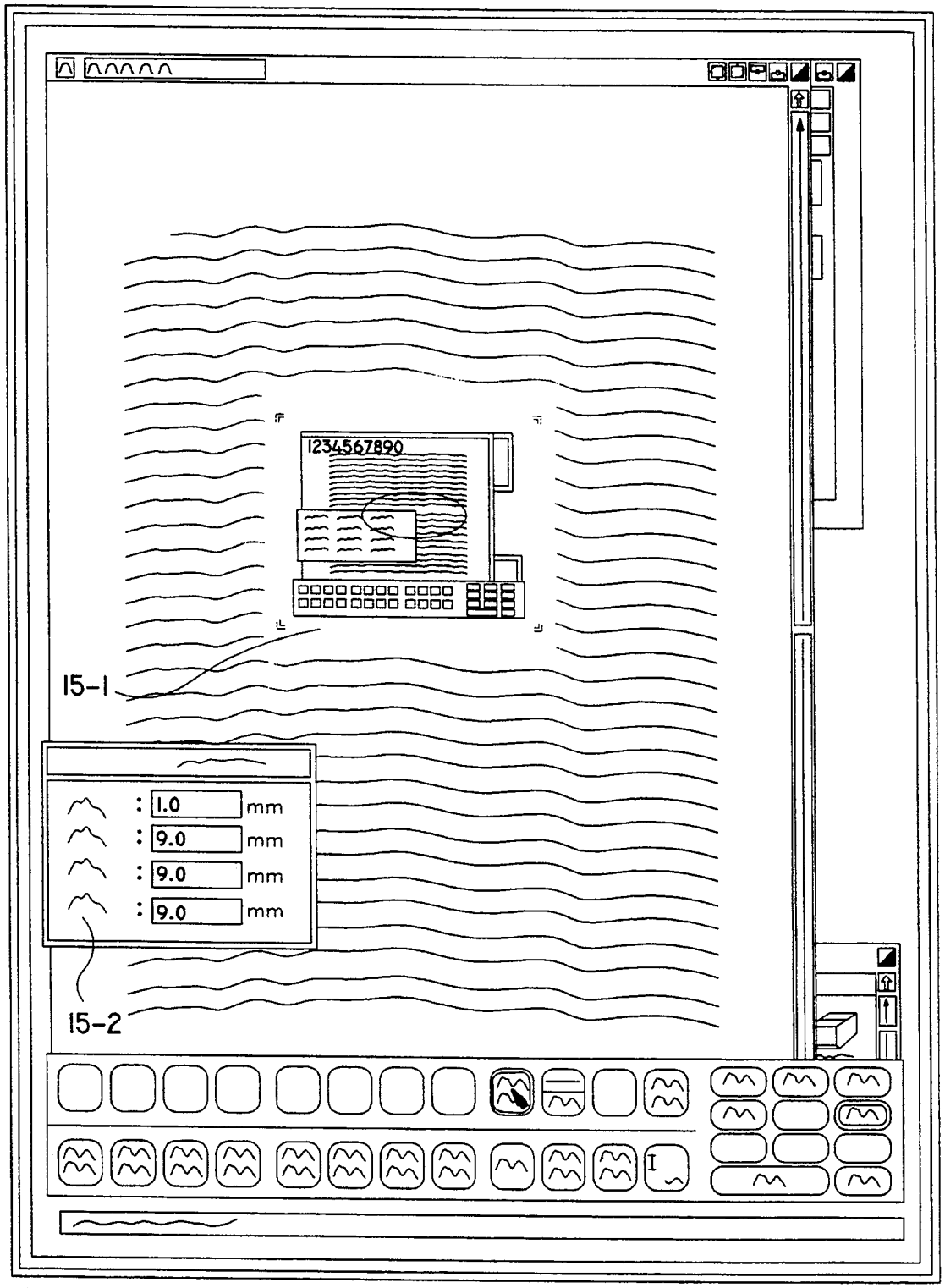
FIG. 15 is a view for explaining an operation for forming an inhibited area around a fixed frame.

An "inhibited area" command 6-12 in FIG. 6 designates formation of a data inhibited area 15-1 around a fixed frame, as shown in FIG. 15.

Figure 16:
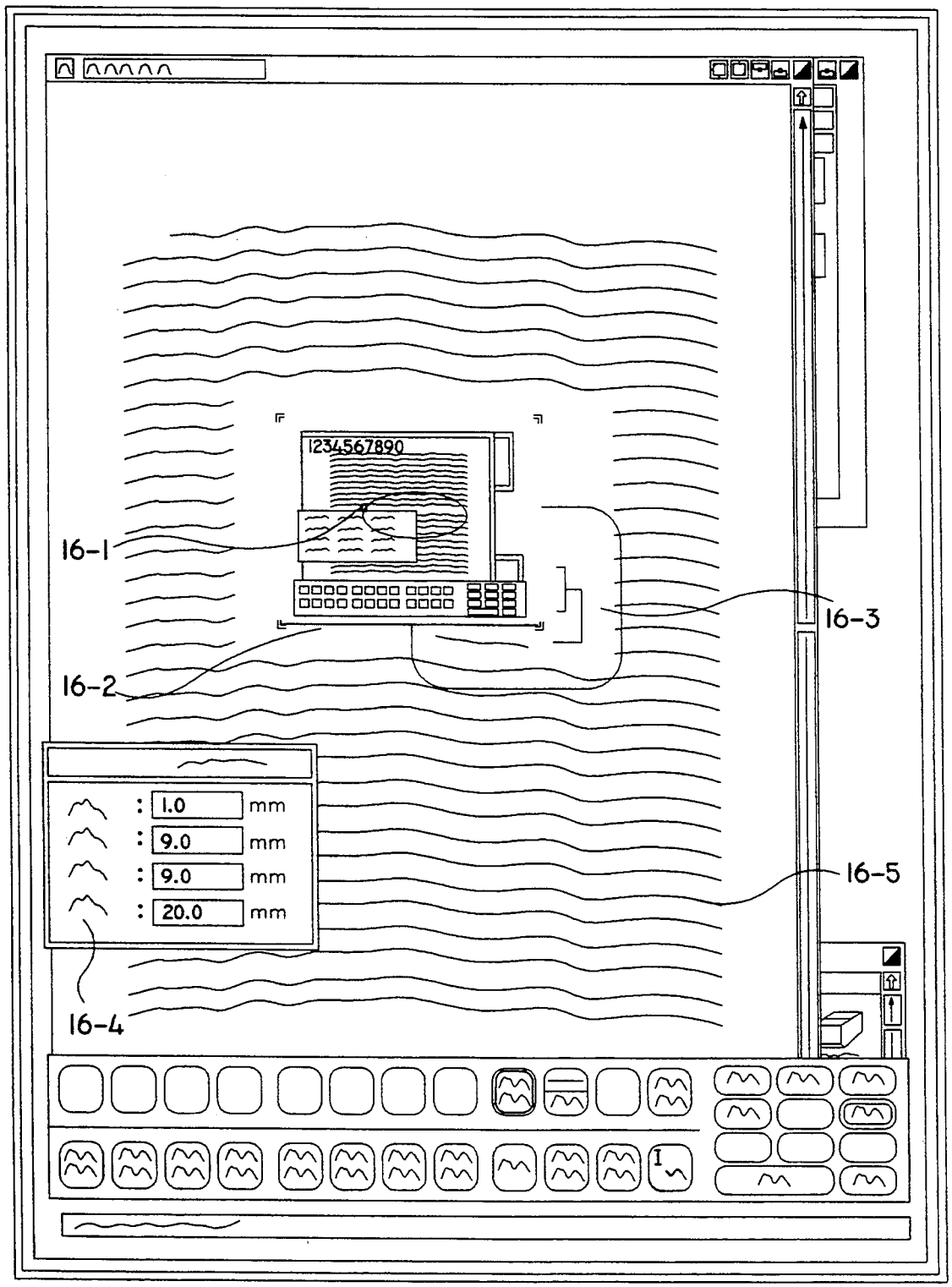
FIG. 16 is a view for explaining an operation wherein a graph is written in the inhibited area.

FIG. 16 shows a relationship between the inhibited area and the background data. An inhibited area 16-4 is set around a fixed frame 16-1. Since the inhibited area influences only a sentence layer 16-5 as the background data, the "inhibited area" command 16-2 controls the sentence layer 16-5 as the background data. However, the "inhibited area" command does not inhibit the layer except for the sentence layer. Therefore, graphic data can be written with, e.g., a graphic layer 16-3.

A "line type" command 6-13 in FIG. 6 designates a type of line of a frame itself.

Figure 17:
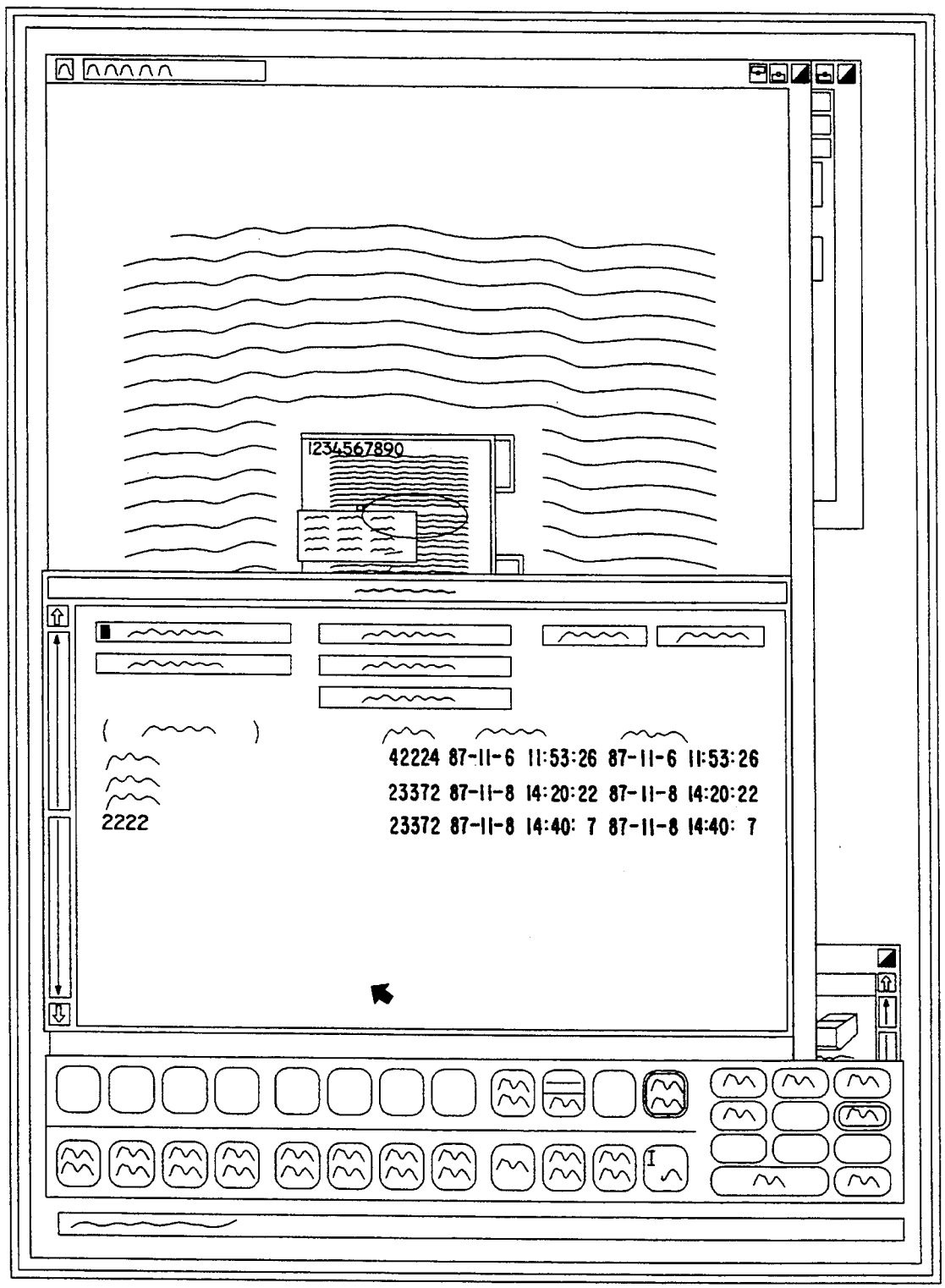
FIG. 17 is a view for explaining image data processing within the fixed frame.

A command 6-14 in FIG. 6 designates processing of image data which is not pasted as a fixed frame, as shown in FIG. 17.

Figure 18:
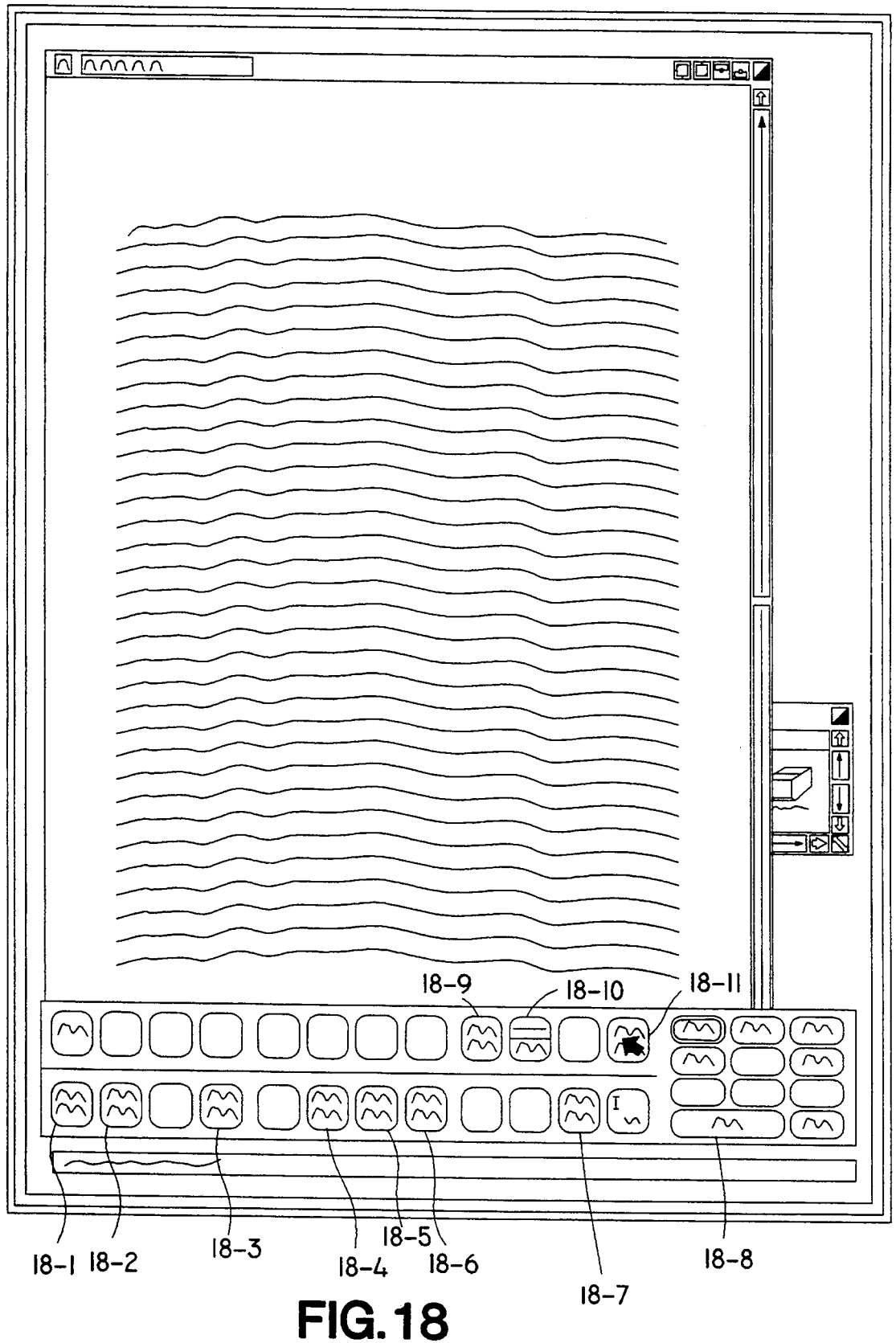
FIG. 18 is a view for explaining an operation when a command menu of a floating frame 5-7 in FIG. 5 is selected.

FIG. 18 is a view showing a state wherein the "floating frame" command 5-7 in FIG. 5 is selected. When a "floating frame framing" command 18-1 is selected, a floating block set-up menu 19-1 shown in FIG. 19A appears. When this command is executed within a line, a floating frame mark 19-2 and a floating frame 19-3 are inserted into a position where the pointing cursor 5-2 is present. Size attributes of the floating frame are determined by the floating block set-up menu 19-1. The size of the floating frame can be determined by a method for designating the number of characters and the number of lines or a method of determining it in millimeters. Upper alignment, centering, or lower alignment of the floating frame position in the line can be performed. In a special case, a floating frame position from a base line of the inserted line can also be changed. The floating frame in this embodiment can enter into a line without the floating frame mark 9-2. In this case, a portion which overlaps the floating frame is overwritten, as shown in FIG. 19C, so that the hidden data may be given as if it is deleted. That is, when the floating frame is set within the line, the frame shown in FIG. 19C is dealt with as one character, so that the character is observed as if it is deleted. This case does to apply a case in FIG. 20A. With the above operation, lines 19-5 and 19-6 can be located to the left and right of the floating frame 19-4, as shown in FIG. 19D.

Figure 19A:
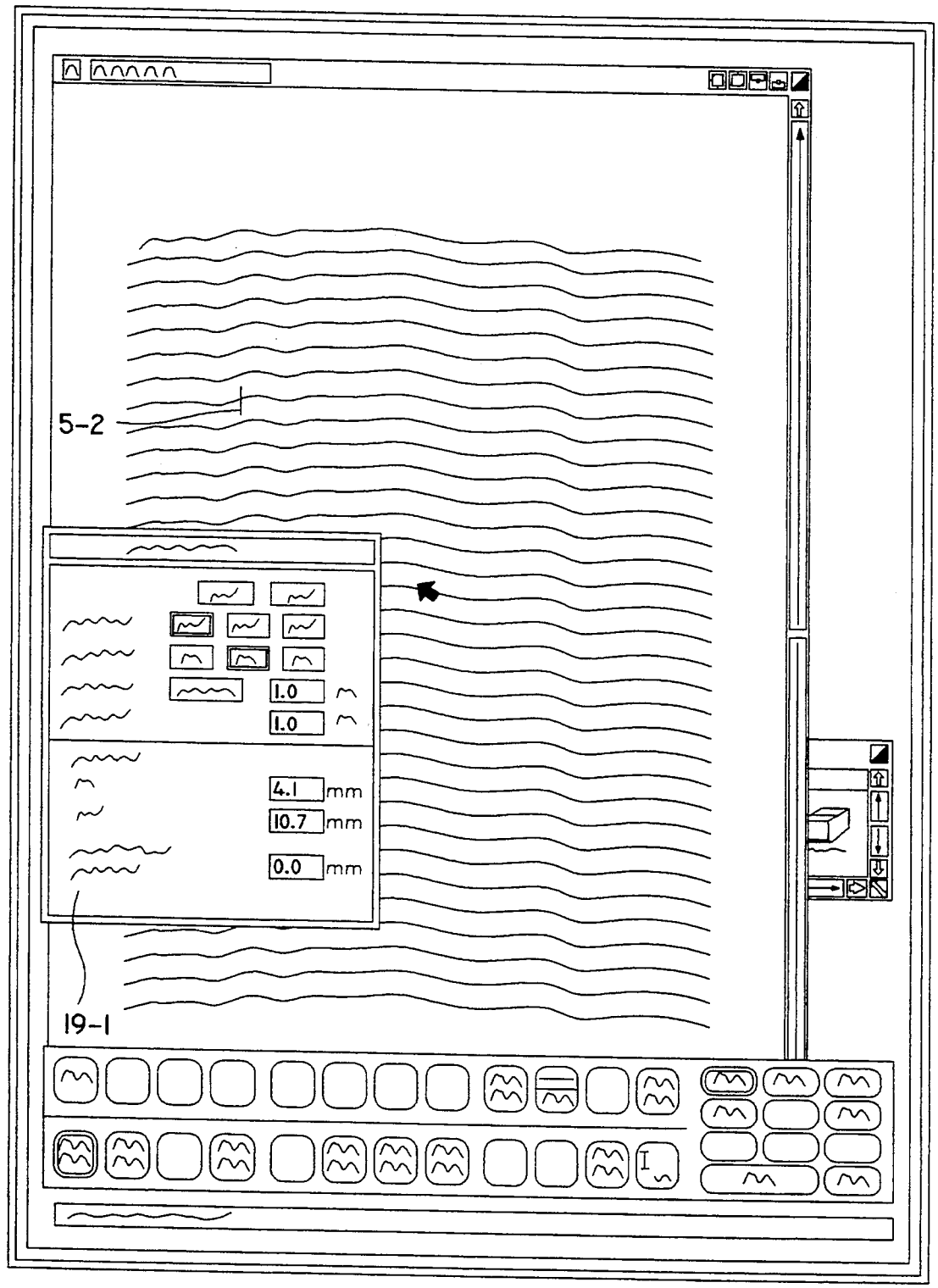
FIGS. 19A to 19E are views for explaining an operation when a command menu in floating frame framing 18-1 in FIG. 18 is selected.
Figure 19B:
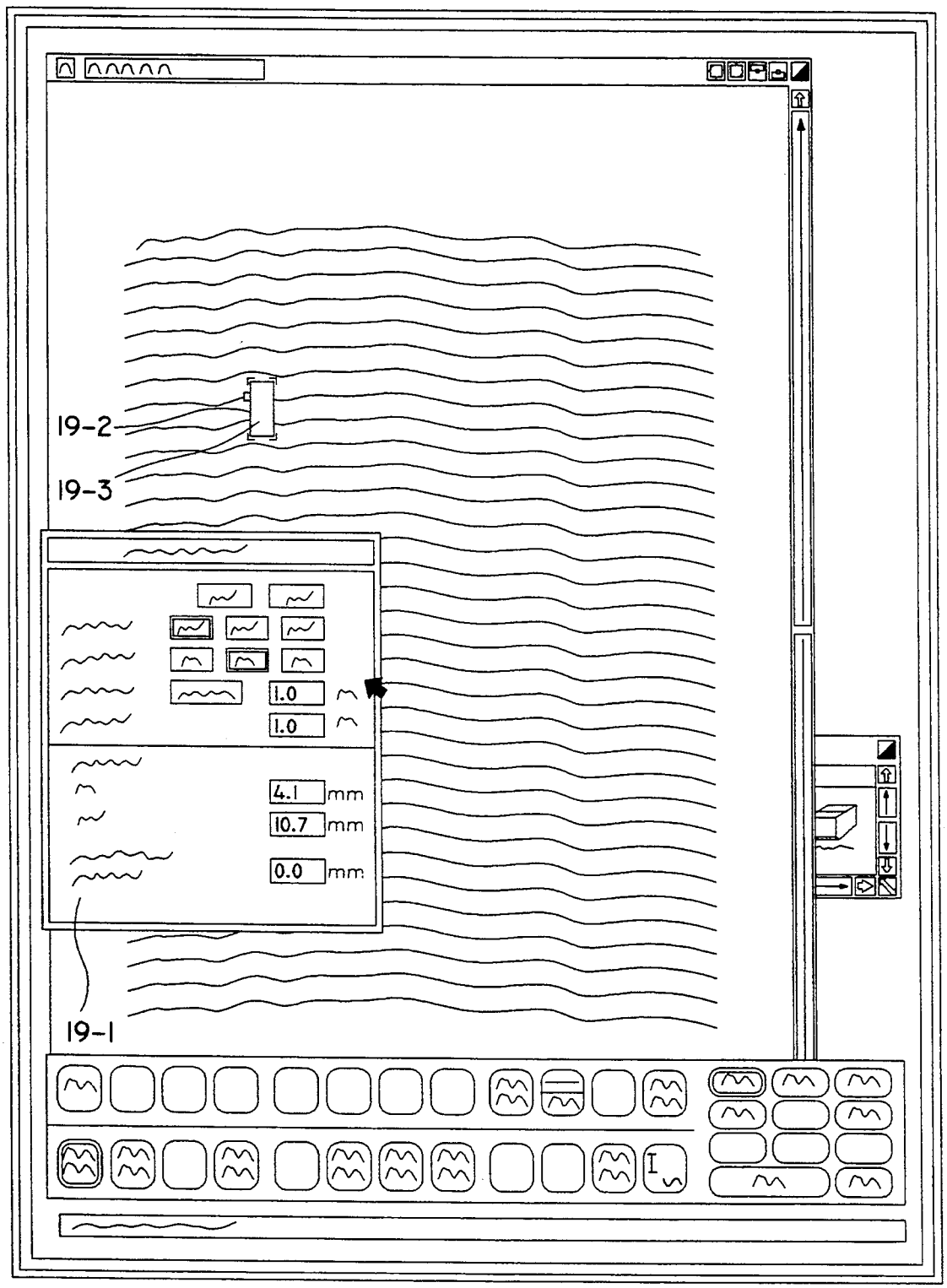
Figure 19C:
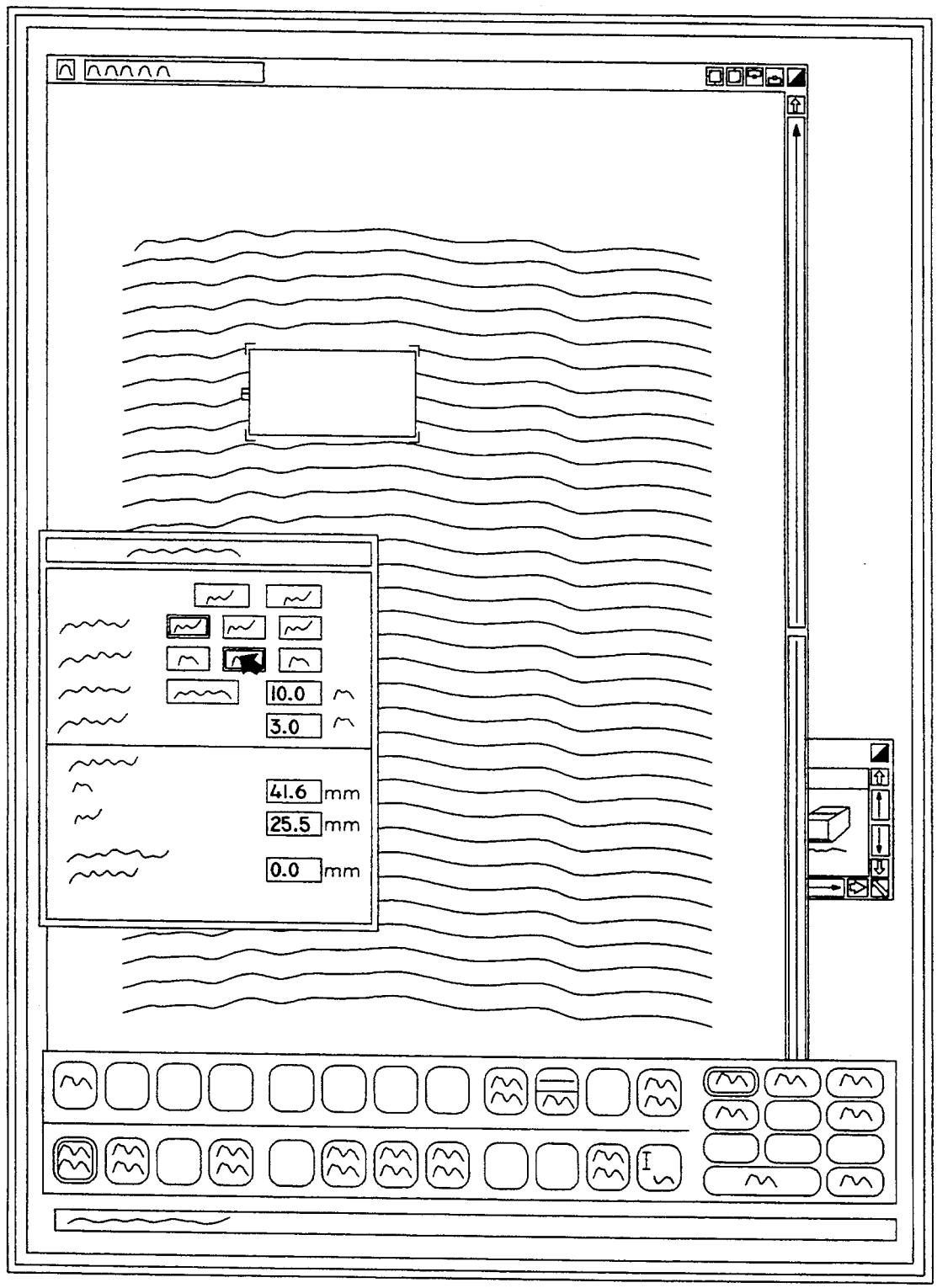
Figure 19D:
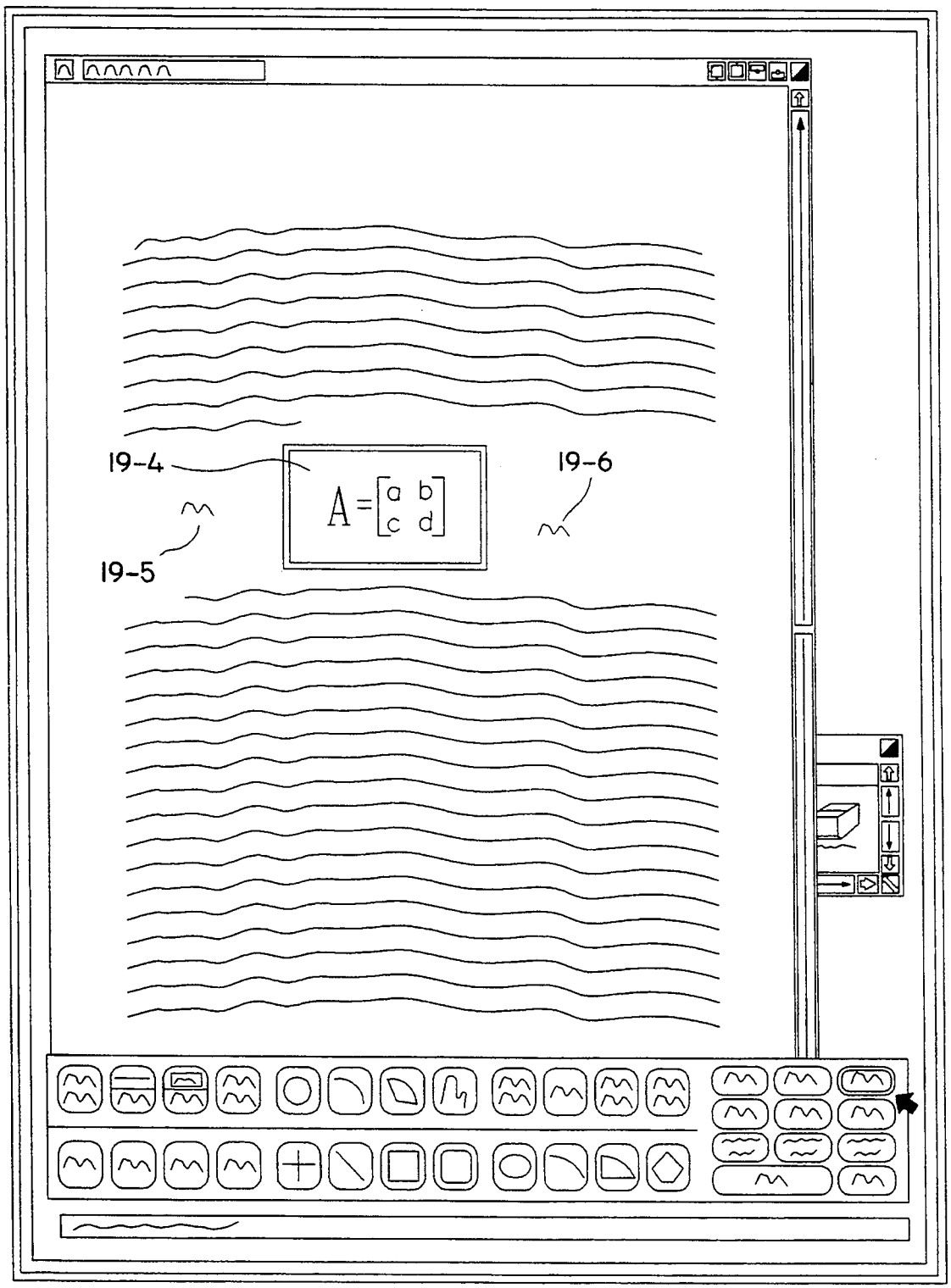
Figure 19E:
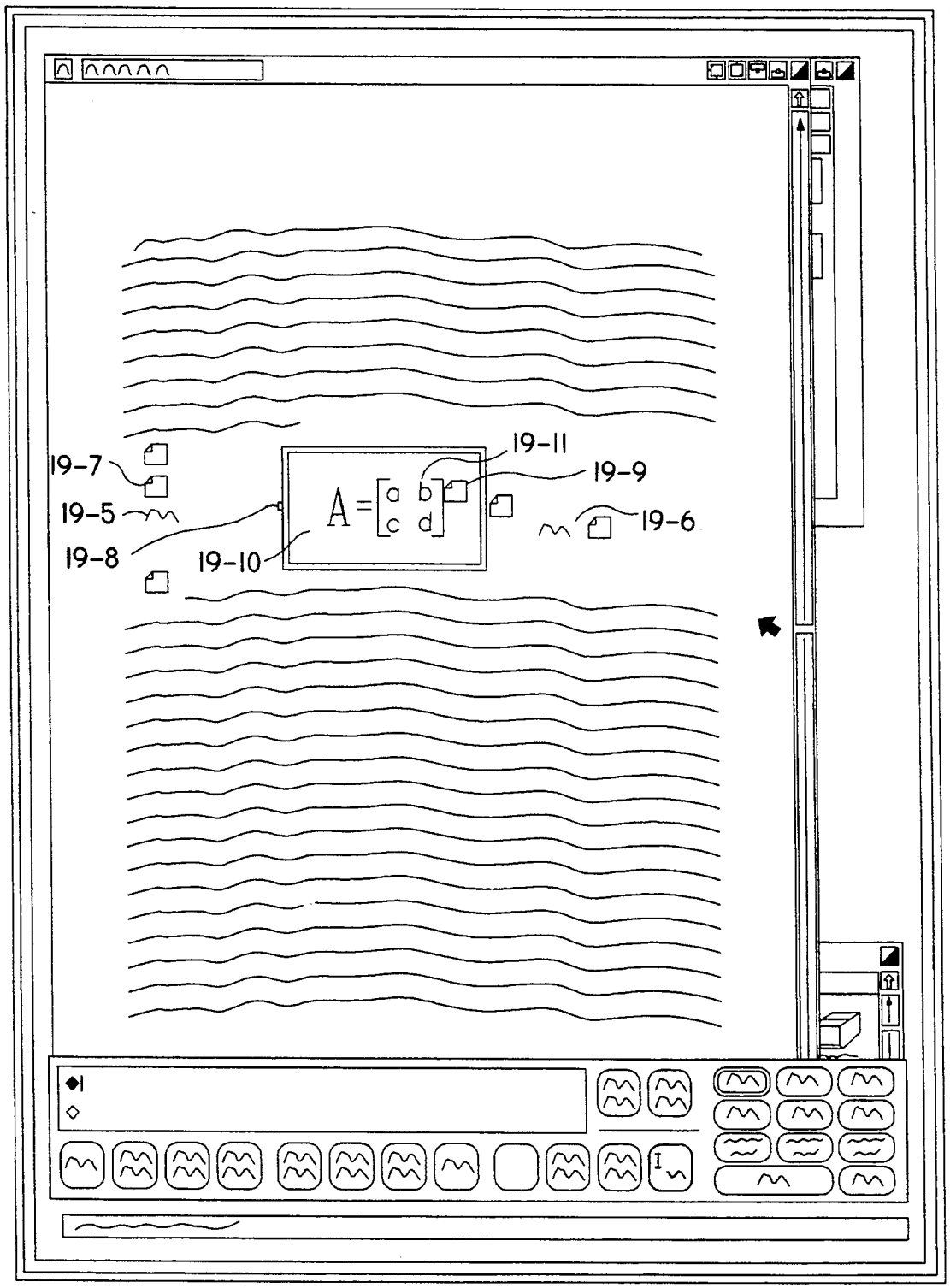

FIG. 19E shows control data such as a line feed 19-7 or the like for the display screen of FIG. 19D. A floating frame 19-10 is dealt with as a character by a floating frame mark 19-8. The floating frame 19-10 has a height larger than the line pitch and enters the previous and succeeding lines. However the line feed 19-7 is entered, the floating frame 19-10 does not interfere the previous and succeeding lines. The line 19-5 is different from the line 19-6. However, when the floating frame 19-10 interferes with the previous and succeeding lines, these lines 19-5 and 19-6 are aligned to the left and right of the floating frame 19-10, respectively.

Figure 20A:
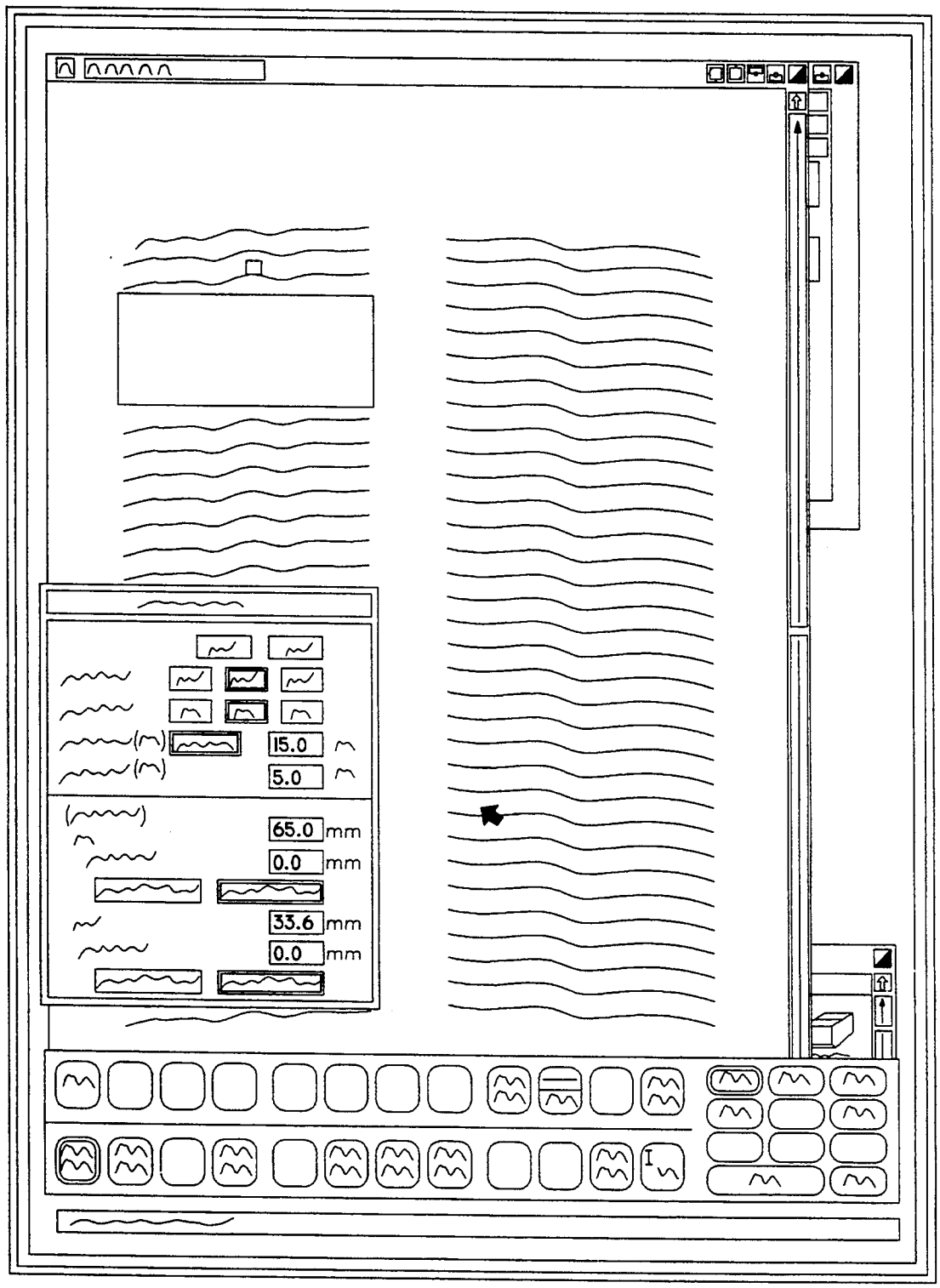
FIGS. 20A and 20B are views for explaining floating frame framing.
Figure 20B:
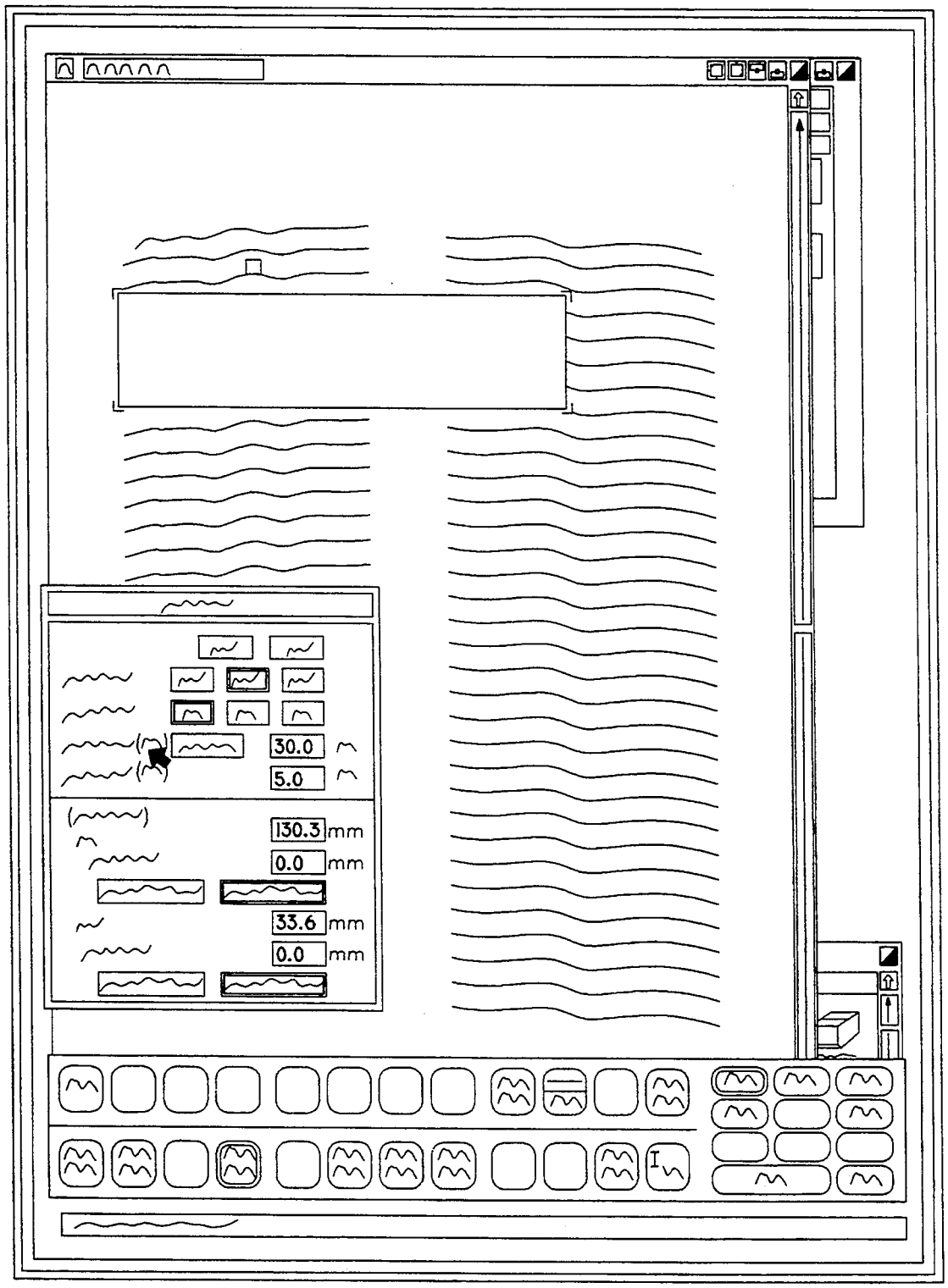

A line feed 19-9 represents a line feed for matrix data 19-11. FIG. 20A is a view showing a state wherein a "floating frame framing" command 18-1 is executed within the column. In this case, the width of the frame is equal to the width of the column, so that framing is performed such that the data is fitted within the column. FIG. 20B shows a case wherein the width of the frame is larger than that of the column. A column portion interfered with by the frame is removed from the frame and is line-fed.

Figure 21A:
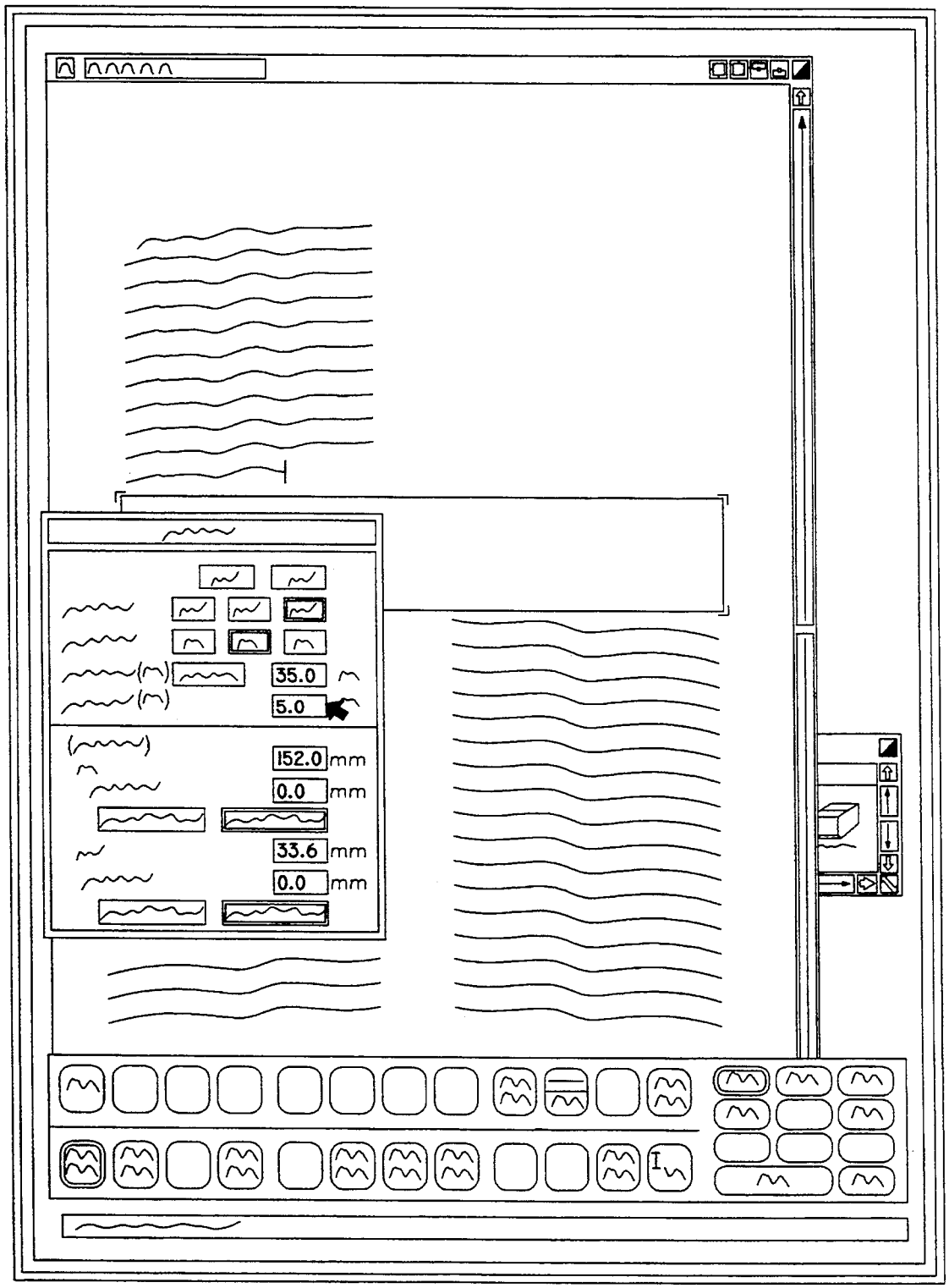
FIGS. 21A and 21B are views for explaining floating frame framing and two-column layout processing.
Figure 21B:
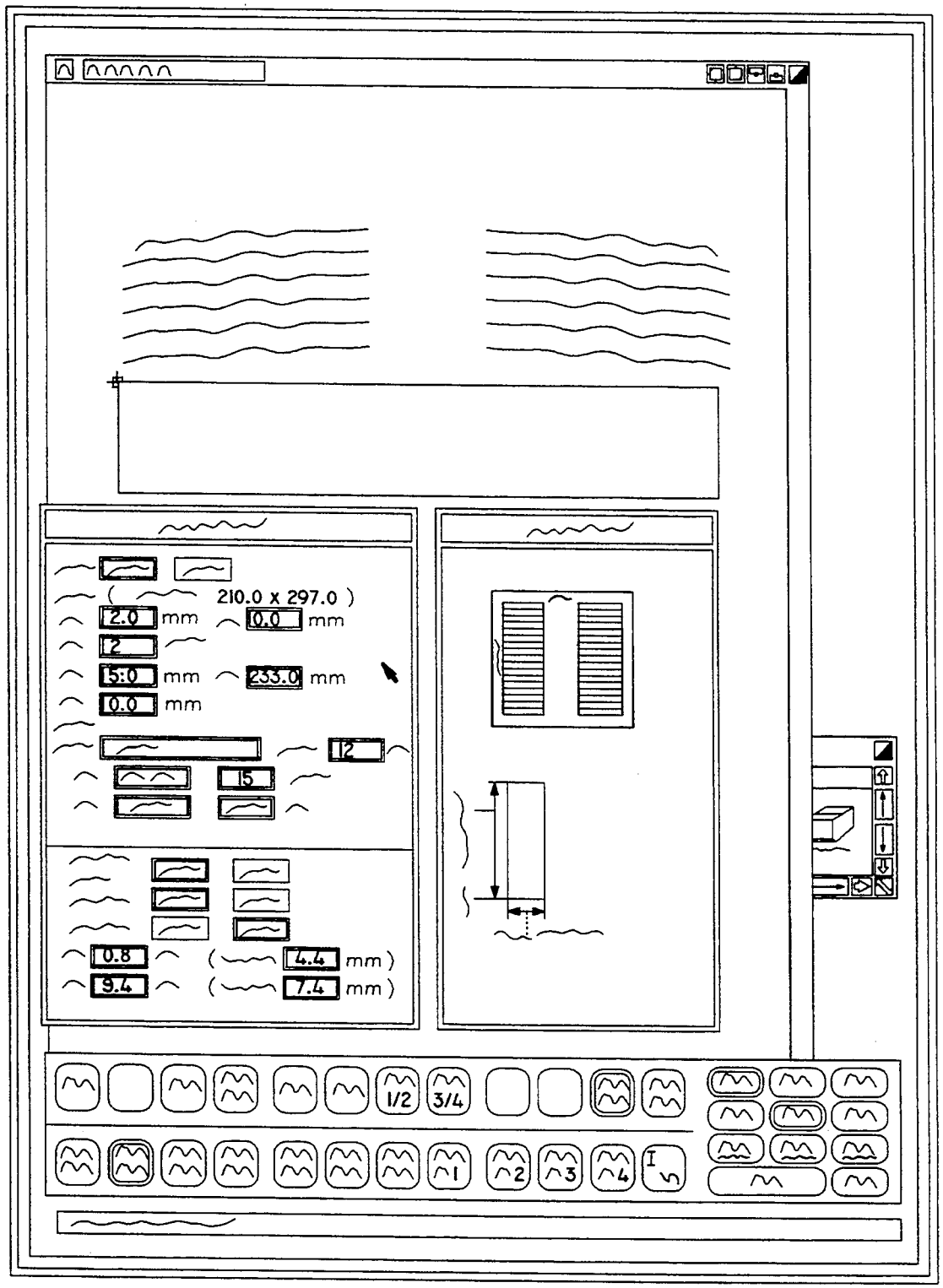

FIG. 21A shows a case wherein the "floating frame framing" command 18-1 is executed in a full measure. Full-measure data in which the floating frame is inserted cannot be converted into that of a half measure or less (two or more columns). The format is set to obtain "multimeasure" or multicolumn layout (the monochromatic inversion indicates selection) shown in FIG. 21B, thereby aligning the data immediately before the floating frame into multicolumn layout.

A "floating frame deletion" command 18-2 in FIG. 18 designates deletion of a floating frame with a pointing cursor when the floating frame displayed during floating frame processing is to be deleted. Since the floating frame in document processing is dealt with as a character, the floating frame can be deleted by using a method of deleting a character.

A "floating frame change" command 18-3 in FIG. 18 is used to change the size and position of the formed floating frame. This can be performed in the same manner as in the "floating frame framing" command 18-1.

A "floating frame fetch" command 18-4, a "floating frame cram" command 18-5, and a "floating frame paste" command 18-6 can be performed in the same manner as the "fixed frame fetch" command 6-6, the "fixed frame cram" command 6-7, and the "fixed frame paste" command hand 6-8 executed for the clip board 7-4.

Data conversion between the floating and fixed frames can be performed through the clip board 7-4.

A "screen control" con, hand 18-7, a "page" command 18-8, an "inhibited area" command 18-9, a "line type" con, hand 18-10, and a "paste image" con, hand 18-11 are the same as the "screen control" command 6-10, the "page" con, hand 6-15, the "inhibited area" command 6-12, the "line type" command 6-13, and the "paste image" con, hand 6-14 of the fixed frames, and a detailed description thereof will be omitted.

The present invention has been described in detail with respect to the displayed data. The present invention will be described in detail with respect to the internal data and flow charts hereinafter.

Fixed Frame Control Table

FIG. 22 shows a format of fixed frame information formed when a document is read from the DISK 1-6 to the main memory 1-5. Frame control information 22-1 is data representing information associated with data within a fixed frame, a page number, and a priority order. The priority order indicates an order of generation of the fixed frames and more particularly an order of display when a plurality of frames overlap. A line type 22-2 represents types of lines of fixed frames and more particularly the type of line, a line color, and a line width. Upper left coordinates 22-3 represent upper left X and Y coordinate data of the frame. Size information 22-4 represents a width and a height of a frame. An inhibited area 22-5 of a fixed frame represents values of an inhibited area in the upper, lower, left, and right directions. A fixed frame data address 22-6 represents an address of data (format data, sentence data, graphic data, or image data) formed in the fixed frame. A fixed frame data size 22-7 represents a data size of data (format data, sentence data, graphic data, or image data) formed in the fixed frame.

Data Structure of Floating Frame Information

A data structure of floating frame information formed in sentence data will be described with reference to FIGS. 23A and 23B.

Figure 23A:
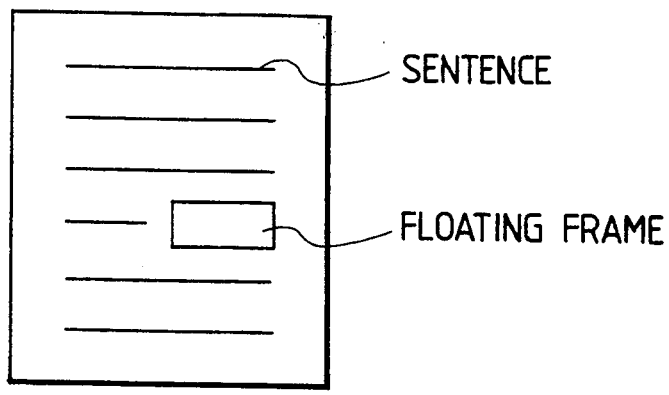
FIGS. 23A and 23B are views for explaining a data structure of floating frame information.
Figure 23B:
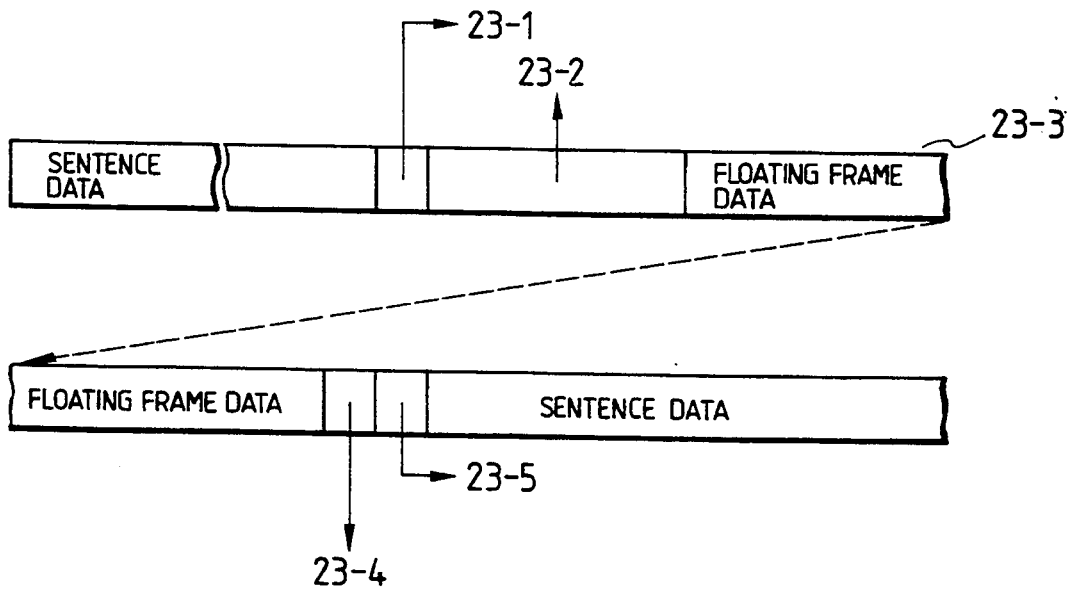

FIG. 23A shows document data in a state wherein a floating frame is formed therein. FIG. 23B is a view for explaining the data structure of the document data. When the floating frame is formed in the document data, floating frame information and floating frame data are added in the document data, as is apparent from FIGS. 23A and 23B. A floating frame start con, hand 23-1 designates the start of data representing the floating frame information. A floating frame command parameter 23-2 represents attribute information of the floating frame. This parameter will be described in detail later. Floating frame data 23-3 includes data (format data, sentence data, graphic data, and image data) formed in the floating frame. A floating frame data length 23-4 represents a data length from the floating frame start command 23-1 to the floating frame end command 23-5. The floating frame end command 23-5 represents the end of the floating frame information and the floating frame data.

Floating Frame Command Parameter

FIG. 24 shows a structure of the floating frame command parameter 23-2 shown in FIG. 23. A floating frame data length 24-1 is data representing a data length from the floating frame start con, hand 23-1 to the floating frame end command 23-5 in FIG. 23. A flag 24-2 represents attribute information of the floating frame and more particularly offset information of width and height in determining the number of columns, a base line, shift, and intracolumn or full-measure determination. A frame line type 24-3 of the floating frame represents the type of line, a line color, and a line width. Size information 24-4 of the floating frame represents the width and height of the frame. In this case, the frame size is given as numeric values in units of 1/10 mm. A floating frame offset 24-5 represents offset values in the directions of character and line. Floating size information 24-6 is the same as the size information 24-4 and represents the width and height of the frame which are represented by the number of characters and the number of lines. A floating frame inhibited area 24-7 represents inhibited area values of the floating frame in the upper, lower, left, and right directions. A floating frame data size 24-8 represents a size of data (format data, sentence data, graphic data, and image data) formed in the floating frame.

Floating Frame Control Table

Figure 25:
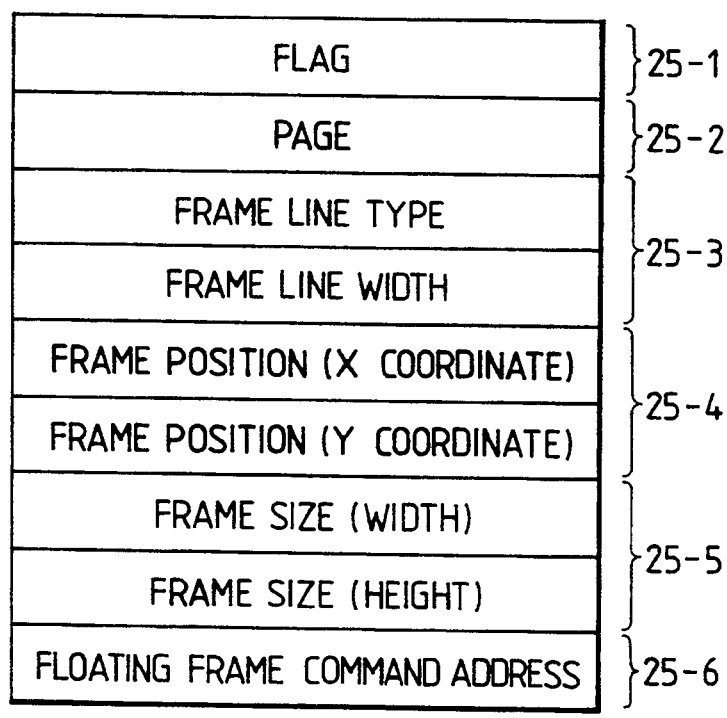
FIG. 25 is a view showing a floating frame control table.

FIG. 25 shows a structure of floating frame information when a document is read from the DISK 1-6 to the main memory 1-5. A flag 25-1 is the same as the flag 24-2. A page 25-2 represents the number of document pages in which the floating frame is formed. A floating frame line 25-3 represents the type of line, a line color, and a line width. Floating frame upper right coordinates 25-4 represent upper left X and Y coordinate data of the floating frame. Floating frame size information 25-5 represents a width and a height of the floating frame. A floating frame command address 25-6 represents a floating frame command parameter start position of sentence data in a presently edited data.

Fixed Frame Editing Processing

Figure 26A:
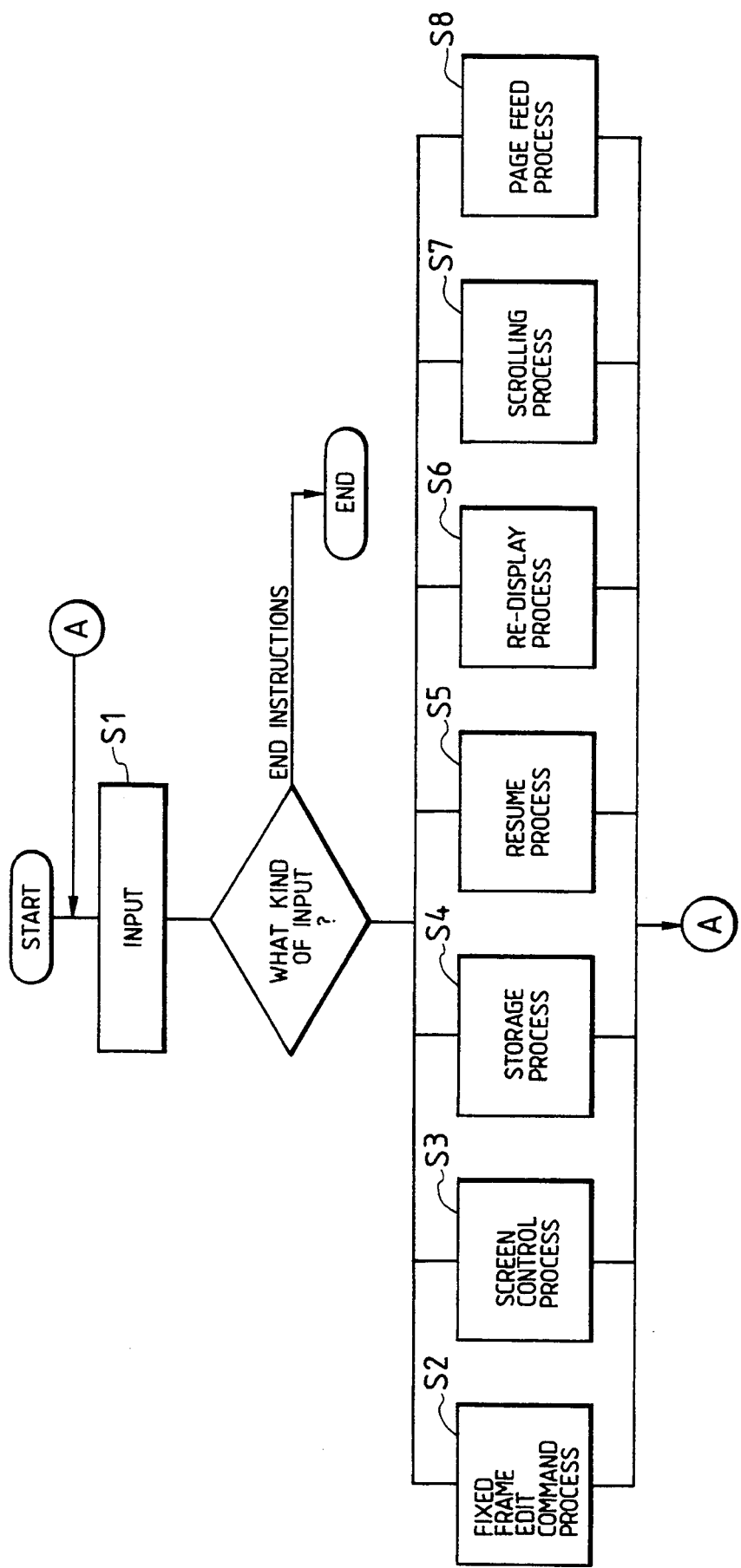
FIGS. 26A and 26B are flow charts for explaining the overall operation of fixed frame editing processing.

FIG. 26A is a flow chart for explaining fixed frame editing processing shown in FIG. 6. Screen instructions by the PD 1-7 and key input data from the KBD 1-8 are analyzed (step S1), and corresponding operations are performed as follows.

When the image control command 6-11 is input, image control processing is performed. In image control processing, display of enlargement/reduction of the screen, display of the grid and the measure, and display of respective data (form data, image data, graphic data, wordprocessor data, etc.) are designated in step S3.

When the storage command 6-16 is input, storage processing is performed. In storage processing, the original document file is updated to the present editing condition. A message for causing an operator to confirm updating is displayed, so that the operator performs storage processing in step S4.

When a resume command 6-17 is input, resume processing is performed. In resume processing, the state wherein processing is started from the present editing state or the state wherein storage is finally performed is restored. A message representing execution of resume processing is displayed. The operator confirms and starts resume processing in step S5.

When re-display is designated, re-display processing is executed in step S6. In re-display processing, the present editing document page is rearranged by layout processing and the rearranged page is displayed.

When scroll processing is designated, scroll processing is executed in step S7. In scroll processing, the screen is scrolled in accordance with designation, and the scrolled screen is re-displayed.

When page feed is designated, page feed processing is performed in step S8. In page feed processing, a page designated by the page feed command 6-15 or the previous or next page of the presently edited document page is displayed.

When any other fixed frame editing command is input, it is executed in step S2.

Figure 26B:
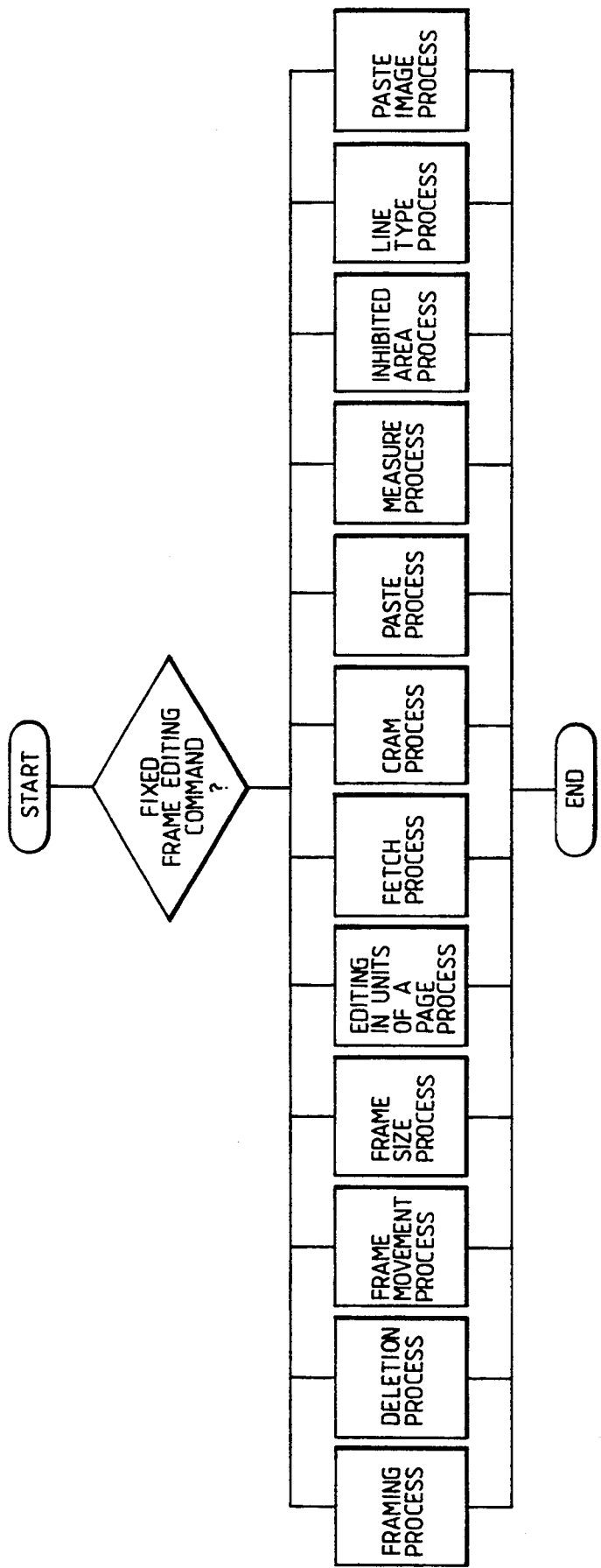

FIG. 26B is a flow chart for explaining fixed frame edit command processing, showing execution of a command (6-1 to 6-10 in FIG. 6) corresponding to screen display with the PD 1-7 or key input on the KBD 1-8.

Execution of these fixed frame edit commands will be described below.

Fixed Frame Framing Processing

Figure 27:
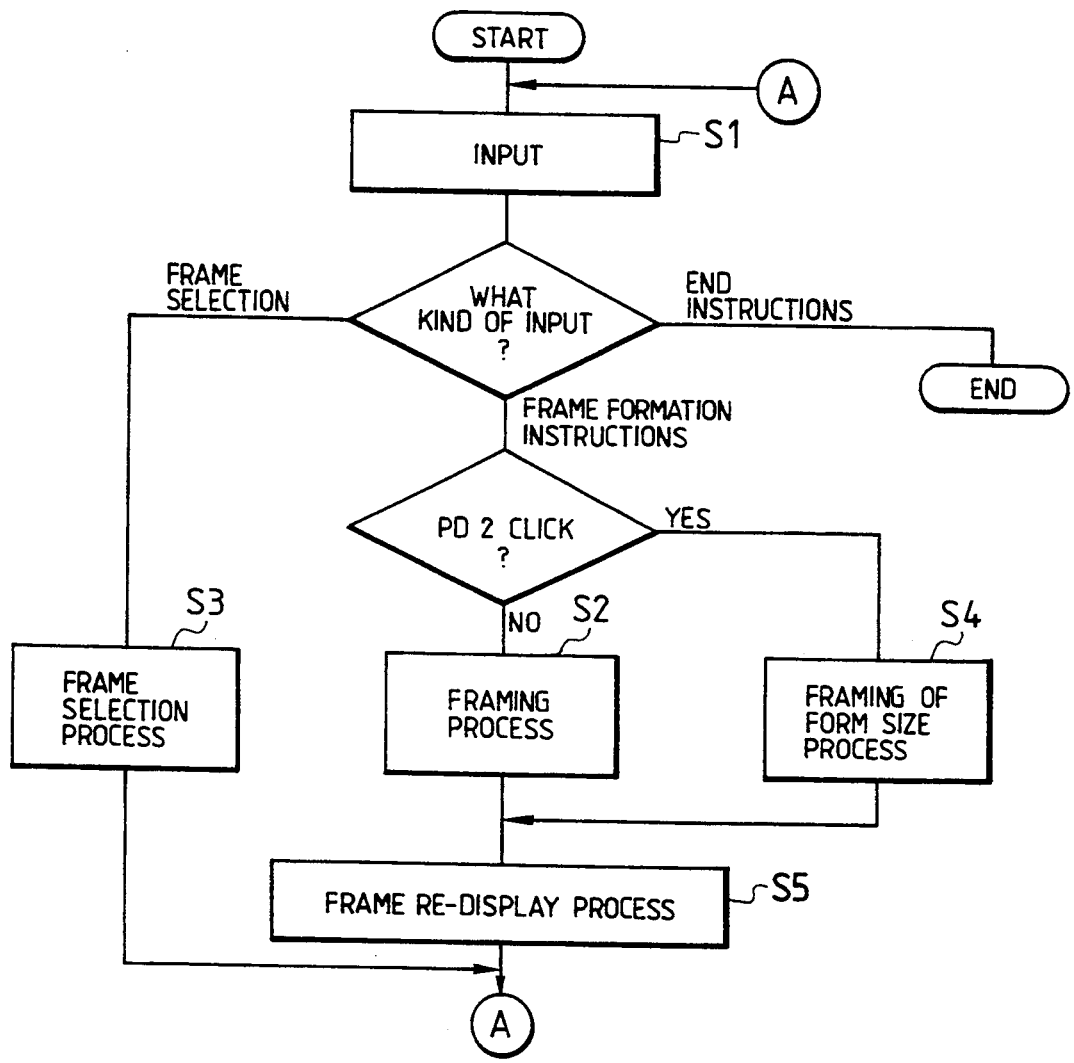
FIG. 27 is a flow chart for explaining fixed frame framing processing.

FIG. 27 is a flow chart for explaining fixed frame framing shown in FIG. 7A.

When an input of the start point 7-1 from the PD 1-7 is detected (step S1), framing processing is executed in step S2. In framing processing in step S2, addresses of the VRAM 1-2 are determined by the end points 7-2 designated with the PD 1-7. The frame 7-3 defined by the diagonal points as the start and end points is developed in the VRAM 1-2.

At this time, if a grid fitted mode 35-1 (FIG. 35B) of the measure table set on the edited document page is designated to be "fitted", the start and end points 7-1 and 7-2 are adjusted to grid points.

In framing processing in step S2, the fixed frame control table shown in FIG. 22 is formed in the main memory 1-5. The frame control tables of fixed frames formed in the editing document are developed in the order of generation in the main memory 1-5.

The address data of the start and end points 7-1 and 7-2 are used to generate a frame position of the formed fixed frame and the frame size and to write the frame position and the frame size in the corresponding storage areas in the fixed frame control table.

If the input (step S1) from the PD 1-7 designates a position inside the formed fixed frame, frame selection processing is executed in step S3. In frame selection processing in step S3, symbols 7-5 are displayed at the four corners of the selected frame so as to represent a selection state (this state will be referred to as a selection state hereinafter).

If the input (step S1) from the PD 1-7 in step S1 represents data on the display screen 5-1 of the document sheet outside the fixed frame and also represents a PD 2 click, a fixed frame having the size equal to that of the sheet size is formed and displayed. In this case, the fixed frame control table shown in FIG. 22 is formed in the main memory 1-5, and the frame position and the size of the formed fixed frame are stored in the corresponding storage areas of the fixed frame control table (step S4).

Fixed Frame Deletion Processing

FIG. 28 is a flow chart for explaining fixed frame deletion processing shown in FIG. 7B.

When the fixed frame deletion command 6-2 is selected by the PD 1-7 or the KBD 1-8, the clip board screen 7-4 is displayed. The data files presently stored in the clip board are displayed by icons which represent the types of data (step S1).

When a fixed frame to be deleted from the document sheet is selected by the input (step S2) from the PD 1-7 or the KBD 1-8, the fixed frame (or a plurality of fixed frames) can be set in the selection state, and a message for confirming deletion is displayed on the screen. The operator confirms the message and deletes the fixed frame control table of the selected fixed frame in the main memory 1-5. Therefore, the deleted fixed frame disappears from the screen (step S3).

When a data icon on the clip board screen is selected by the input (step S2) from the PD 1-7 or the KBD 1-8, the selected icon is displayed in an inverted manner, and a message for requesting deletion is displayed. The operator confirms the message and deletes the selected data file from the clip board. At the same time, this icon is erased from the clip board screen (step S4).

Fixed Frame Movement Processing

FIG. 29A is a flow chart for explaining fixed frame movement processing shown in FIG. 8A.

When the fixed frame movement command 6-3 is selected by the PD 1-7 or the KBD 1-8, the fixed frame movement menu (8-1 to 8-4) is displayed at the upper portion of the fixed frame edit command menu (step S1). At this time, the "up, down, left, and right" movement processing (step S3) is selected as the first step of fixed frame movement.

Any other movement operation ("this side" movement (step S4), "backward" movement (step S5) or page movement (step S6) of fixed frame movement processing) can be selected by the input (step S2) from the PD 1-7 or the KBD 1-8.

These operations of frame movement will be described below.

"Up, Down, Left, and Right" Movement Processing

Figure 29B:
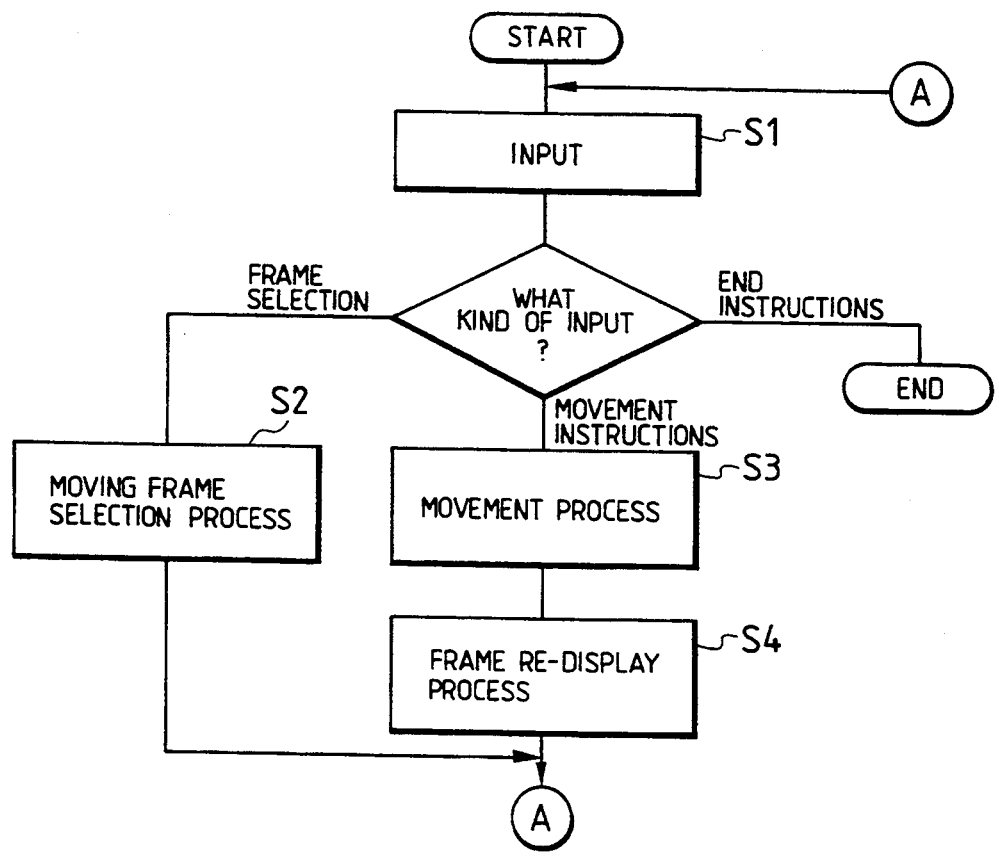

FIG. 29B is a flow chart for explaining fixed frame "up, down, left, and right" movement processing shown in FIG. 8B.

A fixed frame to be moved on a document sheet is selected by an input (step S1) from the PD 1-7 or the KBD 1-8, the fixed frame (a plurality of frames) is set in the selection state.

In movement processing, a plurality of fixed frames can be simultaneously selected. When the "whole frame in page" command 6-11 is input, all fixed frames on the presently edited page are set in the selection state. When the fixed frame is designated by the PD 1-7 while the "continuous" key on the KBD 1-8 is kept depressed, the designated fixed frames are sequentially set in the selection state. When a selection rectangle is drawn on the display screen by the PD 1-7, all fixed frames included in the rectangle are set in the selection state.

When the PD 1-7 is kept depressed for one of the selected fixed frames, a relative movement amount is calculated from the presently designated position of the PD 1-7 and the immediately preceding position designated by the PD 1-7. The selected fixed frame is moved by this movement amount. This operation is repeated until depression of the PD 1-7 is released.

At this time, the grid fitted mode 35-1 of a measure table (FIG. 35B) set in the editing document page is designated to be "fitted", the designation position of the PD 1-7 is adjusted to the grid position, and the movement amount of the fixed frame becomes the grid space unit.

When a measure is displayed on the editing document page, the pointing cursor of the PD 1-7 is changed into a cross cursor 8-5 using the upper left position of the designated frame as the center.

Only the frame line is displayed for the fixed frame during movement to increase the processing speed, and the frame is moved (step S3).

When a depression input of the PD 1-7 is completed, the original position display of the moved fixed frame is deleted. The fixed frame and its data are re-displayed at the destination position. At the same time, X and Y coordinate values of a frame position 22-5 (FIG. 22) of the fixed frame control table corresponding to the moved fixed frame are updated on the basis of the movement amount.

"This Side" Movement Processing

Figure 29C:
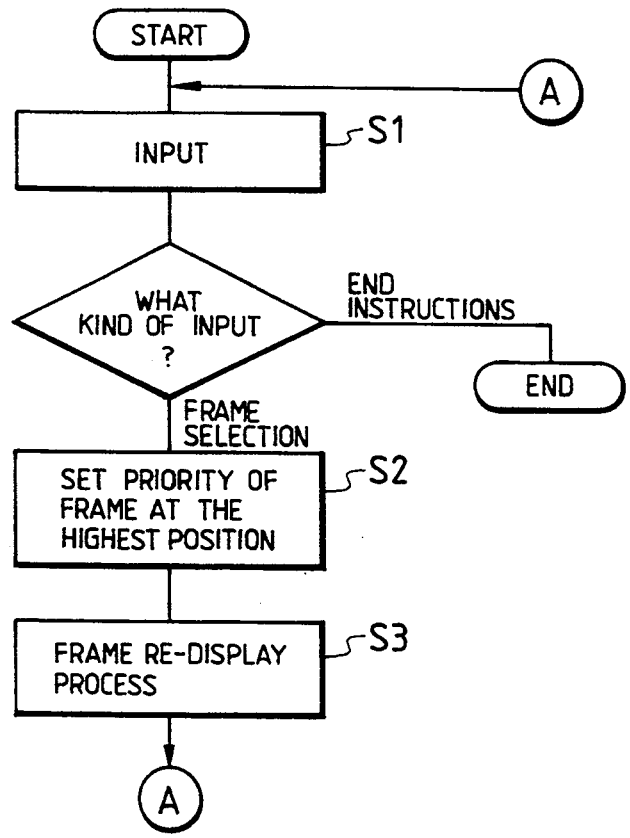

FIG. 29C is a flow chart of fixed frame "this side" movement processing shown in FIG. 8C.

When a fixed frame to be moved on the document sheet is designated by an input (step S1) from the PD 1-7, the priority of frame control information 22-1 of the fixed frame control table (FIG. 22) is set at the highest position (i.e, order).

Figure 29D:
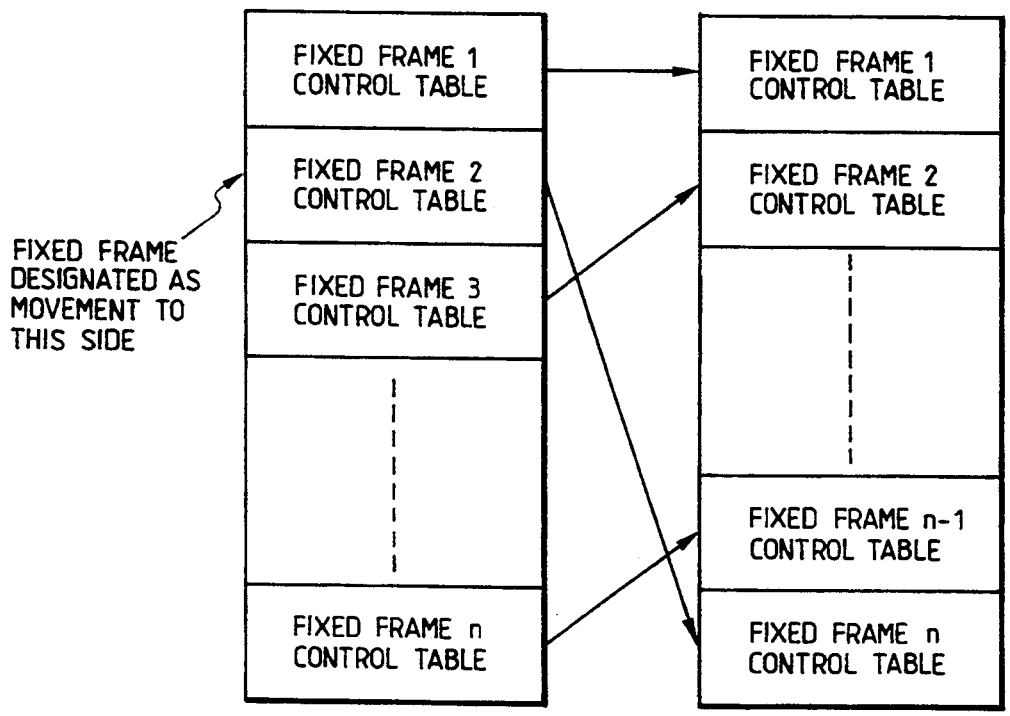

That is, as shown in FIG. 29D, the order of the fixed frame control data tables of the presently edited document page, which tables are developed in the main memory 1-5, is changed. The fixed frame control table moved to "this side" is set to the "backward" side of the fixed frame tables (step S3). The moved fixed frame is re-displayed (step S4).

Backward Movement Processing

Figure 29E:
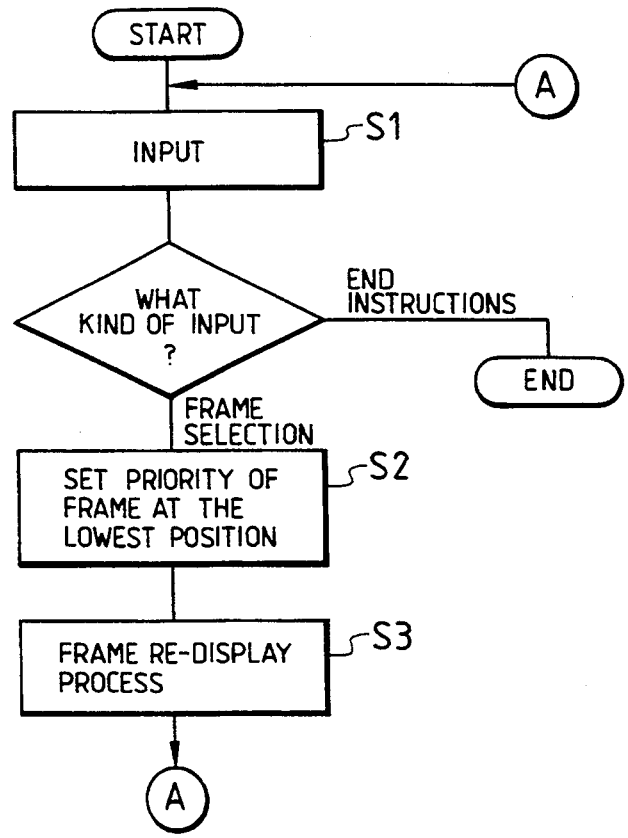

FIG. 29E is a flow chart for explaining fixed frame backward movement processing shown in FIG. 8D.

When a fixed frame to be moved on the document sheet is selected by an input (step S1) from the PD 1-7, the priority of frame control information 22-1 of the corresponding fixed frame control table is set at the lowest position.

Figure 29F:
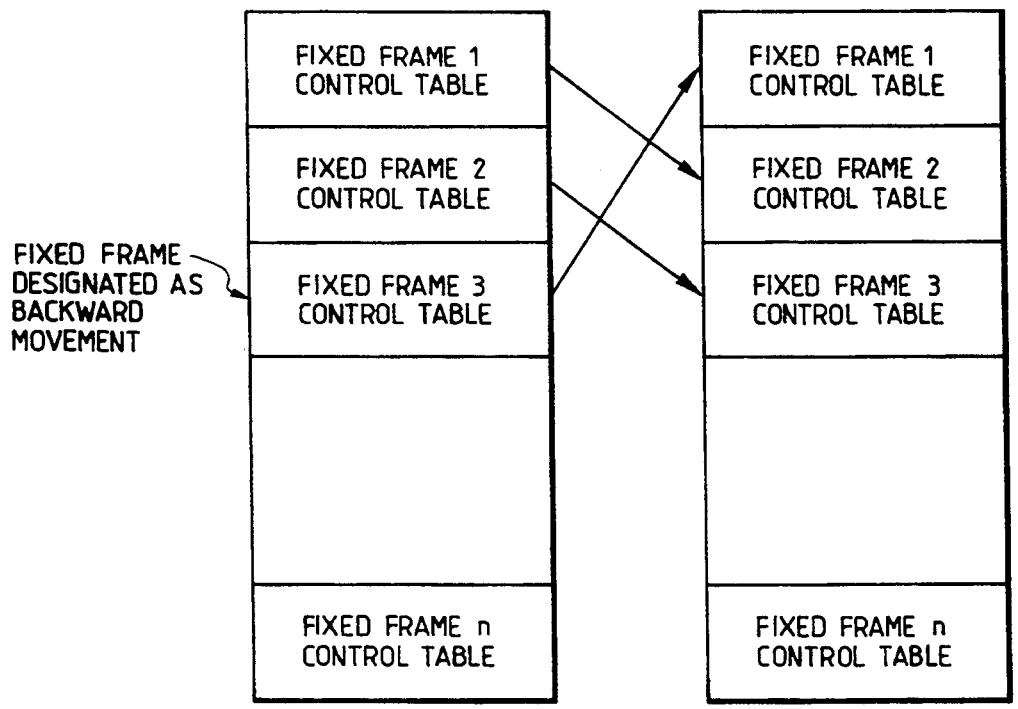

That is, as shown in FIG. 29F, the order of the fixed frame control data tables of the presently edited document page, which tables are developed in the main memory 1-5, is changed. The fixed frame control table moved to the backward side is set to the beginning of the fixed frame tables. The moved fixed frame is re-displayed.

Page Movement Processing

Figure 29G:
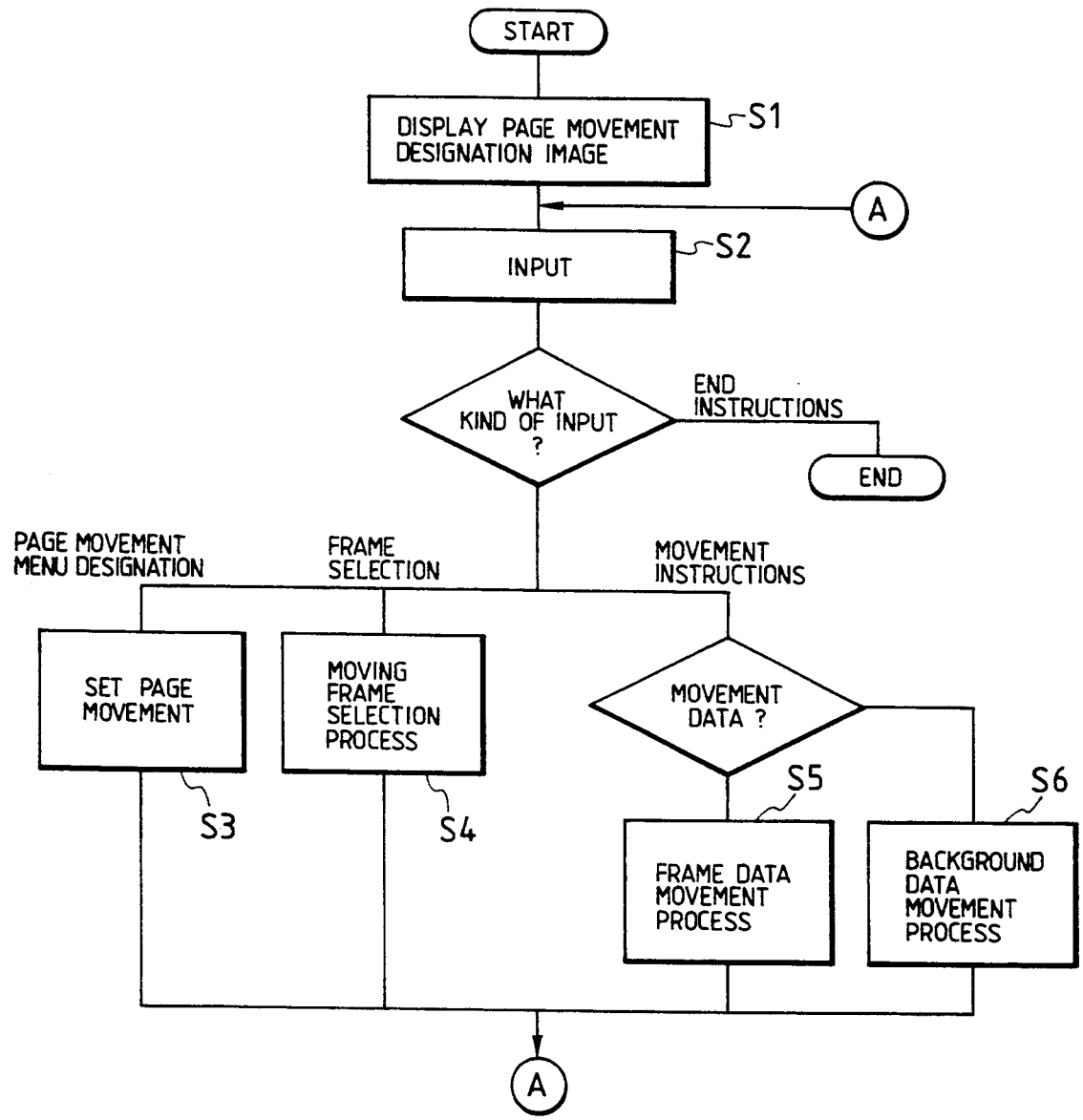

FIG. 29G is a flow chart for explaining fixed frame page movement processing shown in FIG. 8E.

When a fixed frame page movement command is selected by the PD 1-7 or the KBD 1-8, the page movement designation screen (image) 8-5 is displayed (step S1).

An input (step S2) from the PD 1-7 or the KBD 1-8 is detected. If the input represents designation of an item of the page movement designation screen, movement data (fixed frame and background data) or the destination page is set (step S3).

When the fixed frame is selected, the fixed frame (or a plurality of frames) is set in the selection state (step S4).

When page movement execution is designated, page movement processing is executed only when the movement data and the destination page are designated. If the movement data represents a fixed frame, fixed frame movement processing (step S5) is performed. However, when the movement data represents background data, background data movement processing (step S6) is performed.

Page movement operations of the respective data will be described below.

Page Movement Processing of Fixed Frame

FIG. 29H is a flow chart for explaining page movement processing of a fixed frame.

A fixed frame selected to be moved (or a plurality of frames) is erased from the display screen (step S1). A fixed frame present on the designated destination page is written in the main memory 1-5, and the corresponding fixed frame control table is formed. A new fixed frame is formed in the destination page, and the corresponding fixed frame control table is added in the main memory 1-5 (step S2).

The movable fixed frame data on the original page is shunted from the main memory 1-5 (step S3). The fixed frame control table of the movable fixed frame on the original page is copied in the new fixed frame control table formed on the designation page (step S4). The above operations are executed for all the selected fixed frames.

Page Movement Processing of Background Data

FIG. 29I is a flow chart for explaining page movement processing of the background data.

The back-ground data subjected to movement are limited to graphic and image data formed in the graphic and image layers on the editing document table.

Data on the page designated as a destination is written in the main memory 1-5 (step S1). If data are present in the graphic and image layers of the same page, the background data is deleted (step S2).

The background data in the graphic and image layers of the original page is shunted from the main memory 1-5 (step S3). The addresses of the background data on the original page are shifted to the designation pages in units of graphic and image layers (step S4), and the original page is re-displayed (step S5).

Fixed Frame Size Processing

FIG. 30 is a flow chart for explaining fixed frame size processing shown in FIG. 9A.

When a fixed frame on a document sheet is selected by an input (step S1) from the PD 1-7, black dots as size change marks are displayed on the selected fixed frame (step S2). In practice, eight marks are displayed along the fixed frame.

When the size change instruction mark 9-2 displayed on the fixed frame is designated by an input from the PD 1-7, expansion/reduction of the frame having as an origin (fixed point) the mark 9-3 opposite to the mark 9-2 is performed. Expansion/reduction is performed such that four corner points are moved on the display screen in the X and Y directions. Other size change instruction marks are moved along either the X or Y direction.

After the size change instruction point is designated by the input from the PD 1-7, upper left position coordinates and a frame size are calculated from the designated position on the display screen upon depression of the PD 1-7. A frame line of the size-changed fixed frame is re-displayed. The above operation is repeated until the PD 1-7 is released (step S3).

In this case, the grid fitted mode 35-1 of the measure table (FIG. 35B) set in the editing document page is designated to be "fitted", the designation position of the PD 1-7 is adjusted to be a grid point, and a size change amount of the fixed frame is given in the grid space unit.

When the measure is displayed on the editing document page, the pointing cursor of the PD 1-7 is changed into a cross cursor having the designated size change instruction point position as the center.

When the PD 1-7 is released, size change processing is completed. The data within the fixed frame prior to the size change are temporarily erased. The position of the fixed frame after the size change and its frame size are restored and re-displayed (step S4).

At the same time, a frame position 22-3 and a frame size 22-4 of the fixed frame control table (FIG. 22) of the size-changed fixed frame are updated.

The relationship between frame size change processing and data display positions of the layers within the frame will be described below.

The display position of the sentence data on the sentence layer within the fixed frame, as shown in FIG. 9B, is not changed regardless of the size expansion/reduction direction since the format data for controlling the sentence data is kept unchanged.

Display positions of the graphic and image data on the graphic and image layers within the fixed frame, as shown in FIGS. 9C and 9D, must be adjusted so as not to change their display positions on the editing document sheet after the frame size is changed. When the graphic and image data are expanded, a space is formed in the frame. When the graphic and image data are compressed, partial display of the data is performed.

In particular, the grid origin of graphic data on a graphic layer is changed when the upper left position is moved by expansion of the frame. The coordinates must be adjusted so as to fit the graph with the grid in the re-display state. By this adjustment, slight positional errors occur in the graphic data on the display screen.

Editing in Units of a Page or Page Editing

Figure 31:
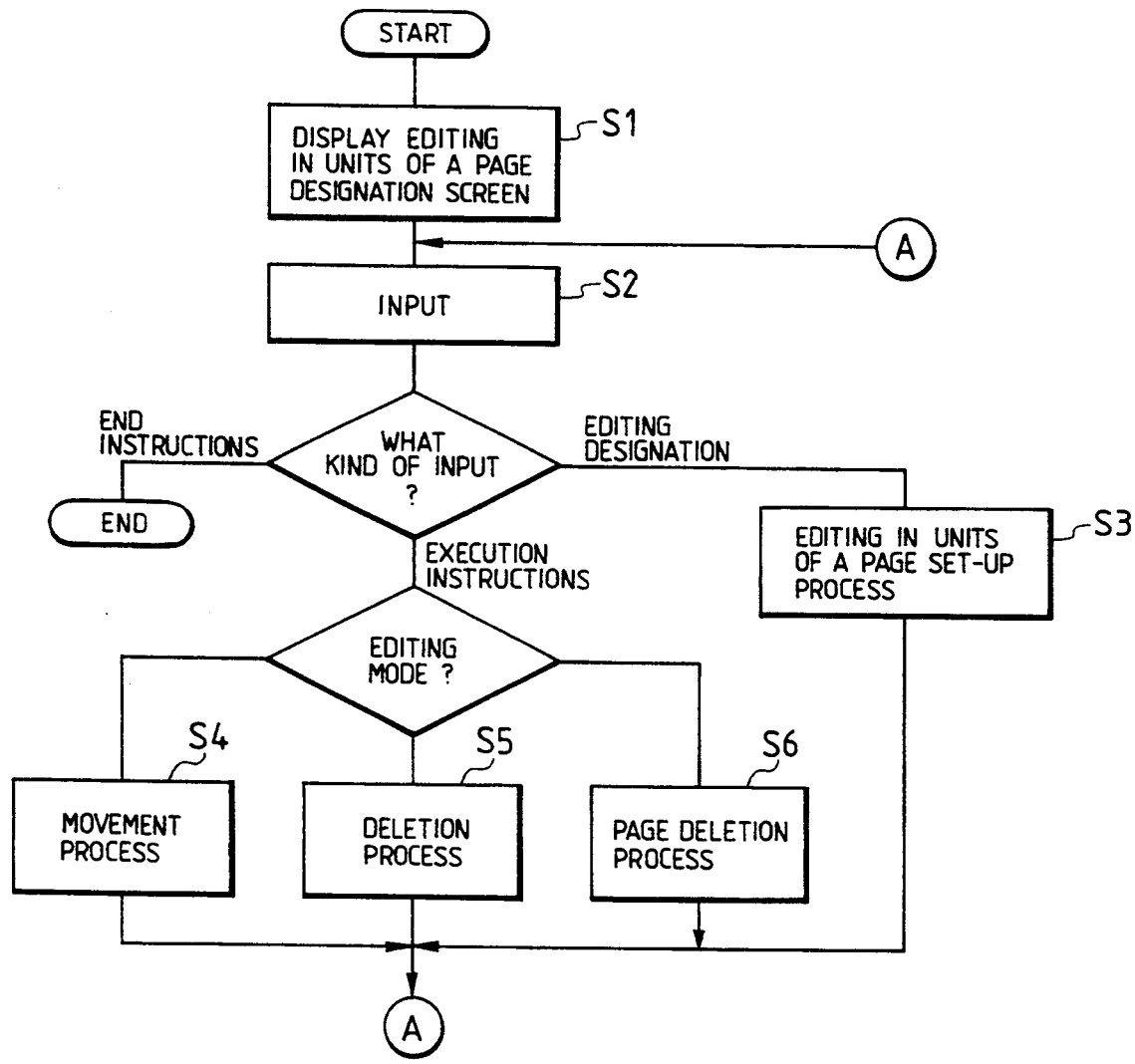
FIG. 31 is a flow chart for explaining "editing in units of a page" processing or page editing processing.

FIG. 31 is a flow chart showing "editing in units of a page" shown in FIG. 10A.

When an "editing in units of a page" command is selected by the PD 1-7 or the KBD 1-8, an "editing in units of a page" designation screen is displayed (step S1).

"Editing in units of a page" is designated by an input (step S2) from the PD 1-7 or the KBD 1-8. When "movement" is selected, a "movement" column is inversely displayed. In this case, input processing of data (fixed frame and background data) to be moved, the movement start page, and the movement destination page is performed.

When "deletion" is selected, the "deletion" column is inversely displayed. In this case, input processing of data (fixed frame and background data) to be deleted, the deletion start page, and the deletion end page is performed.

When "page deletion" is selected, the "page deletion" column is inversely displayed, and input processing of the deletion start page and the deletion end page is performed.

Fixed frame movement processing in FIG. 10B is performed such that all fixed frames from the designated movement start page are moved to the designation and subsequent pages. The page number of the frame control information 22-1 of the fixed frame control table (FIG. 22) of each fixed frame to be moved is updated. If the presently edited document page falls within the designated page range, this page is re-displayed.

In background data movement processing in FIG. 10C, all background data (graphic data and image data) from the designated movement start page are moved to the designation and subsequent pages. If the presently edited document page falls within the range of the designated pages, this page is re-displayed.

In fixed frame deletion processing in FIG. 10D, the fixed frame data within the designated range is deleted. If the presently edited document page falls within the designated page range, this page is re-displayed.

In background data deletion processing, the background data within the designated range is deleted. The data on the graphic and image layers of each designated page are deleted. If the presently edited document page falls within the designated page range, this page is re-displayed.

In page deletion processing in FIG. 10E, page data within the designated range is deleted, and the next page is re-displayed.

Fixed Frame Fetch Processing

Figure 32A:
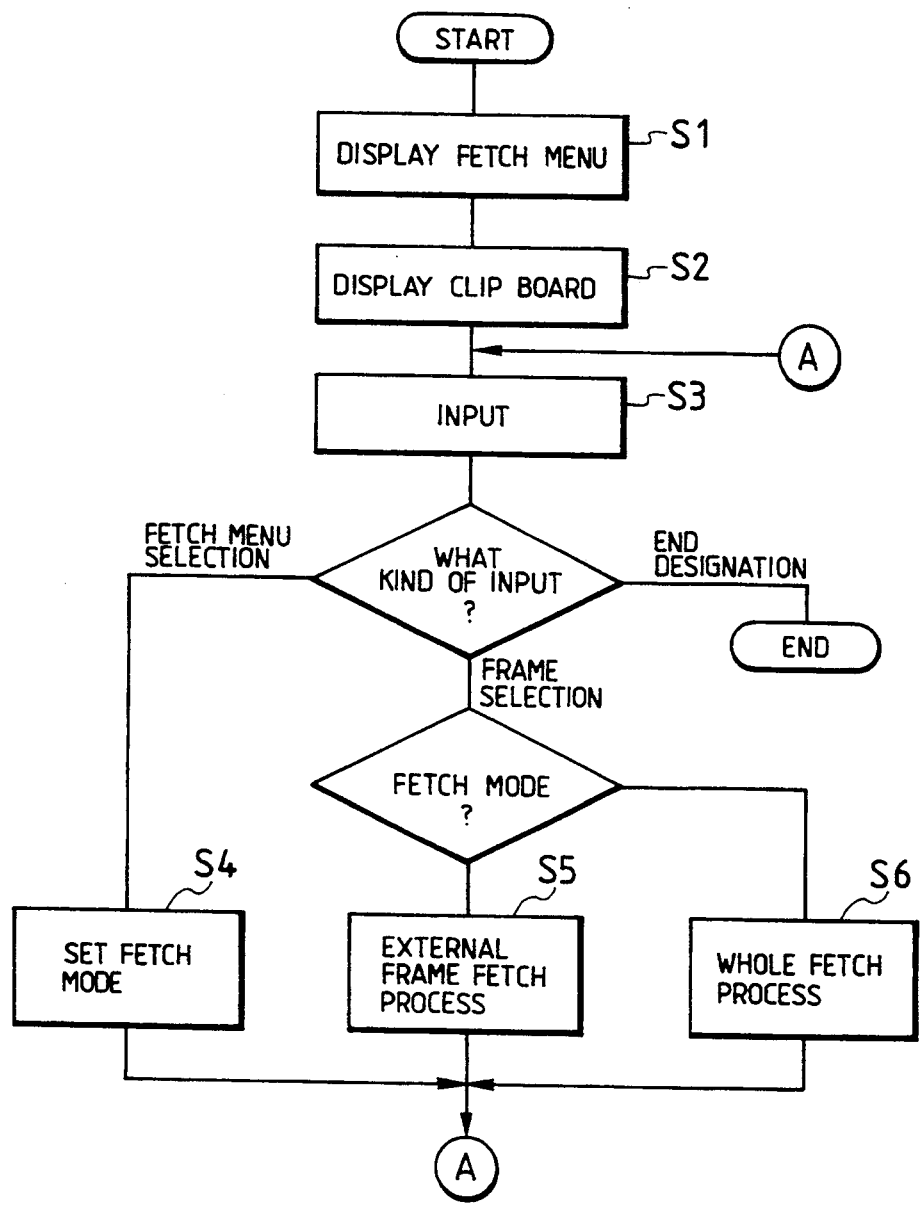

FIG. 32A is a flow chart for explaining fixed frame fetch processing shown in FIG. 11A.

When the fixed frame fetch command 6-6 is selected by the PD 1-7 or the KBD 1-8, fixed frame fetch subcommand menu (11-1 and 11-2) is displayed above the fixed frame edit command menu (step S1). At this time, "whole fetch" processing (step S6) as an operated step of the fixed frame fetch is set in the selection state.

In addition, the clip board screen 7-4 for storing the fixed frame data fetched in fixed frame fetch processing is displayed. On the clip board screen, the data files presently stored in the clip board are displayed by icons representing the types of data (step S2).

Any other fetch processing (external frame fetch processing (step S5) of fixed frame fetch operations) can be selected by an input (step S3) from the PD 1-7 or the KBD 1-8.

The fetched fixed frame data is stored as a data file in the clip board.

Figure 32B:
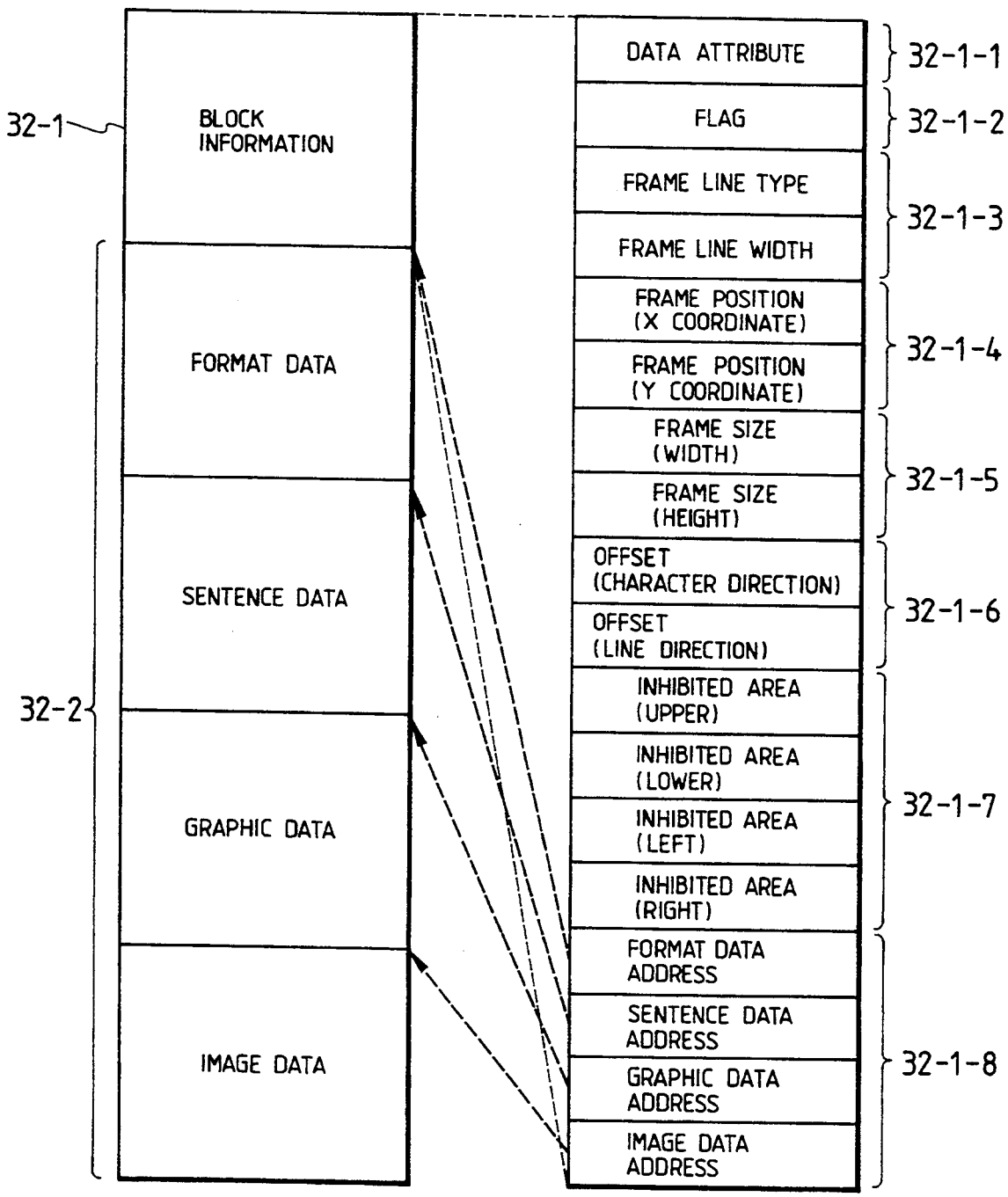
FIG. 32B is a view showing a file structure of fetched data.

FIG. 32B shows a format of a fixed frame data file stored in the clip board.

The data file is mainly divided into two portions, i.e., a file header portion 32-1 representing block (frame) information and a data portion 32-2 in which the fetched fixed frame data is written. The data file structure will be similarly applied to floating frame data fetched in floating frame processing.

A data attribute 32-1-1 represents the types of fetched data editing processing, the types of file, and the types of data. The file includes composite data, graph data, table data, and frame data. The types of data include sentence data (wordprocessor data and table data), graphic data, and image data.

A flag 32-1-2 represents floating frame attribute information and corresponds to the flag 24-2 in the floating frame command parameter in FIG. 24. This flag is set in only floating frame fetch processing.

A fetched frame line type 32-1-3 represents the type of line of the frame, a line width, and a line width. Fetched frame upper left coordinates 32-1-4 represent upper left X and Y coordinate data. A fetched frame size 32-1-5 represents a width and a height of a frame.

An offset 32-1-6 represents an offset in the floating frame and corresponds to the offset 24-5 (FIG. 24) of the floating command parameter. This flag is set in only floating frame fetch processing in the same manner as in the above flag.

A fetched frame inhibited area 32-1-7 represents inhibited area values of the frame in the upper, lower, left, and right directions. Fetched frame data 32-8 (format data, sentence data, graphic data, and image data) represents an address in the file.

The fetched frame data are written in areas 32-2 in units of types of data.

Whole Fetch Processing

FIG. 32C is a flow chart for explaining fixed frame "whole fetch processing" shown in FIG. 11B.

When a fixed frame on a document sheet from which data is fetched is selected by an input (step S1) from the PD 1-7, the selected fixed frame is set in the selection state. The selected fixed frame is written in the main memory 1-5, and the corresponding fixed frame control table (FIG. 22) of this fixed frame is set (step S2).

The types of data within the selected fixed frame are determined by size information 22-9 of each data in the fixed frame control table (step S4). If a plurality of types of data (e.g., graphic data and image data) are present, a fetch data selection screen 1-3 is displayed. The types of data of the selected fixed frame are displayed on the fetch data selection screen, and data can be fetched (step S5).

When the type of fetch data is designated by an input (step S1) from the PD 1-7 or the KBD 1-8 and fetch processing is designated, the designated data are fetched in units of types of data.

First, when sentence data is selected (step S6), the format data for controlling the sentence data is written in the frame data portion 32-2. The start address is set in the format data portion of the data address 32-1-8. Subsequently, sentence data is written in the frame data portion 32-2, and its start address is set in the sentence data portion of the data address 32-1-8.

When graphic data is selected (step S8), the graphic data is written in the frame data portion 32-2, and its start address is set in the graphic data address portion of the data address 32-1-8 (step S9). When the image data is selected (step S10), the image data is written in the frame data portion 32-2, and its start address is set in the image data portion of the data address 32-1-8 (step S11).

Corresponding items of the fetch fixed frame information 32-1 are written from the corresponding fixed frame control table.

When an area except for the fixed frame on the document sheet is designated by an input (step S1) from the PD 1-7, "whole fetch" processing of the background data is started. The data information of the editing document page is written in the main memory 1-5 (step S4) to determine the type of data. If the data on the editing document page is only sentence data, this processing cannot be executed.

If the plurality of types of data (graphic data and image data) are present, a fetch data selection screen 11-3 is displayed in the same manner as in the whole fetch processing of the fixed frame. The types of background data are displayed, so that the data can be fetched (step S5).

Fetch processing of each data is the same as that of the fixed frame.

External Frame Fetch Processing

In external frame fetch processing, only frame information data of the header portion 32-1 of the clip board data format in FIG. 32B is formed.

When a fixed frame on a document sheet from which data is fetched is selected by an input (step S1) from the PD 1-7, this fixed frame is set in the selection state. The selected fixed frame is written in the main memory 1-5, and the fixed frame control table (FIG. 22) of this fixed frame is developed (step S2).

Corresponding items of the fetch fixed frame information 32-1 are written from the corresponding fixed frame control table.

In this case, external frame fetch processing of background data cannot be performed.

Fixed Frame Cram Processing

Figure 33A:
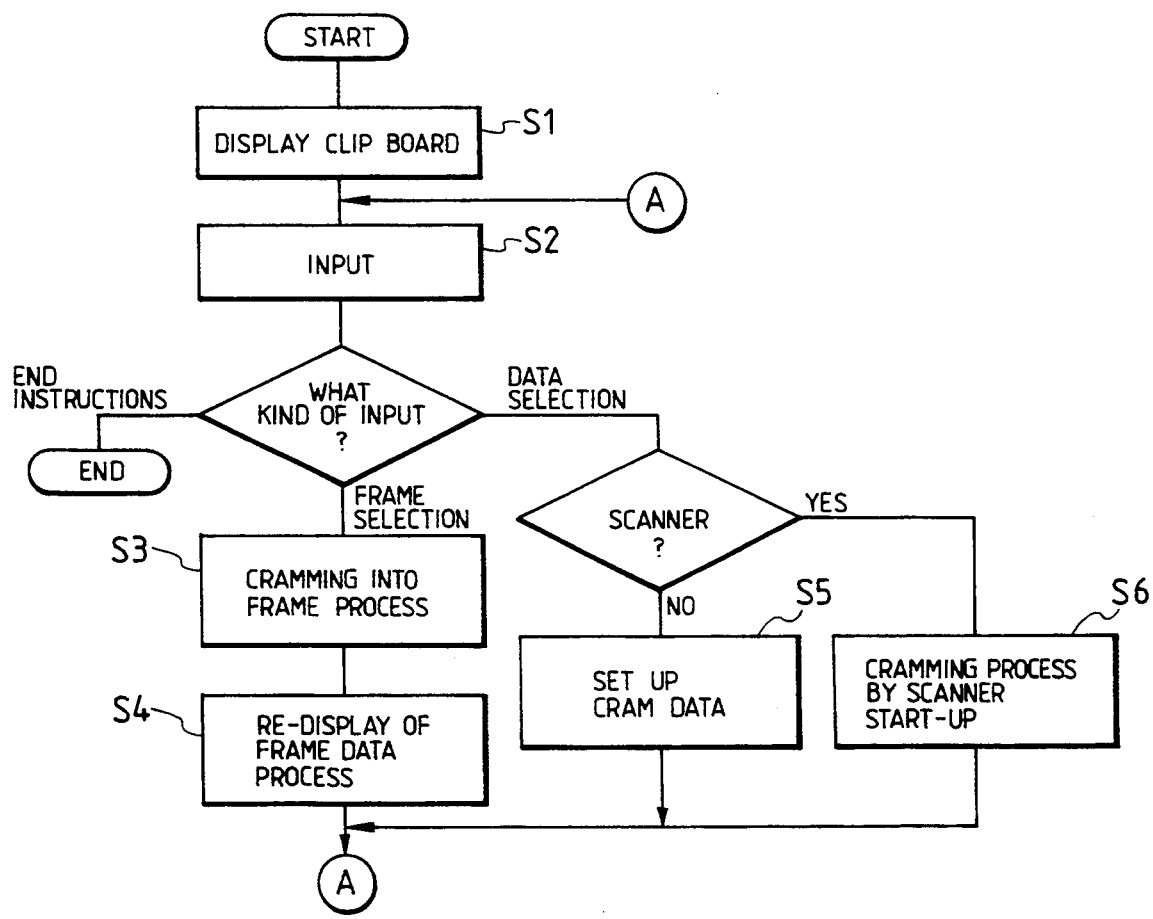

FIG. 33A is a flow chart for explaining fixed frame cram processing shown in FIG. 12A.

When the fixed frame cram command 6-7 is selected by the PD 1-7 or the KBD 1-8, the screen 7-4 of the clip board which stores the cram data in fixed frame cram processing is displayed. Data files presently stored in the clip board are displayed by icons representing the types of data (step S1).

When a data icon on the clip board screen 7-4 is selected by an input (step S2) from the PD 1-7, cram data is selected. The selected data icon is inversely displayed (step S5).

When a fixed frame on the document sheet is selected by an input (step S1) from the PD 1-7 and if the cram data has already been selected, cram processing to this fixed frame is executed (step S3) and the result is re-displayed (step S4).

FIG. 33A is a flow chart for explaining frame data cram processing.

As shown in FIG. 12B, cram processing is performed in units of layers, i.e., each data layer of the destination fixed frame and the corresponding data layer of the data to be crammed.

When the destination fixed frame is designated, the corresponding frame information and its frame data are written in the main memory 1-5, and the corresponding fixed frame control table (FIG. 22) is set. A cram clip board data file is opened, and the types of cram data are identified in accordance with the data attribute 32-1-1 (step S1).

If the cram data includes image data, the image data of the image layer of the destination fixed frame is deleted. Instead, cram image data information is set. The image data portion of the data address 22-6 and the image data portion of the data size 22-7 in FIG. 22 are updated (step S3).

If the cram data includes graphic data, the graphic data of the graphic layer of the destination fixed frame is deleted. Instead, cram graphic data information is set. The graphic data portion of the data address 22-6 and the graphic data portion of the data size 22-7 of the corresponding fixed frame control table in FIG. 22 are updated (step S4).

If the cram data includes sentence data, the sentence data of the sentence layer of the destination fixed frame is deleted. Instead, cram sentence data information is set. The sentence data portion of the data address 22-6 and the sentence data portion of the data size 22-7 of the corresponding fixed frame control table in FIG. 22 are updated (step S5).

If the cram data includes image or graphic data, a cramming method can be designated. A designation screen is displayed, and the method is designated by an input from the PD 1-7 or the KBD 1-8 (step S2).

When the cram data is image or graphic data, a data magnification factor is determined so as to fit the data within the frame in accordance with the frame size 22-4 of the destination fixed frame and the cram data frame size 32-1-5.

When the same variable magnification factors in the vertical and horizontal directions are determined in cram processing, the data are enlarged or reduced by the same magnification factors in the vertical and horizontal directions. In this case, the magnification factors are different in the vertical and horizontal directions, a large magnification factor is used in an enlargement priority designation mode. However, when a reduction priority designation mode is set, a smaller magnification factor is employed.

When variable magnification factors are independently determined in the vertical and horizontal directions, the data are enlarged or reduced at the corresponding magnification factors in the vertical and horizontal directions so as to fit the data in the frame. In this case, when the magnification factors are different in the vertical and horizontal directions, the corresponding magnification factors are employed. In the case of image data, a magnification factor representing a size slightly larger than the frame size is employed in the enlargement priority designation mode. Otherwise, a magnification factor representing a size slightly smaller the frame size is employed.

When no magnification is performed, the data size is not changed and displayed at the central portion of the frame.

When sentence data is crammed, the sentence data is displayed within the frame depending on the cram data format.

Figure 33C:
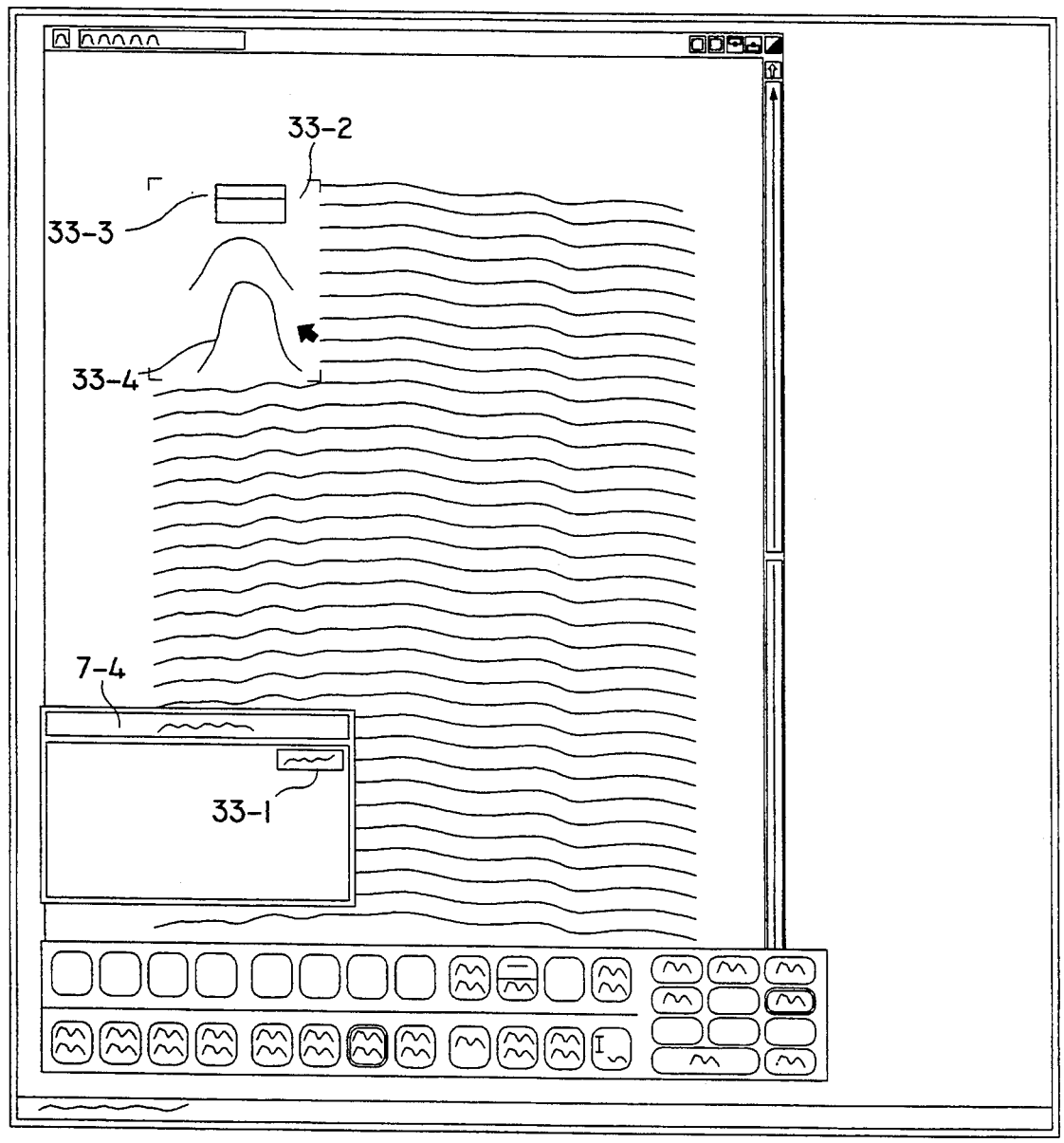
FIGS. 33C to 33E are views for explaining fixed frame cram processing using data read from a scanner.
Figure 33D:
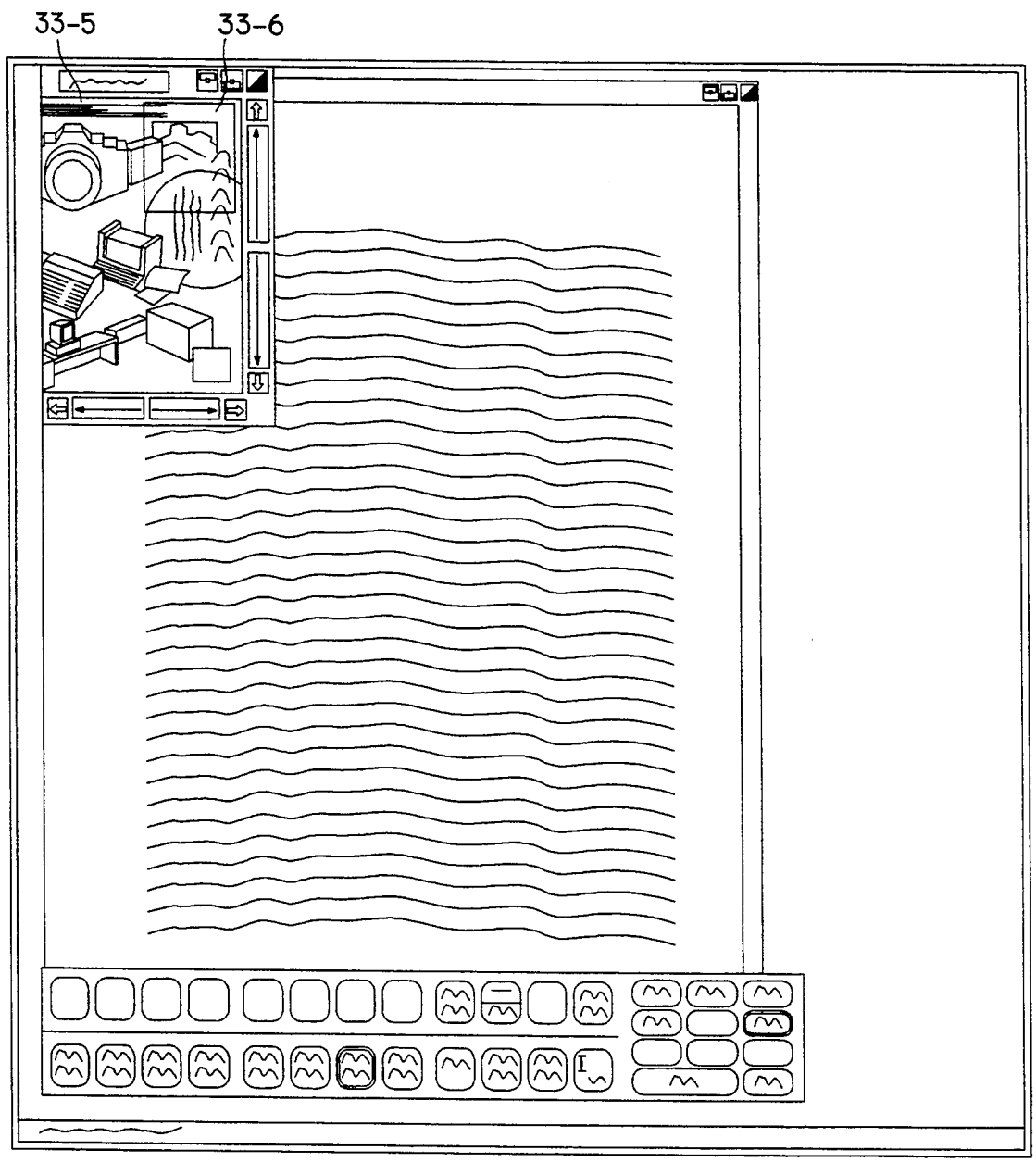
Figure 33E:
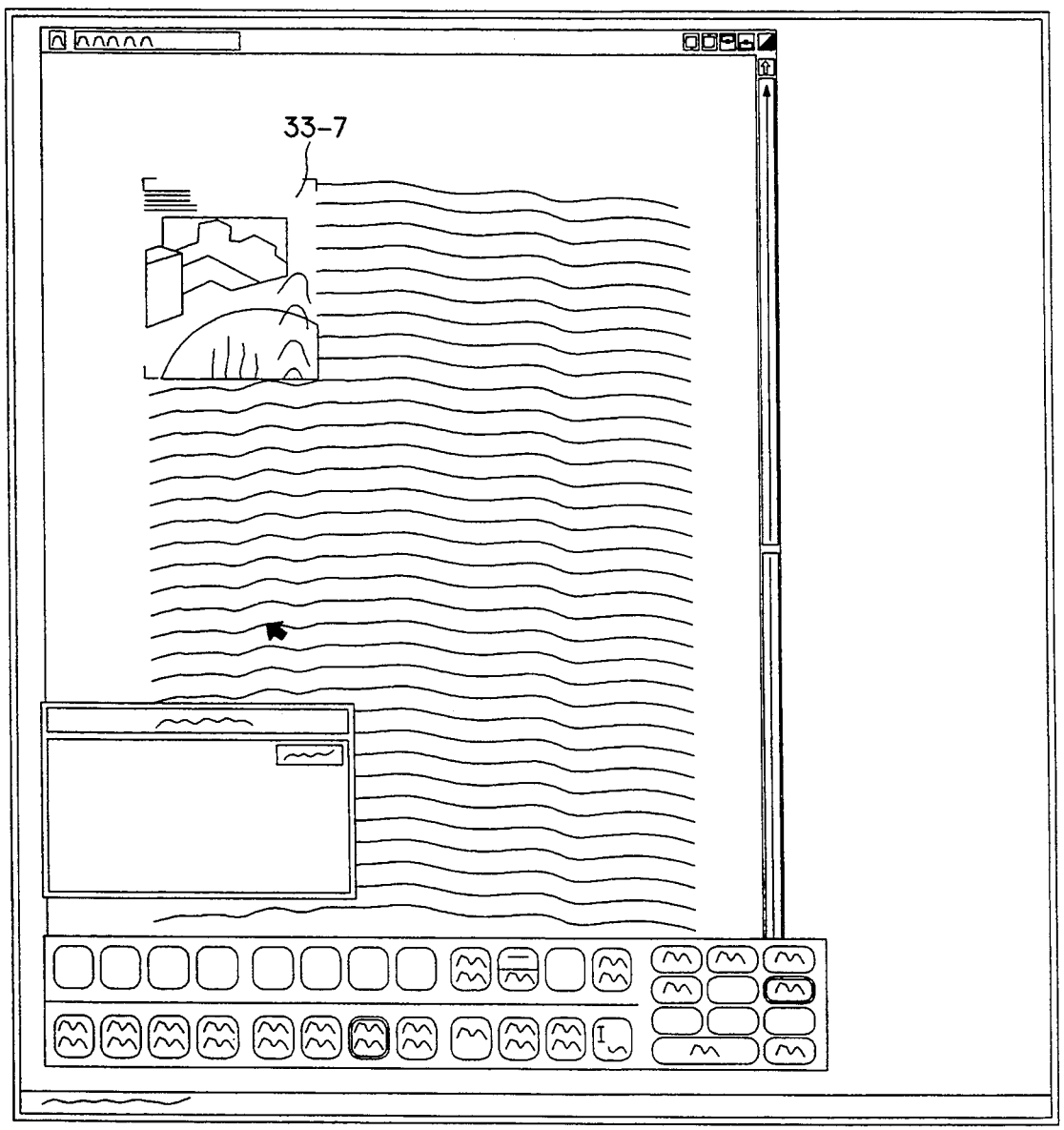
Figure 34B:
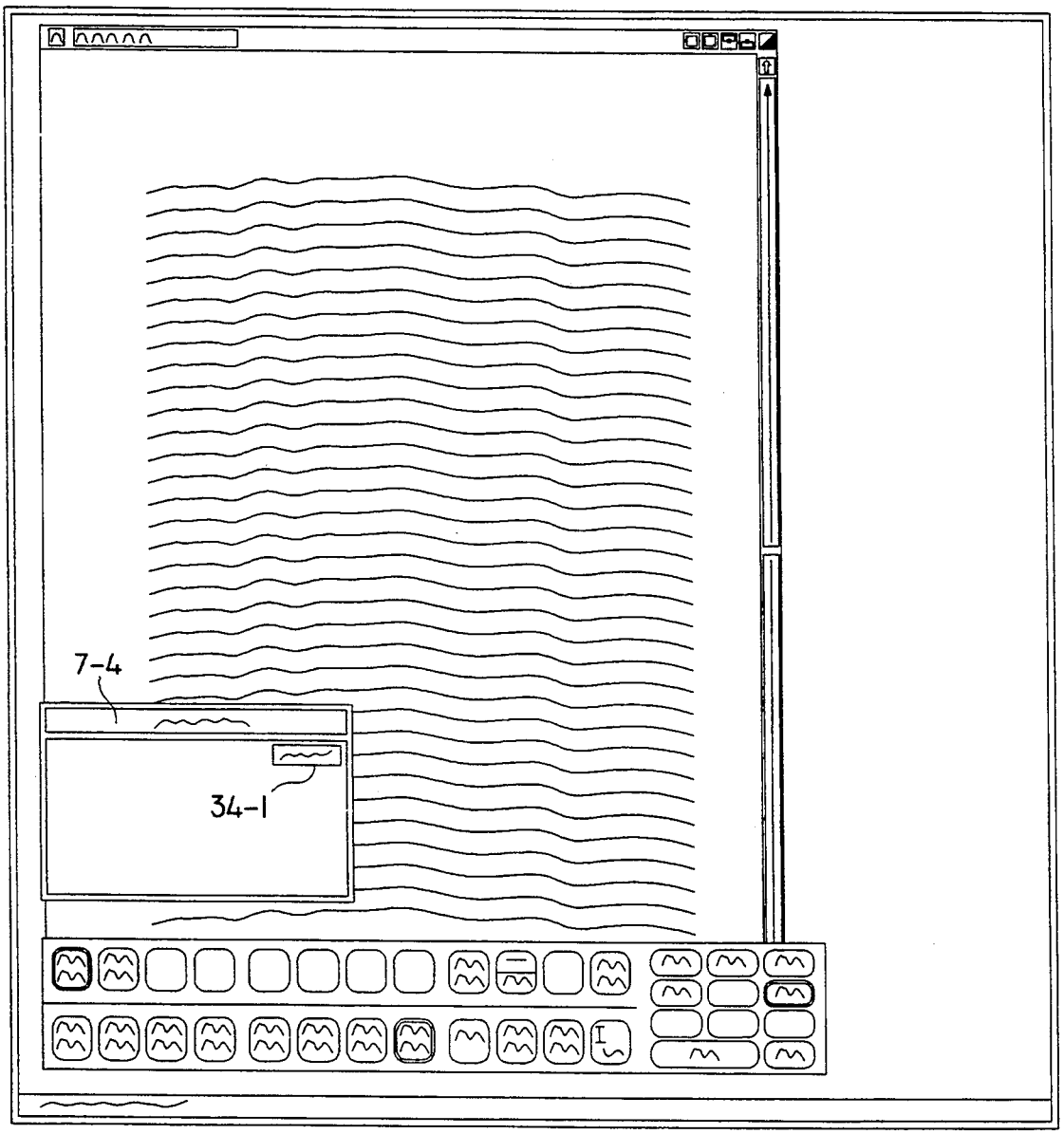
FIGS. 34B to 34E are views for explaining fixed frame paste processing using data read from the scanner.
Figure 34C:
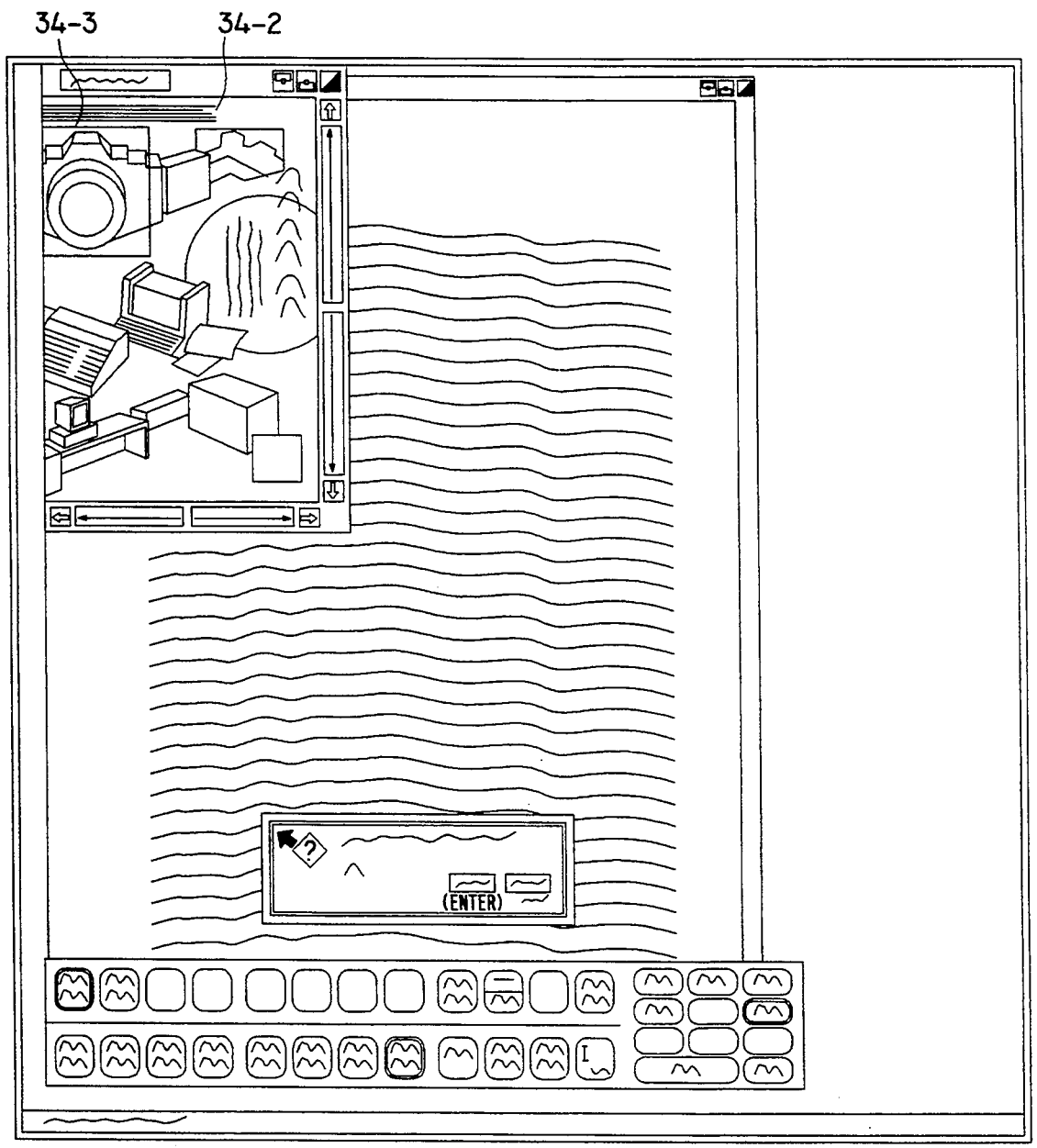
Figure 34D:
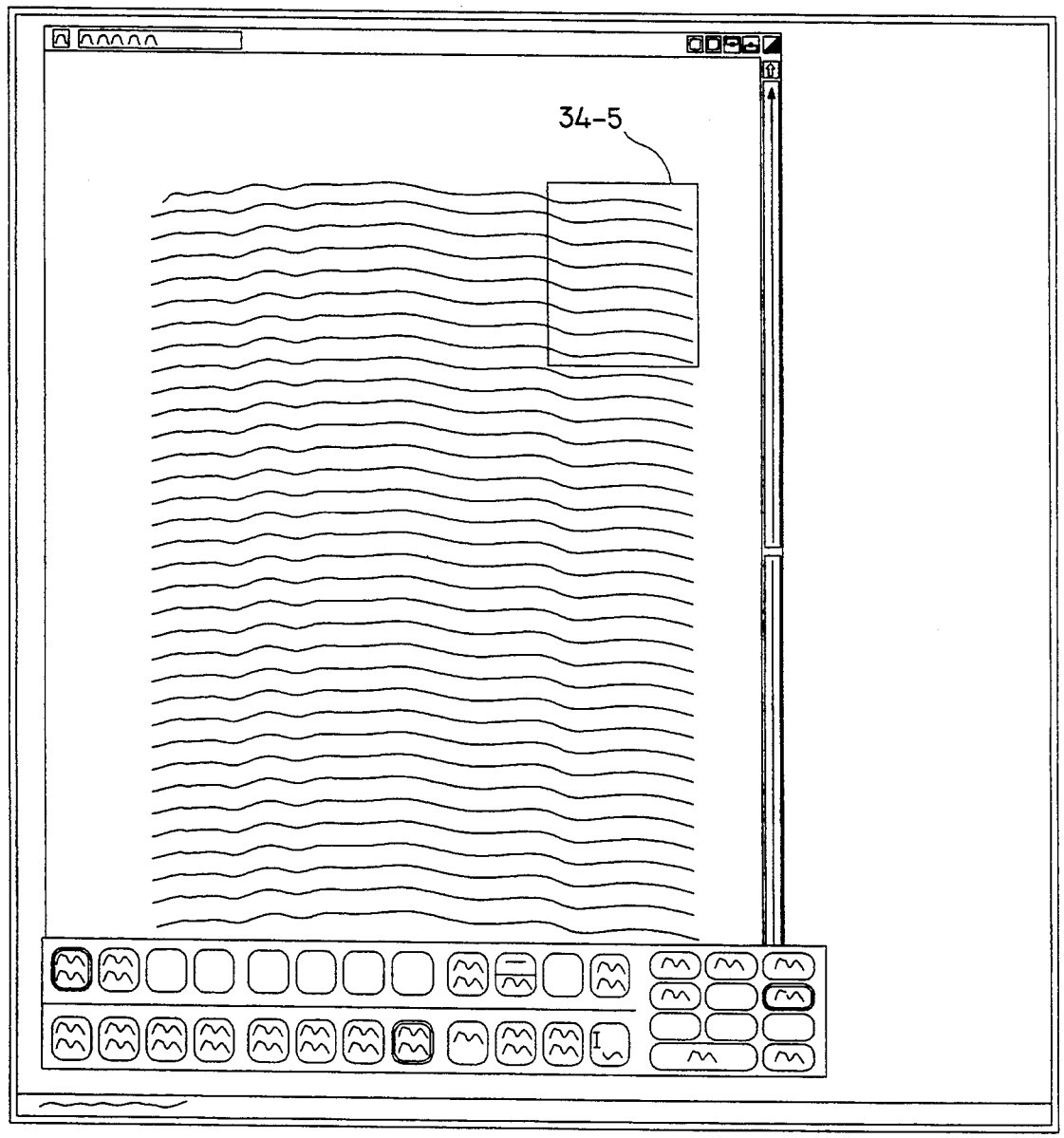
Figure 34E:
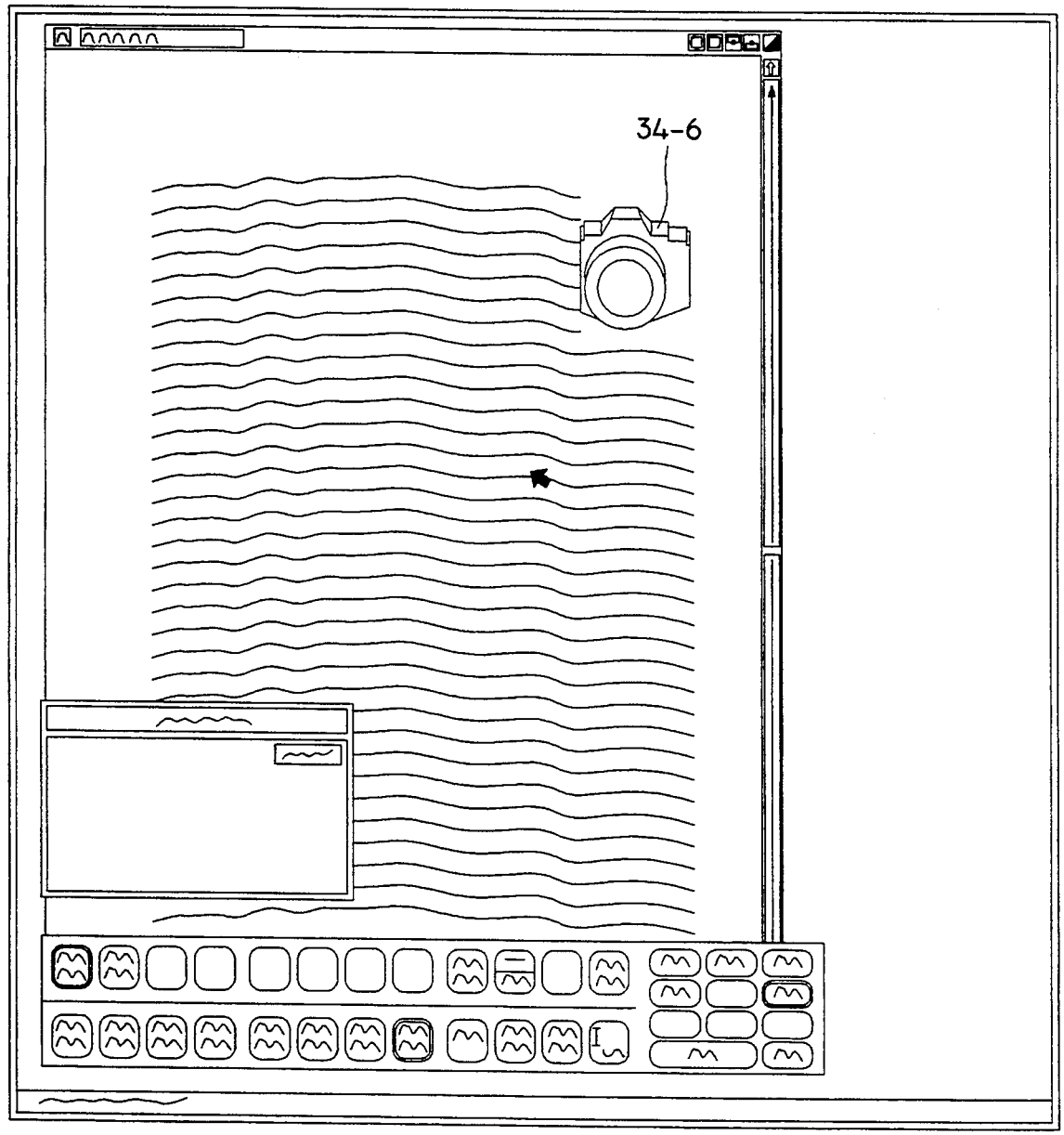

FIGS. 33C to 33E are views for explaining an operation in which image data is read from the scanner 1-10 and directly crammed in a fixed frame.

When a destination fixed frame 33-2 is designated by the PD 1-7, this frame is set in the selection state. Sentence data 33-3 and image data 33-4 are present in the sentence and image layers of the frame 33-2, respectively.

When the scanner portion 33-1 on the clip board 7-4 is designated by the scanner portion 33-1, the scanner 1-10 is started to display a scanner image display screen 33-5 which displays image data. The read image data is then displayed-on the screen. When image data is read from the scanner, magnifications can be designated.

When the position designated by the PD 1-7 is present on the scanner image display screen 33-5, the pointing cursor synchronized with the PD 1-7 is changed into a box cursor 33-6 having a cram destination frame size.

When an input from the PD 1-7 is present on the scanner image display screen 33-5, the box cursor having the frame size is moved on the screen.

When an arbitrary position on the scanner image display screen 33-5 is designated by the PD 1-7, the image data within the box cursor is cut out and creed in the fixed frame 33-2. At the same time, the scanner image display screen is erased.

Image data 33-4 of the image layer of the fixed frame 33-2 is deleted, and instead image data 33-7 designated on the display screen of the image scanner serves as image data of the image layer and is re-displayed. The sentence data 33-3 of the sentence layer is kept unchanged.

Paste Processing of Fixed Frame

FIG. 34 is a flow chart of fixed frame paste processing shown in FIG. 13A.

When a fixed frame paste command is selected by the PD 1-7 or the KBD 1-8, a sub-command menu (13-2 and 13-3) of the fixed frame paste is displayed above the fixed frame edit command menu (step S1). At this time, "any position paste" processing (step S5) has been selected as the first step of fixed frame paste.

The clip board screen 7-4 which stores data to be pasted in fixed frame paste processing is displayed. The data files presently stored in the clip board are displayed on the clip board screen by icons representing the types of data (step S2). At this time, latest data 13-1 of the paste data stored in the clip board is automatically selected as first paste data and inversely displayed.

Any other paste operation (storage position paste processing (step S6)) of fixed frame paste processing can be selected (step S4).

The respective paste operations of fixed frame paste processing will be described below.

"Any Position" Paste Process

When the fixed frame paste command 13-2 is selected by an input from the PD 1-7 or the KBD 1-8, or when an "any position" paste command is selected, the latest data of the paste data stored in the displayed clip board is automatically selected as first paste data and inversely displayed. Thereafter, "any position" paste processing of this data is performed.

When a position designated by an input (step S3) from the PD 1-7 is present on the display screen of the editing document page, the pointing cursor synchronized with the PD 1 is changed into the box cursor 13-3 corresponding to a frame size 32-1-5 of the selected clip board data, and the box cursor is moved on the display screen.

When a paste position is designated by an input (step S3) from the PD 1-7, a fixed frame having the designated position as the upper left position is re-displayed (step S5). At the same time, a new fixed frame control table is formed in the main memory 1-5, and frame information of the pasted clip board data and the data information are written in corresponding storage areas of the fixed frame control table.

When a data icon on the clip board 7-4 is selected by an input from the PD 1-7, the paste data can be arbitrarily selected. The selected data icon is inversely displayed (step S8).

In this case, the fetched data in floating frame fetch processing (to be described later) has the con, non data with the fixed frame except for data unique to the floating frame (i.e., the flag 32-1-2 and the offset 32-1-6) and can be pasted in fixed frame paste processing, and vice versa.

Storage Position Paste Processing

When the storage paste command 13-4 is selected by an input from the PD 1-7 or the KBD 1-8, latest data of the paste data stored in the clip board is automatically selected as first paste data in the same manner as in "any position" paste processing, and is inversely displayed. Storage position paste processing of this data is then performed.

A frame having a width and a height, both of which are represented by the frame size 32-1-5, is displayed as a temporary display 13-5 of a broken line at a frame position 32-1-4 obtained at the time of frame fetch, and a message for confirming paste is displayed. The frame is pasted at this display position upon designation with the PD 1-7 or the KBD 1-8.

At the same time, a new fixed frame control table is formed in the main memory 1-5, and frame information of the pasted clip board data and data information are stored in corresponding memory areas of the fixed frame control table.

When a data icon on the clip board screen 7-4 is selected by an input from the PD 1-7, data to be pasted at the storage position can be arbitrarily selected. The selected data icon is inversely displayed (step S8). Since data to be pasted at the storage position requires confirmation of a frame position, the data to be pasted is limited to ones fetched in fixed and floating frame editing operations.

"Paste by Scanner Start-Up" Processing

FIGS. 34B to 34E are views showing paste processing in which image data is read from the scanner 1-10 and the read data is pasted as a fixed frame on an editing document page.

When a scanner portion 34-1 on the clip board screen 7-4 is designated by the PD 1-7, the scanner 1-10 is started up, and a scanner image display screen 34-2 for displaying image data is displayed. The read image data is displayed on the screen. When image data is read from the scanner, image magnifications can be designated.

When a range 34-2 of data to be pasted is determined upon continuous depression of the PD 1-7 on the scanner image display screen, a message confirming execution of image data paste processing within the designated range is displayed. When paste processing is started, image data within the designated range serves as data to be pasted, and the scanner image display screen is erased.

The pointing cursor synchronized with the PD 1-7 is changed into a box cursor 34-5 having a size equal to the designated range, and the box cursor is moved on the display screen. A fixed frame having the designated position as the upper left corner of the frame is formed, and image data fetched upon designation of the range is re-displayed (34-6).

At the same time, a new fixed frame control table is formed in the main memory 1-5, and the frame information of the pasted image data and data information are written in corresponding storage areas of the fixed frame control table.

Measure Processing

Figure 14:
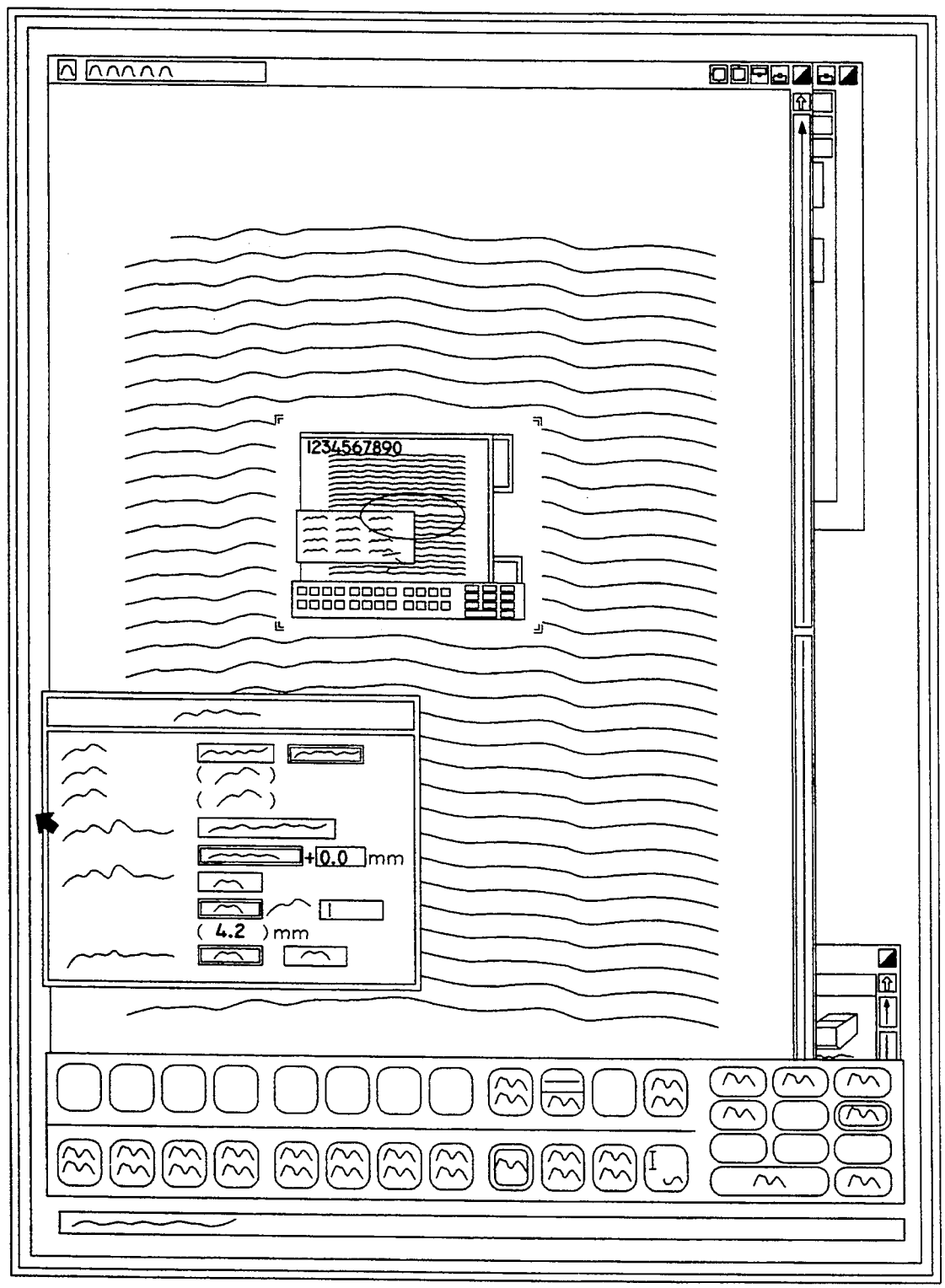
FIG. 14 is a view for explaining an operation for changing a grid on the screen.

FIG. 35A is a flow chart of measure processing shown in FIG. 14.

When a measure command is selected by the PD 1-7 or the KBD 1-8, format information set in the editing document page is referred to (step S1). A measure designation screen is displayed. At the time, a measure value set in the editing document page is displayed on the measure designation screen (step S2).

A measure table is then set by an input (step S3) from the PD 1-7 or the KBD 1-8.

FIG. 35B shows a data structure of the measure table. The grid fitted mode 35-1 represents the distinction between a mode which fits with the grid and a mode which does not fit with the grid, grid origin position information (corner of a sheet or free, or a corner of a "printing plate"), and grid space information (i.e., a character pitch and a line pitch). An origin position 35-2 of the editing document page represents an upper left or right position of the sheet. A unit of coordinates 35-3 is a unit of coordinates on the document sheet. A reduction scale 35-4 represents a reduction scale on the editing document sheet. A unit of input is designated by 35-5. A grid space 35-6 represents a grid space size set in the editing document page. An offset 35-7 of grid origin represents an offset in the X or Y coordinate direction with respect to the grid origin point. Coordinates 35-8 of grid origin represent values of X and Y coordinates of the origin position which is set on the basis of the grid origin position information designated in the grid fitted mode.

A measure can be designated in fixed frame measure processing by the following two methods.

The first method is an "independent definition" method. Any origin position (upper left or right position on the editing document sheet) and any grid space are designated.

Figure 35C:
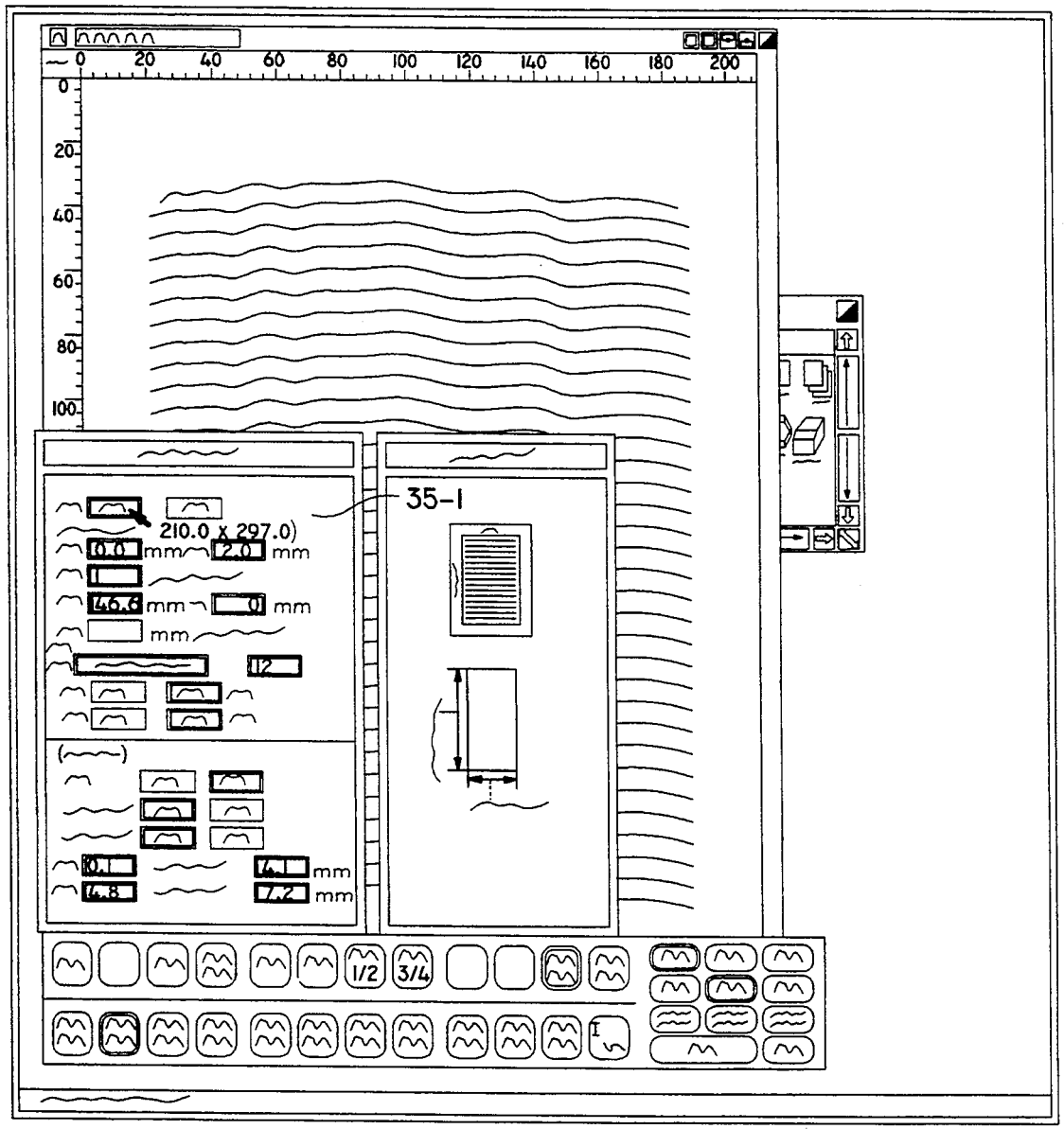
FIGS. 35C to 35F are views for explaining a structure of a measure table and measure setting processing in accordance with a format.

The second method is a "format dependent" method. A measure is designated on the basis of the format information set in the editing document page. FIG. 35C shows a presently edited document page on which a measure is displayed. A format 35-1 is set in this page.

Figure 35D:
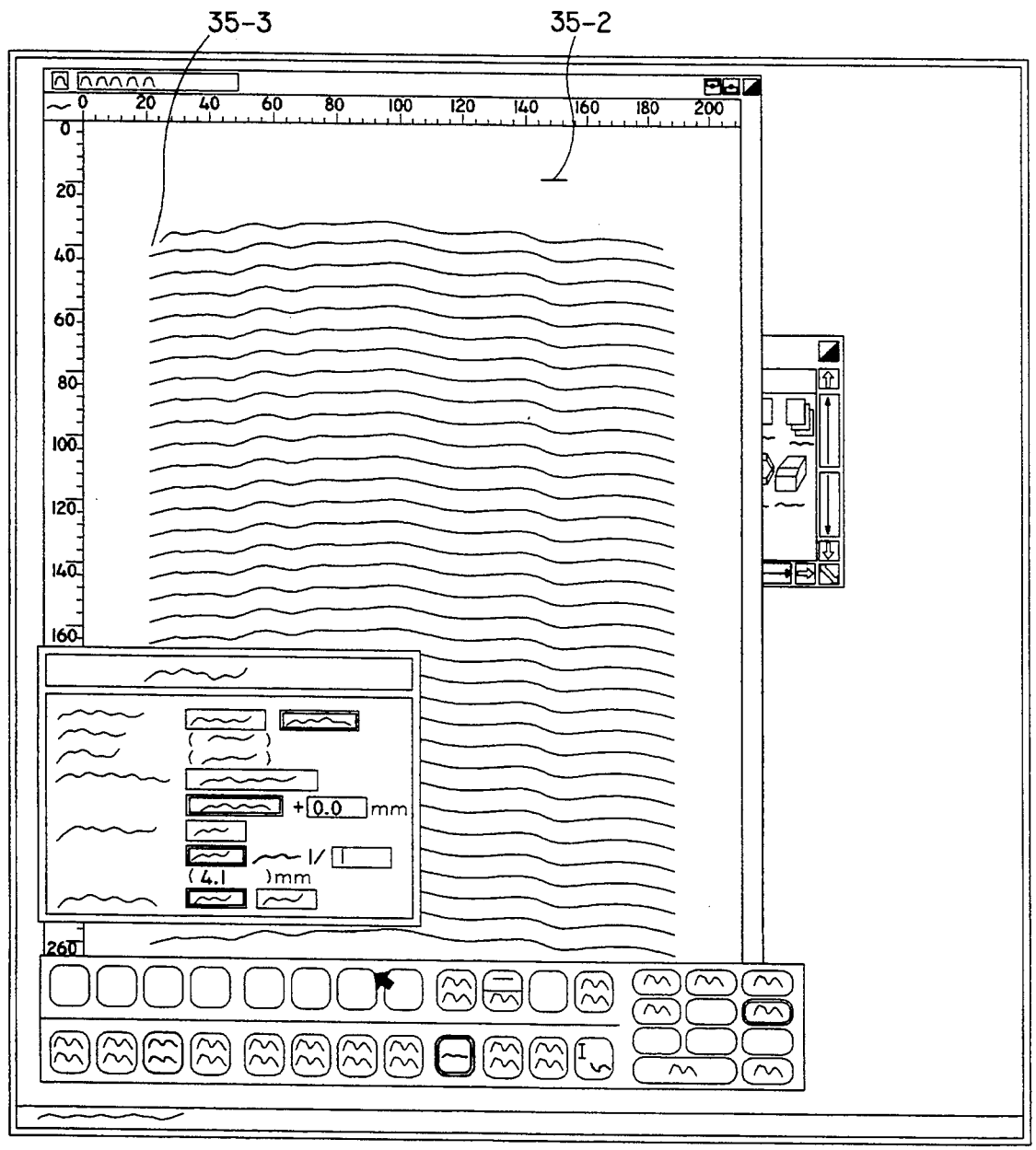

FIG. 35D shows a "format dependent" measure definition method. A layout direction of the format 35-1 is designated as a horizontal direction, so that the origin is the upper left position of the sheet. An upper fight position serves as an origin for vertical layout.

When the grid origin position is designated as a corner of a "printing plate", the grid origin position is set to be position coordinates 35-3 from the "top" and "gutter" values of the format 35-1. The grid space 35-2 is designated by a character pitch, i.e., a character pitch of 4.1 mm designated in the format 35-1.

Figure 35E:
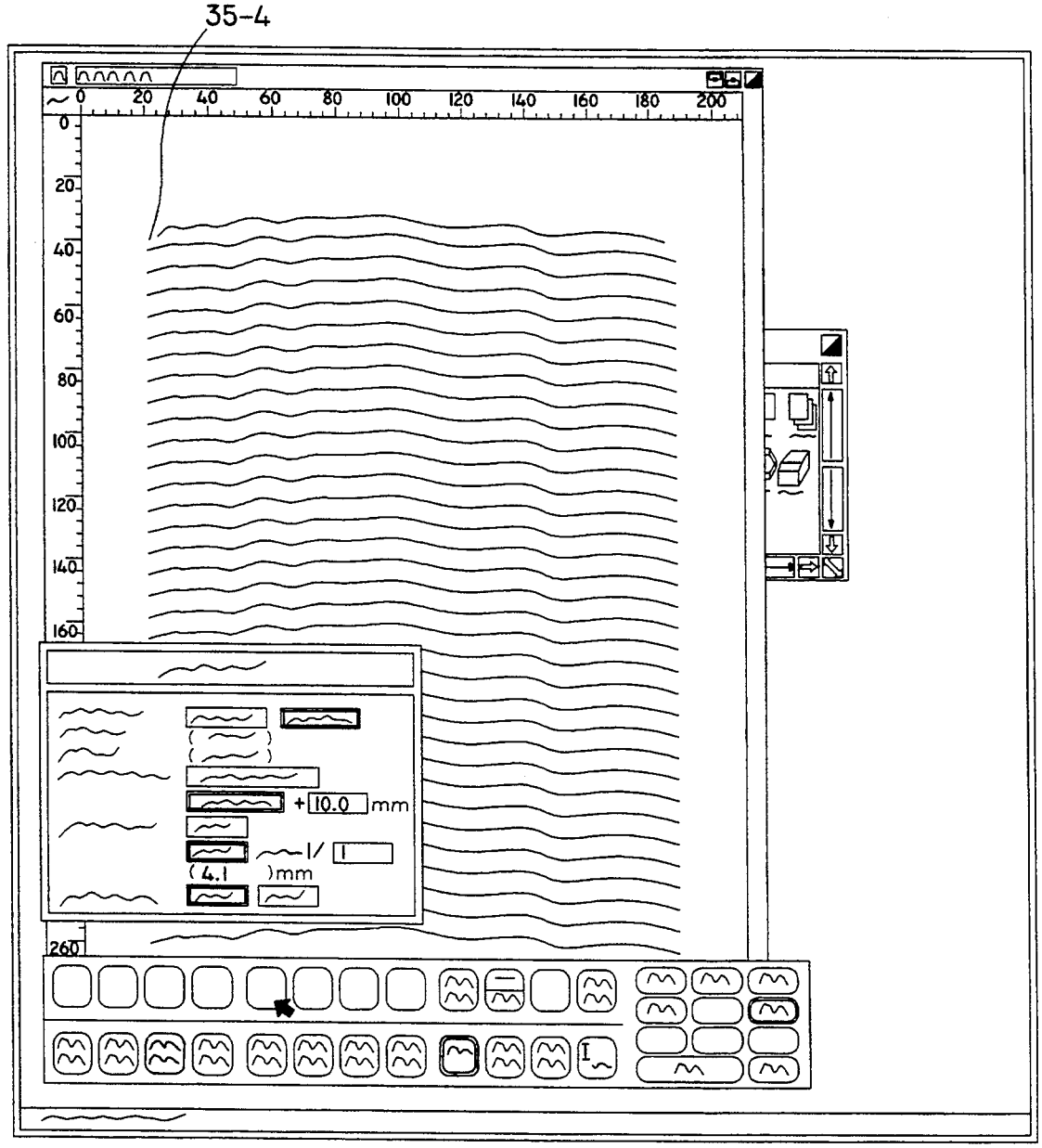

FIG. 35E shows a measure in which an offset value of a grid origin position is designated. The grid origin position is set to be position coordinates 35-4 by an offset value.

An offset designation direction is associated with a grid space designation method. If the grid space is designated by the character pitch, the offset designation direction is a direction of character (i.e., X direction for horizontal layout on the display screen, or Y direction for vertical layout thereon) in character pitch designation. However, if line pitch designation is performed, the offset designation direction is a direction of line (i.e., Y direction for horizontal layout on the display screen, and X direction for vertical layout on the display screen).

Figure 35F:
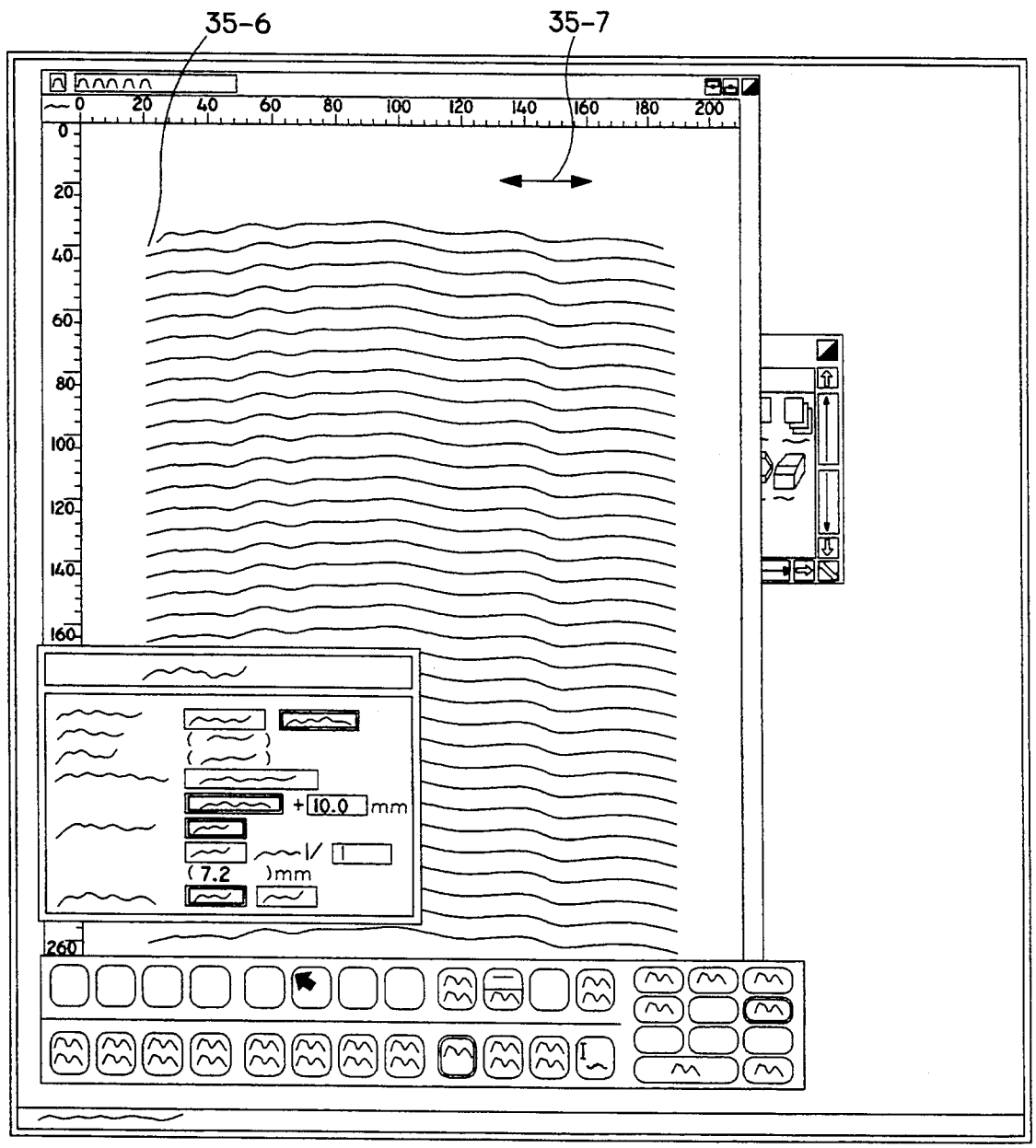

FIG. 35F shows a measure in which a grid space is designated by a line pitch. Since a grid space 35-7 is designated by a line pitch, it can be given by a line pitch of 7.2 mm designated in the format 35-1. The grid origin position is set as position coordinates 35-6.

Inhibited Area Processing

Figure 36:
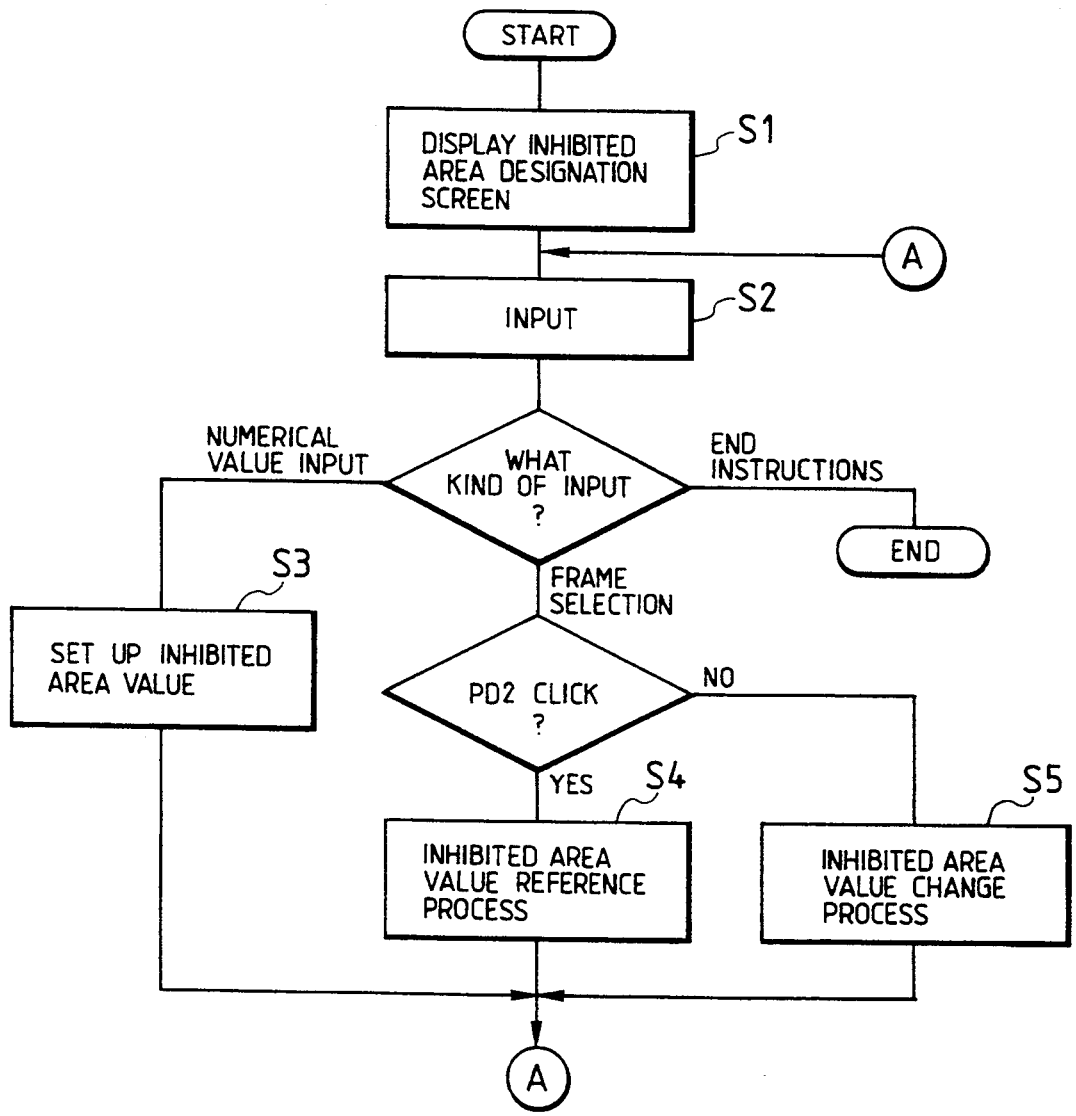
FIG. 36 is a flow chart for explaining inhibited area processing.

FIG. 36 is a flow showing inhibited area processing shown in FIG. 15.

When an inhibited area command is selected by the PD 1-7 or the KBD 108, the inhibited area designation screen 15-2 is displayed. At this time, the present inhibited area values are displayed in the upper, lower, left, and right columns of the inhibited area designation screen (step S1).

Each column of the inhibited area is designated by the PD 107 or the KBD 108, and a value input from the KBD 1-8 is defined as an inhibited area value (step S3).

When a fixed frame is selected by an input (step S2) from the PD 1-7 or the KBD 108, this fixed frame (or a plurality of frames) is set in the selection state. The inhibited area values displayed on the inhibited area designation screen are set as inhibited area values of this fixed frame. These values are written in the inhibited area 22-7 of the fixed frame control table of the selected fixed frame (step S5).

The inhibited area of the fixed frame is set outside 15-1 of the frame. Sentence data cannot be developed in the frame inhibited area by composition (16-2).

When a fixed frame is selected by a click input (step S2) of the PD 1-7, the inhibited area values set for the selected fixed frame are re-displayed on the inhibited area designation screen. These values define inhibited areas of fixed frames to be formed later.

Line Type Processing

Figure 37:
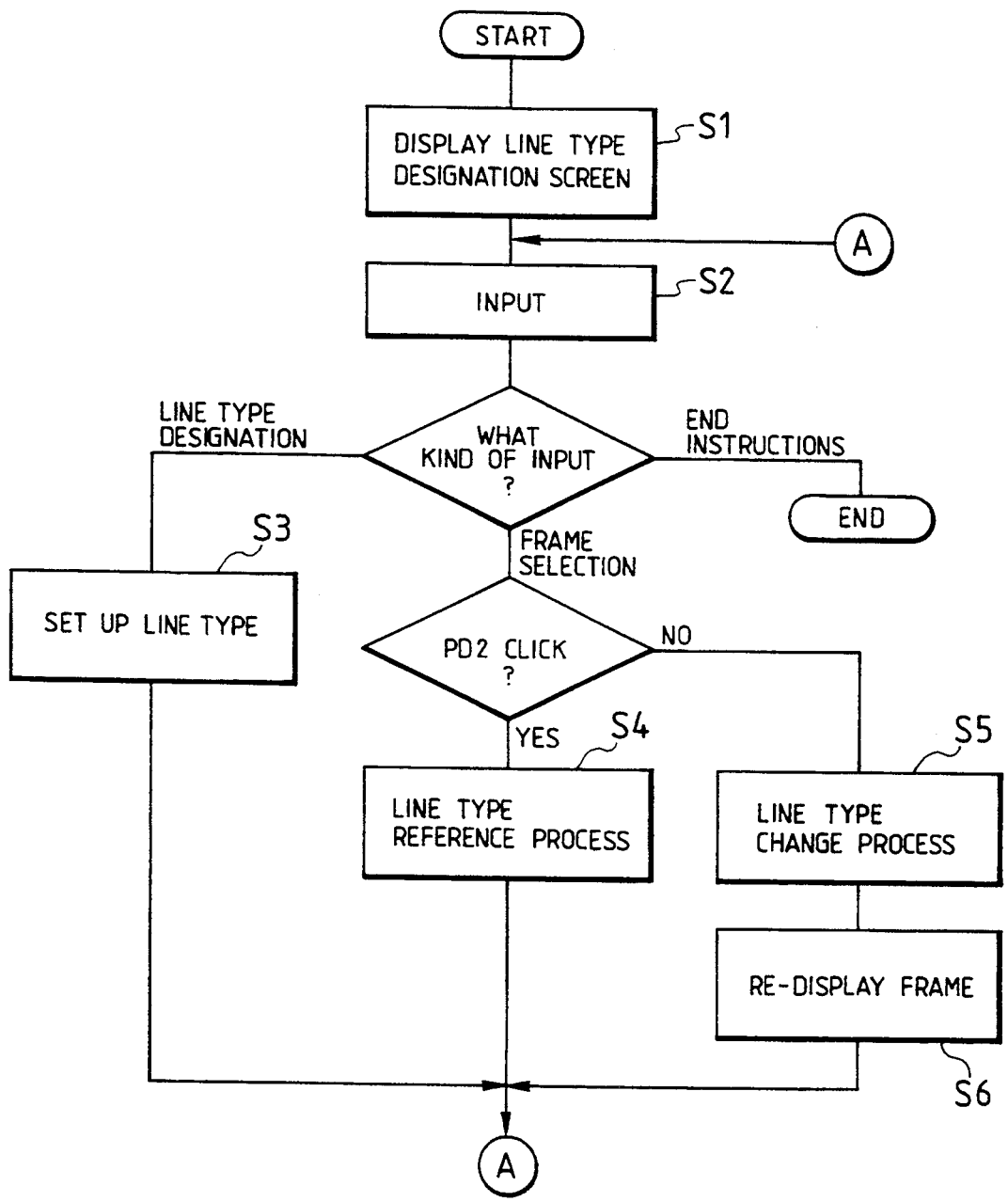
FIG. 37 is a flow chart for explaining line type processing.

FIG. 37 is a flow chart of line type processing.

When a line type command is selected by the PD 1-7 or the KBD 1-8, a line type designation screen is displayed. At this time, a presently set line type is displayed on the line type designation screen (step S1).

A line type is designated by an input (step S2) from the PD 1-7 or the KBD 1-8 (step S3).

In line type designation, a line type (e.g, a solid line, a dotted line, and a broken line), a line width (corresponding to a printing width), a line color (black, gray, or white) can be designated.

When a given fixed frame is selected by an input (step S2) from the PD 1-7 or the KBD 1-8, this fixed frame (or a plurality of frames) is set in the selection state. A line type (line type, line width, and line color) displayed on the line type designation screen is selected as a line type of the given fixed frame (step S5), and the given fixed frame is re-displayed (step S6). At the same time, the line type and the line width are written in the line type 22-2 of the fixed frame control table of the selected given fixed frame.

When the fixed frame is selected by a 2-click input (step S2) of the PD 1-7, the line type set in the selected fixed frame is displayed on the line type designation screen. This value serves as line type for subsequent fixed frames.

Paste Image Processing

Figure 38:
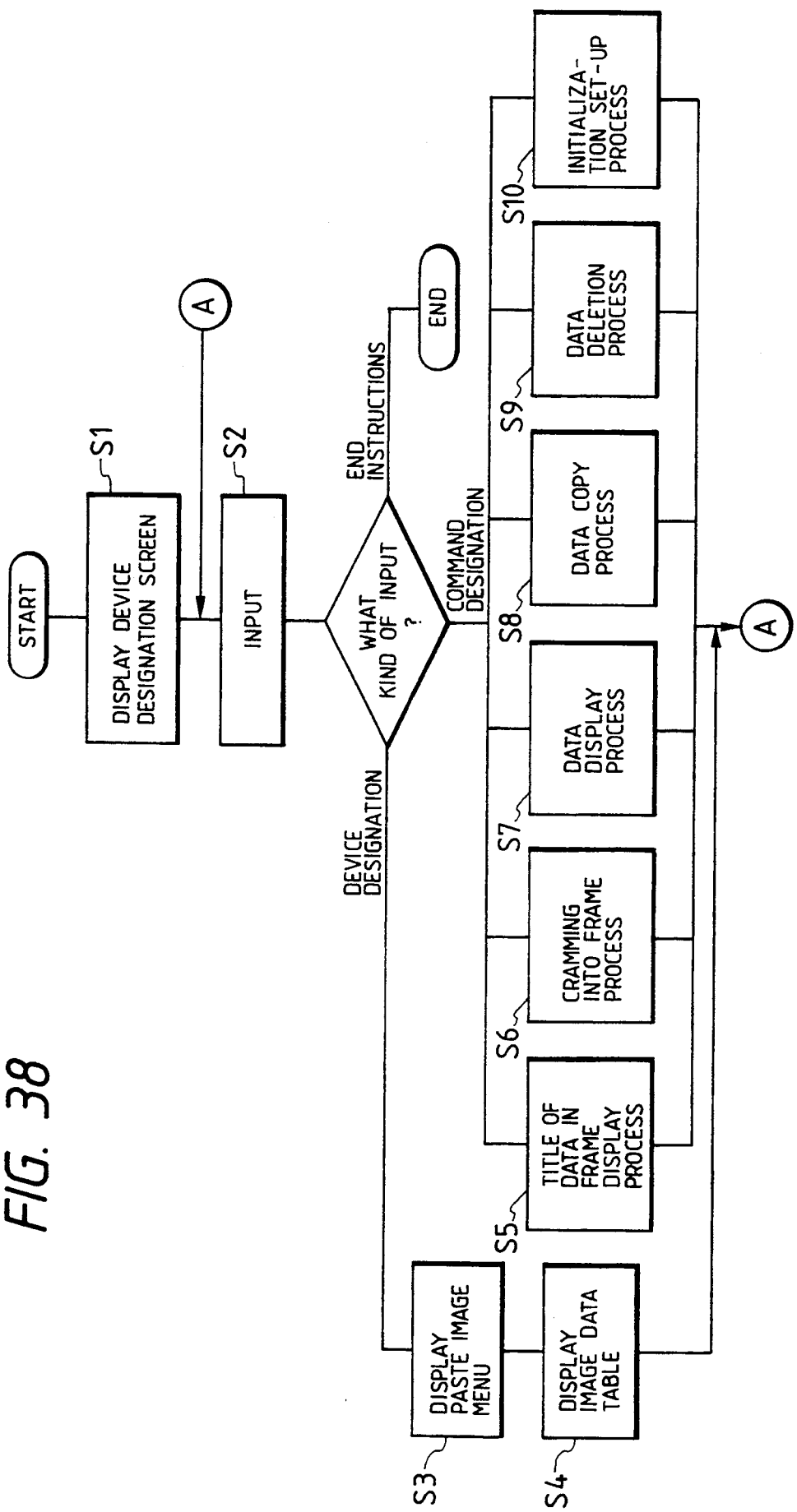
FIG. 38 is a flow chart for explaining paste image processing.

FIG. 38 is a flow chart of paste image processing shown in FIG. 17.

When a paste image command 6-14 is selected by the PD 1-7 or the KBD 1-8, an image for designating a device which stores the paste image data, i.e., a device designation screen, is displayed (step S1). When a device is selected by an input (step S2) from the PD 1-7 or the KBD 1-8, a paste image data screen shown in FIG. 17 is displayed. Paste image processing commands and a paste image data table (data name, data size, data registration date, and data updating date) stored in the device are displayed (steps S3 and S4).

Each command of paste image processing is selected by an input (step S2) from the PD 1-7 or the KBD 1-8, and the corresponding operation is performed.

Each command execution in paste image processing will be described below.

"Title of Data In Frame" Display Processing

When a "title of data in frame" display command is selected by the PD 1-7 or the KBD 1-8, a "title of data in frame" display screen is displayed. When a fixed frame on an editing document page is designated by an input from the PD 1-7, the type of data within the fixed frame is analyzed from the fixed frame control table of the selected fixed frame. When image data is present in the image layer of the fixed frame, the title of image data is displayed on the "title of data in frame" display screen. When an element on the display screen except for the fixed frame on the editing document page is designated, the type of background data is analyzed. If image data of the image layer of this page is present, the title of the image data is displayed on the title of data in frame" display screen.

"Cramming Into Frame" Processing

When a fixed frame on the editing document page is designated by an input from the PD 1-7, the designated frame is set in the selection state. At this time, when image data displayed in the table on the paste image data screen is selected, the image data is crammed into the selected fixed frame, and the resultant frame is re-displayed.

When image data displayed in the table on the paste image data screen is designated, this image data is selected and inversely displayed. At this time, if the fixed frame on the editing document page subjected to cramming is selected, the selected image data is crammed in this fixed frame, and the resultant frame is re-displayed.

In this case, cramming is performed in a 1-to-1 magnification mode.

"Data in Medium" Display Processing (Data Display Process)

When image data displayed in the table on the paste image data screen is designated by an input from the PD 1-7, this image data is selected and inversely displayed. A data display screen for displaying the contents of the data is formed, and the selected image data is displayed on the screen.

"Data in Medium" Copy Processing (Data Copy Process)

When image data displayed in the table on the paste image data screen is designated by an input from the PD 1-7, this image data is selected and inversely displayed. A device designation screen for designating a copy destination of the selected image data is displayed.

When a copy destination device is designated by the PD 1-7 or the KBD 1-8, the selected image data is copied into the designated device. After copy operation is completed, a paste image data screen of the copy destination device is displayed.

"Data in Medium" Deletion Process (Data Deletion Process)

When image data displayed in the table on the paste image data screen is designated by an input from the PD 1-7, this image data is selected and inversely displayed. A message for confirming deletion is displayed. By an operation after confirmation, the selected image data is deleted from the storage destination device, and the image data table on the paste image data screen is re-displayed.

Initialization Set-Up Process

An initialization set-up command is selected by the PD 1-7 or the KBD 1-8, a message for confirming initialization set-up is displayed. By an operation after confirmation, all image data of the storage destination device are deleted, and the image data table on the paste image data screen is re-displayed.

Floating Frame Editing Processing

FIG. 39A is a flow chart of a floating frame editing processing shown in FIG. 18. Screen inputs from the PD 1-7 and key inputs from the KBD 1-8 are analyzed (step S1), and the contents of the corresponding operations are shown.

When the image control command 18-7 is input, image control processing is performed. In screen control processing, screen enlargement/reduction display, grid and measure display, and display of each data (e.g., form data, image data, graphic data, wordprocessor data) are designated (step S3).

When re-display is designated, re-display processing is performed. In re-display processing, the presently edited document page is recomposed by composition, and the recomposed page is re-displayed (step S4).

When scrolling processing is designated, scrolling processing is performed. In scrolling processing, the display screen is scrolled in accordance with the designation, and the scrolled screen is re-displayed (step S5).

When page feed processing is designated, page feed processing is performed. In page feed processing, a page designated by the page feed command 18-8 or a page before or after the presently edited document page is displayed (step S6).

When another floating editing command except for the above commands is input, a floating frame editing command (to be described later) is executed (step S2).

Figure 39B:
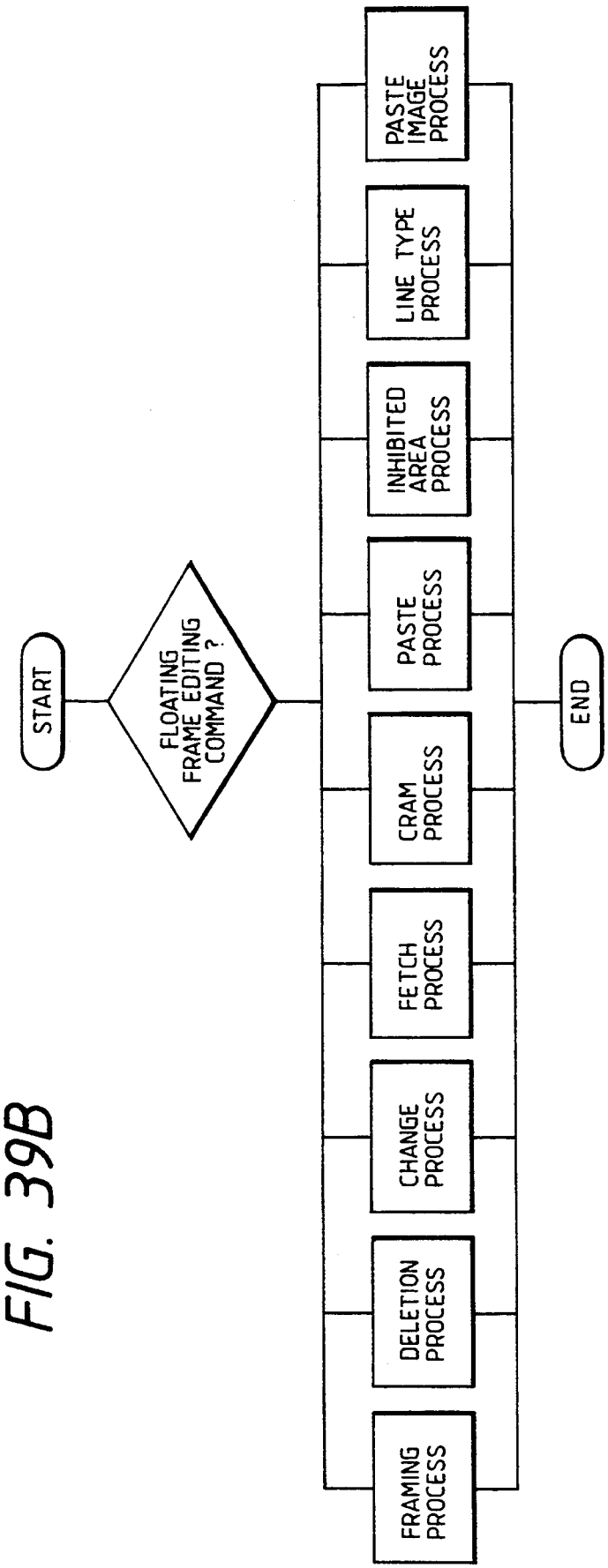

FIG. 39B is a flow chart of floating frame editing command processing. More specifically, FIG. 38B shows commands corresponding to screen inputs from the PD 1-7 and key inputs from the KBD 1-8 (18-1 to 18-11 in FIG. 18).

These floating frame editing command operations will be described below.

Floating Frame Framing Processing

Figure 40:
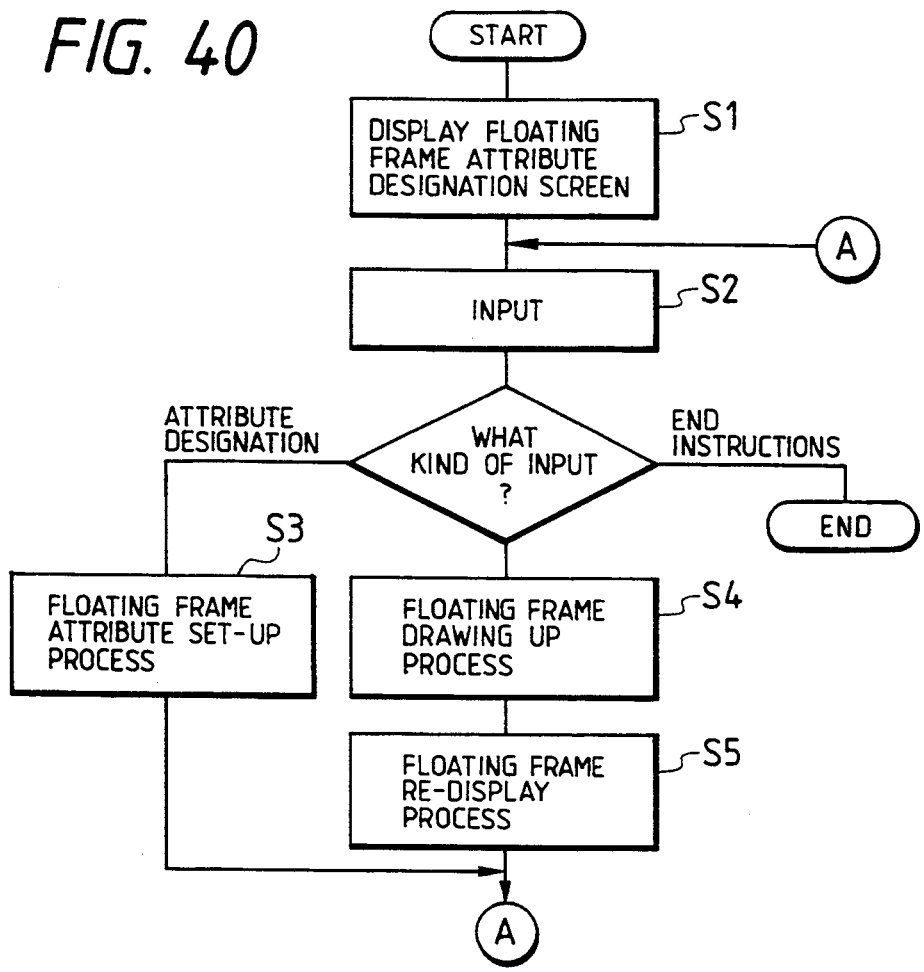
FIG. 40 is a flow chart for explaining floating frame framing.

FIG. 40 is a flow chart showing floating frame framing processing shown in FIG. 19A.

When a floating frame framing command is selected by the PD 1-7 or the KBD 1-8, the floating frame set-up menu screen or floating frame attribute designation screen 19-1 is displayed (step S1). In this case, floating frame attributes presently set in the floating frame are displayed on the floating frame attribute designation screen 19-1.

A floating frame attribute is designated by an input (step S2) from the PD 1-7 or the KBD 1-8. A floating frame is formed and displayed by floating frame formation designation.

Floating frame command data shown in FIG. 23 is inserted into a sentence data address represented by the character editing cursor 5-2. A floating frame command parameter is generated from the floating frame attribute information.

The number of columns designated by floating frame set-up menu, base line designation within lines, shift designation within a column or across all columns, and width and height offset information are written in the flag 24-2. The frame line type 24-3 stores a line type, a line color, and a line width of a floating frame presently set by line type processing (to be described later). The frame size 24-4 stores frame width and height values designated by a special set-up column of the floating frame set-up menu in units of 1/10 mm. The offset 24-5 stores an offset value from the base line when the value is designated within lines, width and height offset values when the values are designated within a column or across all columns. The frame size 24-6 stores values representing the number of characters or lines within the frame. The inhibited area 24-7 stores inhibited area values presently set by inhibited area processing (to be described later). A floating frame data length stores a data length from the floating frame command start 23-1 position to the floating frame command end 23-5 position. The floating data 23-3 in framing is 0.

A floating frame command is inserted into sentence data (step S3), and the edited document page having the floating frame therein is re-displayed (step S4). In this case, symbols representing the selection state are displayed at four corners of the frame, respectively.

A floating frame command 19-2 is displayed at the floating frame formation position on the display screen. At the same time, a floating frame control table (FIG. 25) is formed in the main memory 1-5. A frame position, a frame size, an address of the floating frame parameter 23-2 in the sentence data on the page in which the floating frame is formed are written in a floating frame command address 25-6.

FIGS. 19B and 19C show floating frame formation when a floating frame is designated within lines, FIGS. 20A and 20B show floating frame formation when a floating frame is designated within a column, and FIG. 21A shows floating frame formation when a floating frame is designated across all columns.

Floating Frame Deletion Processing

Figure 41:
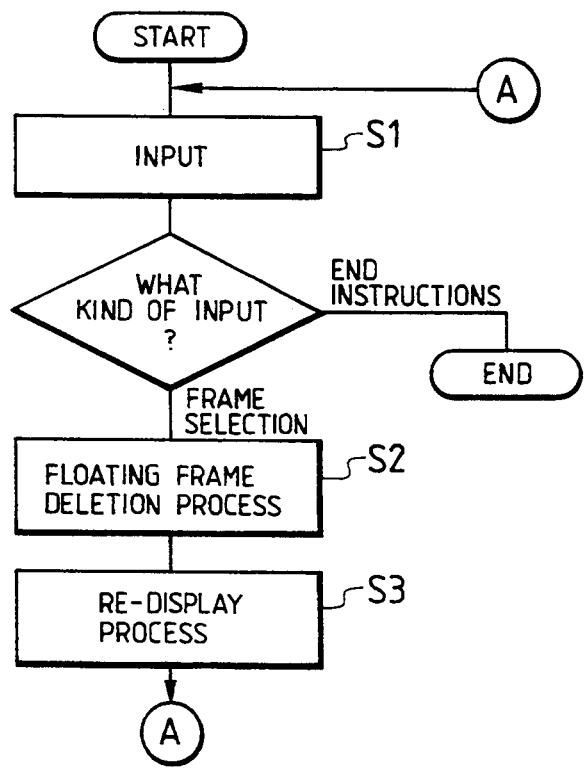
FIG. 41 is a flow chart for explaining floating frame deletion processing.

FIG. 41 is a flow chart of floating frame deletion processing.

When a floating frame to be deleted from a document sheet is selected by an input (step S1) from the PD 1-7, this floating frame is set in the selection state, and a message for requesting deletion confirmation is displayed. Upon an operation by confirmation, a floating frame command included in sentence data on the editing document page is deleted from the sentence data, and the floating frame control table of the selected floating frame is deleted from the main memory 1-5 (step S2). The processed page is re-displayed (step S3).

Floating Frame Change Processing

FIG. 42 is a flow chart of floating frame change processing.

When a floating frame on the document sheet is selected by an input (step S1) from the PD 1-7, this floating frame is set in the selection state.

The floating frame set-up menu screen or floating frame attribute designation screen 19-1 is displayed (step S2), and attribute information of the selected floating frame is displayed on this screen (step S3).

Each attribute displayed on the floating frame set-up menu screen is redesignated by an input (step S1) from the PD 1-7 or the KBD 1-8 in the same manner as in floating frame framing processing. When attribute change designation is completed, and execution of the change is designated, the command parameter of the selected floating frame is updated on the basis of the redesignated attribute information (step S5). The editing document page having the updated floating frame is re-displayed (step S6).

Floating Frame Fetch Processing

A frame subjected to processing is a floating frame, and the processing contents are the same as those of fixed frame fetch processing.

Floating Frame Cram Processing

A frame subjected to processing is a floating frame, and the processing contents are the same as those of fixed frame cram processing.

Floating Frame Paste Processing

Figure 43A:
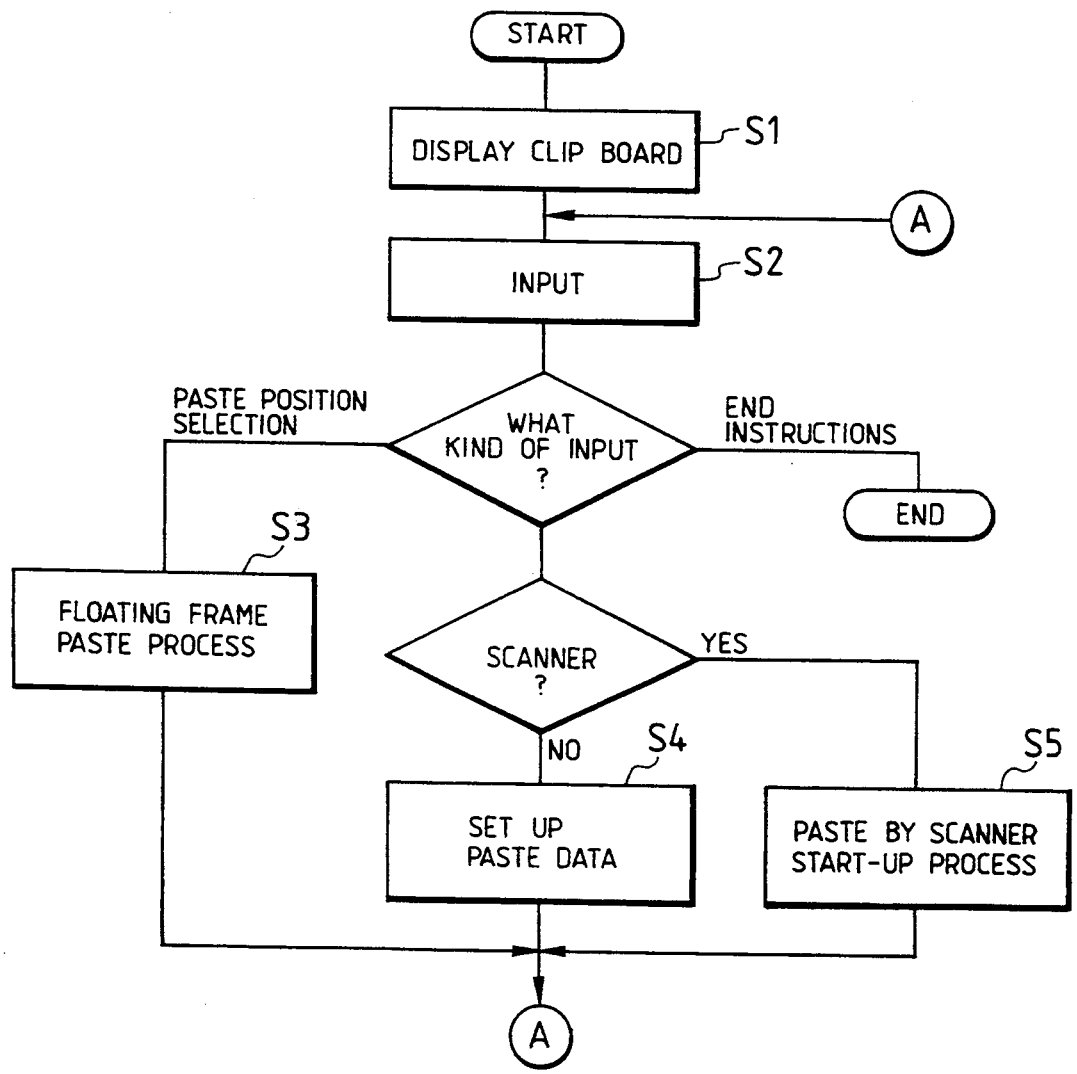
FIG. 43A is a flow chart for explaining floating frame paste processing.

FIG. 43A is a flow chart of floating frame paste processing.

When a floating frame paste command is selected by the PD 1-7 or the KBD 1-8, the clip board screen 7-4 which stores data to be pasted by floating paste processing is displayed. Data files presently stored in the clip board are displayed on the clip board screen by icons representing the types of data (step S1). At this time, the latest data of all the paste data stored in the clip board is automatically selected as the first paste data and inversely displayed.

When data to be pasted is selected, a message for confirming paste is displayed. Upon confirmation of this message, paste processing is performed.

A paste position is the present position of the character editing cursor 5-2. Floating frame command data in FIG. 23 is formed and inserted into sentence data address corresponding to this cursor position. A floating frame command parameter is formed from block information of the clip board data. Formation of the floating frame command is the same as that of floating frame framing processing.

After the floating frame command is inserted into the sentence data, the edited document page having the floating frame therein is re-displayed (step S3).

When a data icon displayed on the clip board screen 7-4 is selected by an input from the PD 1-7, paste data can be arbitrarily selected. The selected data icon is inversely displayed (step S4).

Figure 43B:
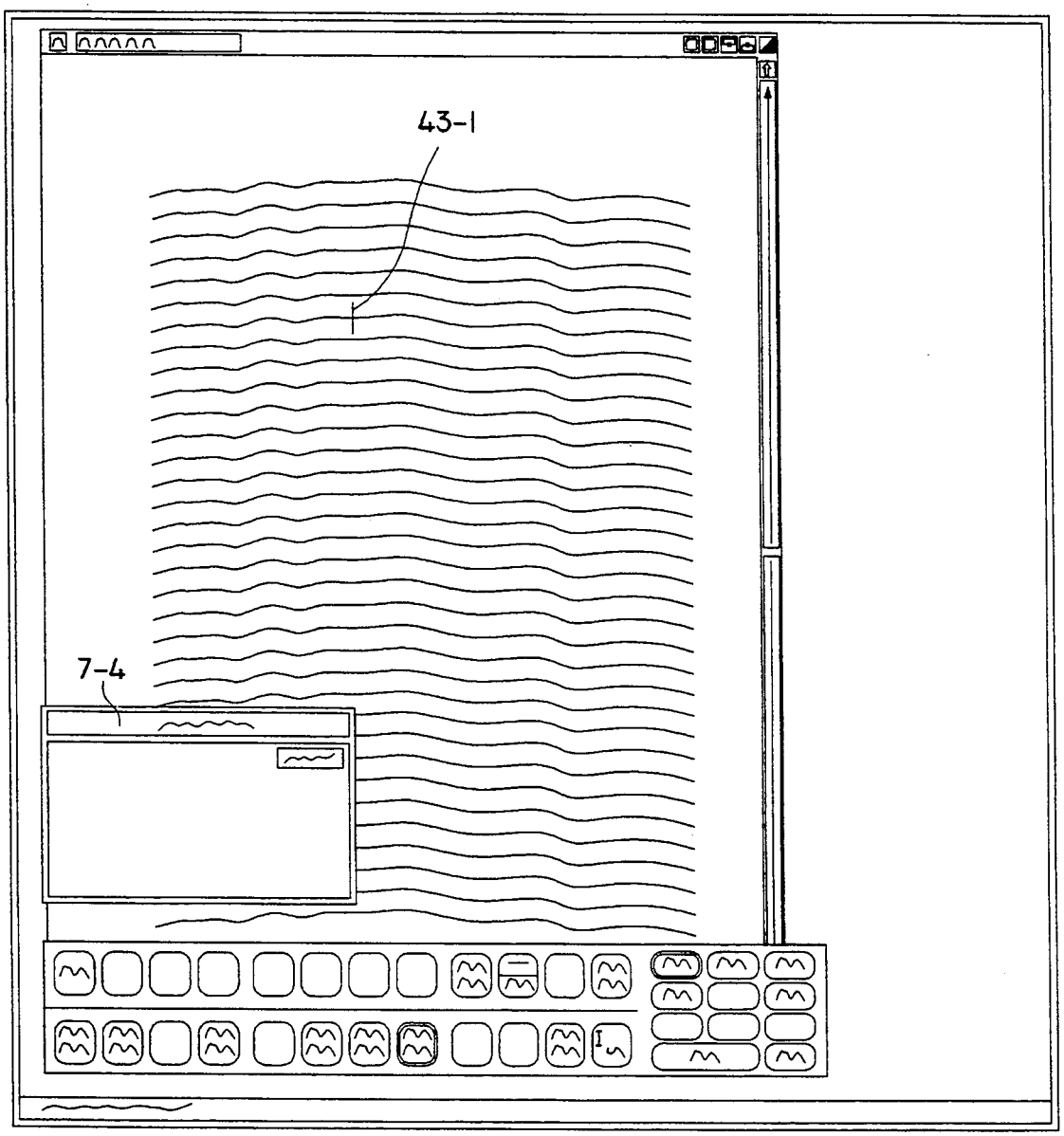
FIGS. 43B to 43D are views for explaining floating frame paste processing using data read from the scanner.
Figure 43C:
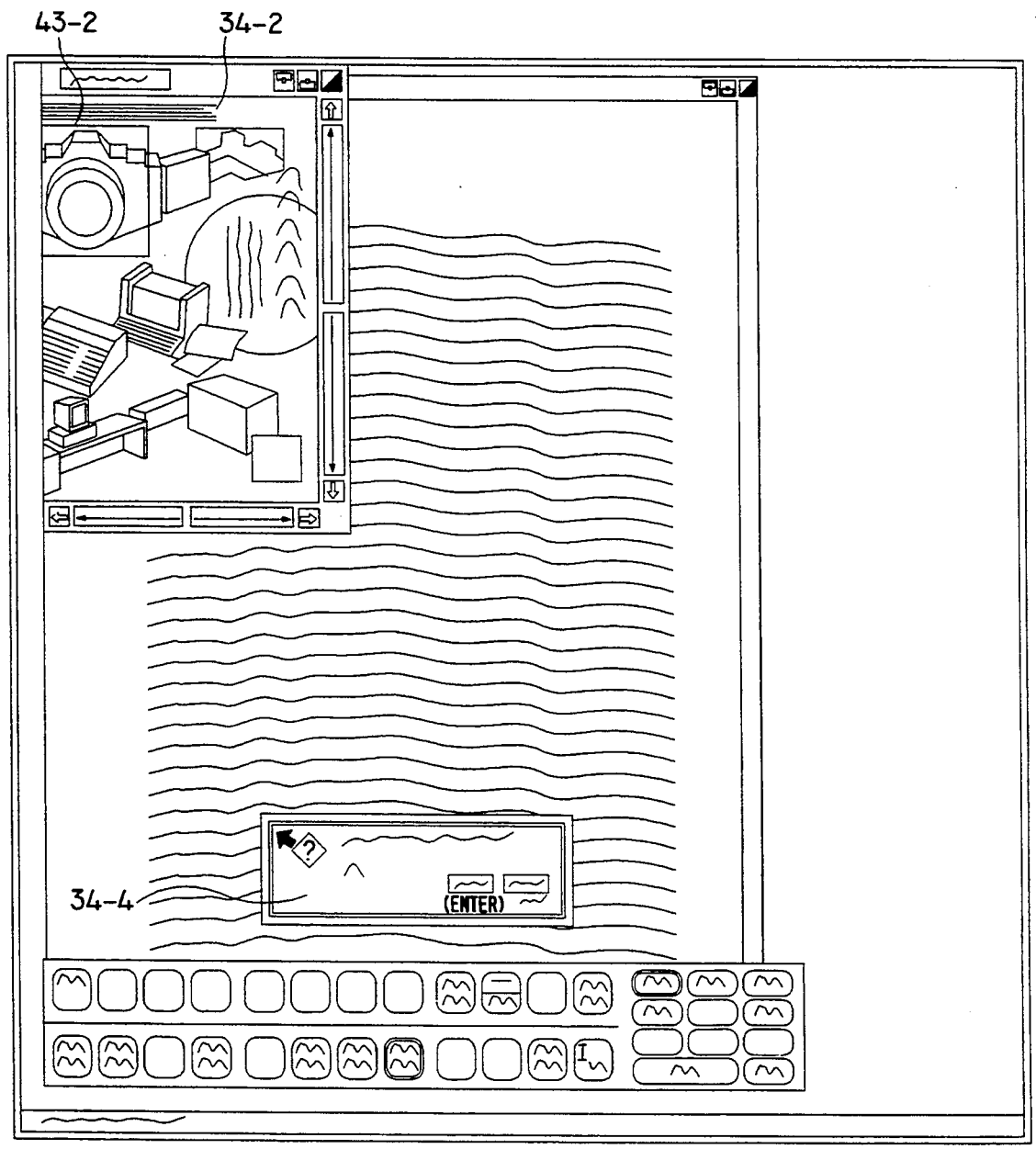
Figure 43D:
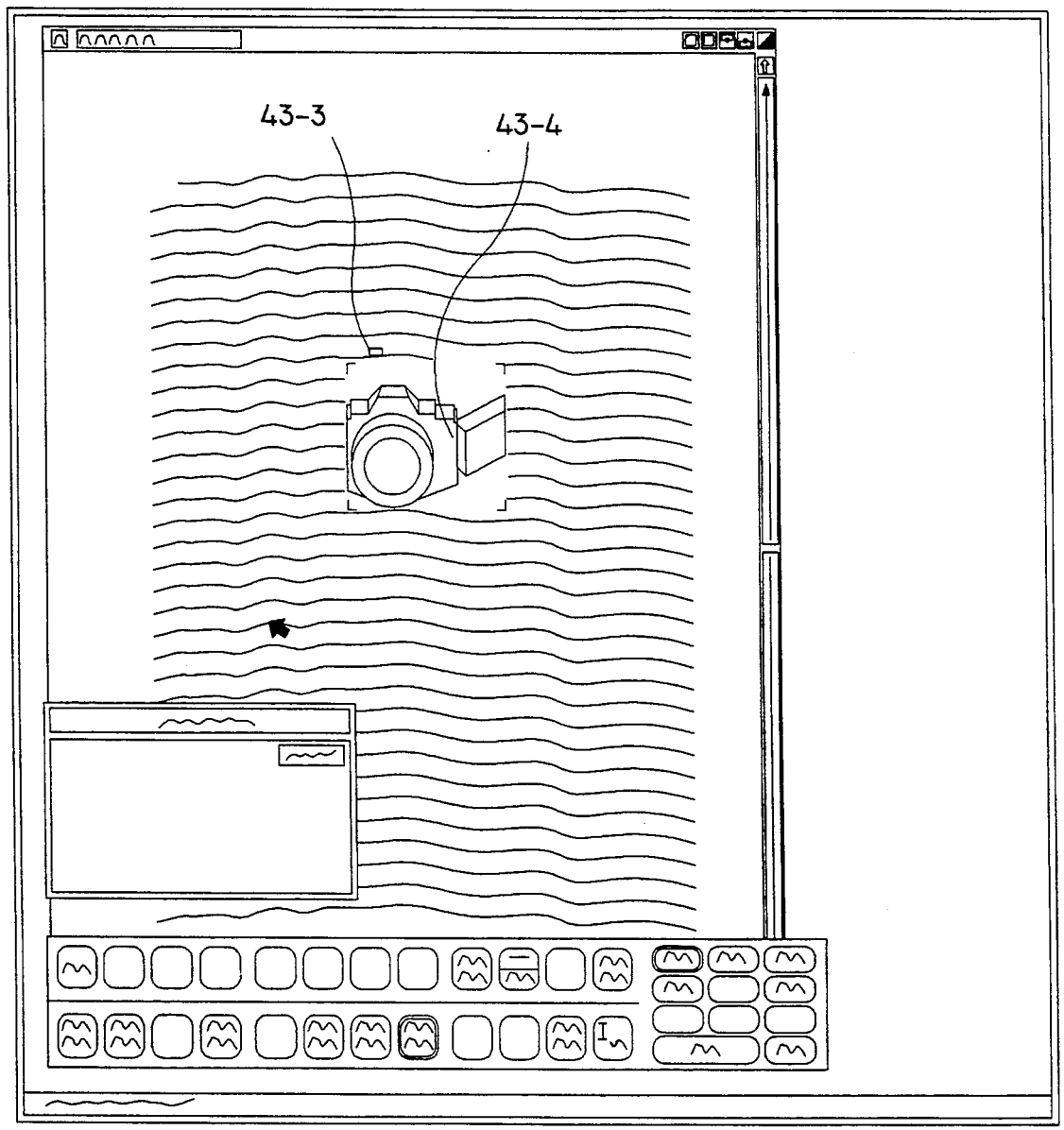

FIGS. 43B to 43D are views showing paste processing in which image data is read from the scanner 1-10 and pasted as a floating frame on the editing document page.

When a scanner portion on the clip board screen 7-4 is designated by the PD 1-7, the scanner 1-10 is started to display the scanner image display screen 34-2 for displaying image data. The read image data is then displayed on the screen. When image is read from the scanner, magnifications can be designated.

When a paste data range 43-2 is designated on the scanner image display screen upon continuous depression of the PD 1-7, a confirmation message 34-4 for confirming execution of paste processing of the image data within the designated range is displayed. Upon confirmation of this message, the image data within the designated range is defined as paste data, and the scanner image display screen is erased.

The paste position is the present position of the character editing cursor 43-1, and a floating frame command is formed at this cursor position. An edited document page having a floating frame 43-4 therein is re-displayed.

A floating frame command mark 43-3 is displayed at the floating frame formation position.

Inhibited Area Processing

A frame to be processed is a floating frame, and the processing contents are the same as those of fixed frame inhibited area processing.

An inhibited area cannot be set for a floating frame formed by designation within lines.

An inhibited area cannot be set in the upper portion when an editing document page format is given by horizontal layout. Similarly, an inhibited area cannot be set in the right portion when the page format is given by vertical layout.

Line Type Processing

A frame to be processed is a floating frame, and the processing contents are the same as those of fixed frame line type processing.

Paste Image Processing

A frame to be processed is a floating free, and the processing contents are the same as those of fixed frame paste image processing.

According to the present invention as has been described in detail above, graphic data, image data, and character data for a frame can be controlled and can be selectively fetched from the free. In addition, only frame size data can be fetched.

According to the present invention as has been described in detail above, frame movement and layout can be easily matched with format information.

According to the present invention, when the size of the formed frame is changed, data can be moved and displayed in accordance with types of internal data. In addition, even if the frame size is changed, an image and a graph are not moved, so that explanatory data (an image and/or a graph) can be easily added to a space formed by, e.g., enlargement.

According to the present invention as has been described above, when size information and a frame stored together with the frame data are displayed at a desired sheet position, the frame size can be preserved until a desired position is confirmed. When the desired position is confirmed, the data within the frame is displayed at the desired position. Therefore, high-speed display can be achieved, and sheet layout can also be easily visually understood.

According to the present invention, background data except for the character data can be easily moved to another page.

According to the present invention as has been described in detail above, a movement destination can be designated while a page having a frame to be moved is being displayed. Therefore, the frame can be easily moved to the movement destination in the same layout as that of the original page.

According to the present invention as has been described above, graphic data, image data, and character data which are simultaneously displayed on the sheet can be easily controlled. A character data inhibited area can be formed outside the frame on the sheet. Graphic or image data can be displayed in the inhibited area. Therefore, a supplementary picture (a graph or an image) of the frame can be easily input and displayed, and matching of the graphic or image data with the character data outside the frame can be easily achieved.

According to the present invention as has been described above, a plurality of types of data for the frame can be independently controlled.

According to the present invention, data can be independently crammed in a frame in accordance with the types of data.

According to the present invention, character data can be rearranged in accordance with its format information and can be crammed in a frame.

According to the present invention as has been described above, a frame stored together with positional information is designated to easily determine a frame position with respect to the presently displayed sheet.

According to the present invention as has been described above, a plurality of frames present in a one-page document consisting of at least two of image data, graphic data, and character data are selected and are simultaneously moved. The graphic data, the image data, and the character data which are assigned to the respective frames can also be easily moved.

According to the present invention as has been described above, there is provided a document processing apparatus capable of directly cramming image data read from the scanner in a frame.

According to the present invention, there is provided a document processing apparatus wherein image data can be read during document formation, and a cut image frame can be associated with a frame in the document.

According to the present invention, there is provided a document processing apparatus wherein document formation and image reading can be continuously performed with a simple manipulation, and an image cut by a frame size can be input to an image data layer of a document frame having character, graphic, and image layers.

What is claimed is:

1. A document processing apparatus comprising:
control means for controlling graphic data, image data, and character data for a frame formed on a sheet;
storage means for storing frame size data of the frame; and
means for selectively obtaining the frame size data stored in said storage means or one of the graphic data, image data and character data, alone or in combination, controlled by said control means when the graphic data, the image data or the character data exist in the frame.

2. An apparatus according to claim 1, wherein said control means and said storage means control and store data, respectively, within a frame data table formed for the frame.

3. A document processing apparatus capable of editing a sheet on display means, comprising:
means for determining types of data within a frame;
change designating means for designating a change in size of the frame; and
control means for controlling the change in size of the frame on the basis of designation of said change designating means and for determining whether the data in the frame is moved and then displayed within the frame in accordance with the changed size and the type of data determined by said determining means.

4. An apparatus according to claim 3, wherein said determining means determines that the type of data is character data, or graphic or image data.

5. An apparatus according to claim 3, wherein said control means moves and then displays the character data in accordance with the change in size of the frame.

6. A document processing apparatus comprising:
storage means for storing information associated with a frame;
format setting means for setting format information associated with sentence editing;
grid setting means for setting a grid so as to have a space corresponding to the format information;
designating means for designating a movement amount of the frame; and
defining means for defining the movement amount to be an integer multiple of the grid space on the basis of said designating means.

7. An apparatus according to claim 6, wherein said grid comprises dots as a reference for movement of the frame.

8. An apparatus according to claim 6, wherein the format information includes at least line pitch information and character pitch information.

9. An apparatus according to claim 6, wherein said designating means comprises a pointing device for pointing a position.

10. A document processing apparatus capable of editing a sheet on display means, comprising:
size storage means for storing size information of a frame;
data storage means for storing data within the frame;
display designating means for designating to the display of the frame on a desired sheet;
position designating means for designating a position on a display screen; and
control means for controlling said display means to visually display the frame size information at the position designated by said position designating means, the size information being stored in said size storage means, and to visualize data in the frame at the position designated by said position designating means on the basis of designation by said display designating means, the data in the frame being stored in said data storage means.

11. An apparatus according to claim 10, wherein said control means controls said display means to display only an edge of the frame so as to signal the frame size.

12. A document processing apparatus comprising:
control means for controlling graphic data, image data, and character data for a sheet; and
designating means for obtaining the image or graphic data associated with a given sheet under the control of said control means and obtaining at least two of the graphic data, image data and character data so that at least two of the graphic data, the image data, and the character data overlap each other.

13. An apparatus according to claim 12, wherein the obtained data is background data except for character data included in the given sheet.

14. A document processing apparatus comprising:
storage means for storing document information comprising a plurality of pages;
display means for displaying the document information of one of the plurality of pages stored in said storage means; and
movement designating means for designating movement of only a frame of one of the plurality of pages to an identical position of another one of the plurality of pages while the one of the plurality of pages having the frame is being displayed on said display means.

15. An apparatus according to claim 14, wherein said storage means comprises a table for storing a frame position on said one page.

16. An apparatus according to claim 14, wherein said movement designating means comprises page designating means for designating a destination page.

17. A document processing apparatus comprising:
control means for controlling graphic, image, and character data which can be simultaneously displayed on a sheet so that at least two of the graphic data, the image data, and the character data overlap each other on the sheet;
storage means for storing positional information of a frame formed on the sheet; and
area setting means for setting an area outside the frame,
wherein the graphic or image data except for the character data is displayed by said control means in the area set by said area setting means.

18. An apparatus according to claim 17, wherein the character data is displayed outside the set area by said control means.

19. A document processing apparatus capable of independently controlling and editing character, graphic, and image data as a plurality of types of data for a frame formed on a display screen, comprising:
first storage means for storing a plurality of types of data assigned to a first frame;
second storage means for storing a plurality of types of data assigned to a second frame; and
designating means for designating selective cramming of the data of the second frame into the first frame,
wherein the data of the second frame is replaced with the same type of data of the first frame and is crammed in the first frame on the basis of designation of said designating means so that at least two of the graphic data, the image data, and the character data overlap each other on the display screen.

20. An apparatus according to claim 19, wherein said designating means designates at least one type of data of the plurality of types of data.

21. An apparatus according to claim 19, wherein the character data of the second frame is replaced with the character data of the first frame and rearranged in the first frame on the basis of format information of the character data.

22. An apparatus according to claim 19, wherein the graphic data of the second frame is replaced with the graphic data of the first frame and crammed in the first frame.

23. A document processing apparatus capable of editing a sheet on display means, comprising:
storage means for storing frame position data of a plurality of frames and for storing data in each frame;
frame designating means for designating one of the frames stored in said storage means; and
control means for controlling the display means to display a layout state of the frame corresponding to the sheet presently displayed on the display means on the basis of a frame designated by said frame designating means.

24. An apparatus according to claim 23, wherein said control means does not display the layout state of data within the frame but displays an edge of the frame.

25. A document processing apparatus capable of independently controlling and editing character, graphic, and image data as a plurality of types of data for a frame, comprising:
storage means for storing frame size data;
display means for displaying the frame; and
display control means for causing said display means to display a read image and displaying on said display means size data based on the frame size data stored in said storage means.

26. An apparatus according to claim 25, wherein said display means controls display of a cut state of the image on the basis of the size.

27. An apparatus according to claim 26, wherein the cut image is controlled as frame image data.

28. An apparatus according to claim 26, wherein said display control means controls the displayed size on the basis of a magnification factor corresponding to the size data and an image cut area.

29. A document processing apparatus comprising:
frame designating for selectively designating some of a plurality of frames present in a one-page document comprising at least two of image data, graphic data, and character data so that at least two of the graphic data, the image data, and the character data overlap each other;
storage means for storing positional information of each frame and information for specifying data associated with each frame;
movement amount designating means for designating a movement amount of the frame; and
updating means for updating the positional information stored in said storage means for storing the plurality of frames designated by said frame designating means, on the basis of the movement amount designated by said movement amount designating means.

30. An apparatus according to claim 29, wherein the specific information is data for specifying which data of the image, graphic and character data are included in each frame.

31. An apparatus according to claim 29, wherein said movement amount designating means comprises a pointing device for designating a position.

32. A document processing method comprising the steps of:
controlling graphic data, image data, and character data for a frame formed on a sheet with control means and stored in first storage means so that at least two of the graphic data, the image data, and the character data overlap each other;
storing size data of the frame in second storage means; and
designating the size data to be read out of said second storage means or designating one of the graphic, image, and character data controlled by said control means to be read out of said first storage means.

33. A document processing method according to claim 32 wherein said graphic data, image data, character data, and size data are data within a frame data table formed for the frame.

34. A document processing method for editing a sheet on display means, comprising the steps of:
  determining types of data within a frame;
  designating a change in size of the frame;
  controlling the change in size of the frame on the basis of the designating in said designating step and determining whether the data in the frame is moved and then displayed within the frame in accordance with the changed size and the type of data determined in said determining step.

35. A document processing method according to claim 34 wherein said controlling and determining step comprises the step of determining that the type of data is character data, graphic date, or image data.

36. A document processing method according to claim 34 wherein said controlling step comprises the step of moving and then displaying the character data in accordance with the change in size of the frame.

37. A document processing method comprising the steps of:
  storing information associated with a frame;
  setting format information associated with sentence editing;
  setting a grid so as to have a space corresponding to the format information;
  designating a movement amount of the frame; and
  defining the movement amount to be an integer multiple of a grid space on the basis of the designating in said designating step.

38. A document processing method according to claim 37 wherein the grid comprises dots as a reference for movement of the frame.

39. A document processing method according to claim 37 wherein the format information includes at least line pitch information and character pitch information.

40. A document processing method according to claim 37 wherein said designating step comprises the step of pointing to a position with a pointing device.

41. A document processing method for editing a sheet on display means, comprising the steps of:
  storing size information of a frame in size storage means;
  storing data within the frame in data storage means;
  storing data within the frame in data storage means;
  designating the display of the frame on a desired sheet;
  designating a position on a display screen;
  controlling the display means to visually display the frame size information at the position designated in said position designating step, controlling the size information to store the size information in the size storage means, controlling the data within the frame so that the data within the frame is displayed within the frame at the position designated in said position designating step on the basis of the designating in said display designating step, and controlling the data in the frame so as to store the data in the frame in said data storage means.

42. A method according to claim 41 wherein said controlling step comprises the step of controlling the display means to display only an edge of the frame so as to signal the frame size.

43. A document processing method comprising the steps of:
  controlling graphic data, image data, and character data for a sheet; and
  designating and obtaining at least two of the image data, the graphic data and the character data controlled in said controlling step so that at least two of the graphic data, the image data, and the character data overlap each other on the sheet.

44. A document processing method according to claim 43, wherein said designated data is background data except for character data included in the sheet.

45. A document processing method comprising the steps of:
  storing document information comprising a plurality of pages in storage means;
  displaying the document information of one of the plurality of pages stored in the storage means;
  designating movement of a frame of one of the plurality of pages to an identical position of another of the plurality of pages while one of the plurality of pages having the frame is being displayed on the display means.

46. A document processing method according to claim 45 wherein said storing step comprises the step of storing a frame position of the one of the plurality of pages in a table.

47. A document processing method according to claim 45 wherein said movement designating step comprises the step of designating a destination page for the frame.

48. A document processing method comprising the steps of:
  controlling graphic data, image data, and character data which can be simultaneously displayed on a sheet;
  storing positional information of a frame formed on the sheet;
  setting an area outside the frame; and
  displaying the graphic or image data in the area set in said setting step, and displaying the character data not in the area set in said setting step and displaying at least two of the graphic data, the image data and the character data so that at least two of the graphic data, the image data, and the character data overlap each other on the sheet.

49. A document processing method according to claim 48 wherein said displaying step comprises the step of displaying the character data outside the area set in said setting step.

50. A document processing method for independently controlling and editing character, graphic, and image data as a plurality of types of data for a frame formed on a display screen, comprising the steps of:
  storing a plurality of types of data assigned to a first frame in first storage means;
  storing a plurality of types of data assigned to a second frame in second storage means;
  selectively designating the data of the second frame to be crammed into the first frame; and
  replacing the data of the second frame with the same type of data of the first frame and cramming the data of the second frame into the first frame on the basis of the selective designating in said selective designating step so that at least two of the graphic data, the image data, and the character data overlap each other on the display screen.

51. A document processing method according to claim 50 wherein said designating step comprises the step of designating at least one type of data of the plurality of types of data.

52. A document processing method according to claim 50, wherein said replacing step comprises the step of replacing the character data of the second frame with character data of the first frame and rearranging the character data of the second frame in the first frame on the basis of format information of the character data.

53. A document processing method according to claim 50 wherein said replacing step comprises the step of replacing the graphic data of the second frame with the graphic data of the first frame and cramming the graphic data of the second frame into the first frame.

54. A document processing method for editing a sheet on display means, comprising the steps of:
storing frame position data of a plurality of frames and storing data in each frame in storage means;
designating one of the frames stored in said storage means; and
controlling the display means to display a layout state of the frame corresponding to a sheet presently displayed on the display means on the basis of frame designated in said designating step.

55. A document processing method according to claim 54
wherein said controlling step comprises the step of controlling the display means to display an edge of the frame and to not display the layout state of the data within the frame.

56. A document processing method for independently controlling and editing character data, graphic data, and image data as a plurality of types of data for a frame, comprising the steps of:
storing frame size data in storage means;
displaying a frame on display means; and
controlling the display means to display a read image and displaying on the display means size data based on the frame size data stored in the storage means and controlling the display means so that at least two of the graphic data, the image data, and the character data overlap each other on the display means.

57. A document processing method according to claim 56 wherein the controlling step comprises the step of controlling the display means to display a cut state of the image on the basis of the frame size data.

58. A document processing method according to claim 57 wherein said controlling step further comprises the step of controlling the cut image as frame image data.

59. A document processing method according to claim 57 wherein said controlling step further comprises the step of controlling the display size of the frame on the basis of a magnification factor corresponding to the frame size data and an image cut area.

60. A document processing method comprising the steps of:
storing a plurality of frames present in a one page document comprising at least two of image data, graphic data, and character data so that at least two of the graphic data, the image data, and the character data overlap each other;
selectively designating some of the plurality of frames present in the one page document comprising at least two of image data, graphic data, and character data;
storing positional information of each frame and storing information specifying data associated with each frame in storage means;
designating a movement amount of a frame; and
updating the positional information stored in the storage means on the basis of the movement amount designated in said movement designating step.

61. A document processing method according to claim 60 wherein the specific information is data for specifying which data of the image data, the graphic data, and the character data are included in each frame.

62. A document processing method according to claim 60 wherein said movement designating step comprises the step of designating a position with a pointing device.

* * * * *

UNITED STATES PATENT AND TRADEMARK OFFICE
CERTIFICATE OF CORRECTION

PATENT NO. : 5,337,406
DATED : August 9, 1994
INVENTOR(S) : HIROSHI TAKAKURA, ET AL.

Page 1 of 5

It is certified that error appears in the above-indentified patent and that said Letters Patent is hereby corrected as shown below:

ON THE COVER PAGE

[57] ABSTRACT

Line 1, "an" should read --a--.

INSERT --[30] Foreign Application Priority Data

| November 16, 1987 | [JP] | Japan | ....... | 62-289161 |
| November 16, 1987 | [JP] | Japan | ....... | 62-289171 |
| November 16, 1987 | [JP] | Japan | ....... | 62-289172 |
| November 16, 1987 | [JP] | Japan | ....... | 62-289173 |
| November 16, 1987 | [JP] | Japan | ....... | 62-289174 |
| November 16, 1987 | [JP] | Japan | ....... | 62-289175 |
| November 16, 1987 | [JP] | Japan | ....... | 62-289176 |
| November 16, 1987 | [JP] | Japan | ....... | 62-289177 |
| November 16, 1987 | [JP] | Japan | ....... | 62-289178 |
| November 16, 1987 | [JP] | Japan | ....... | 62-289179 |
| November 16, 1987 | [JP] | Japan | ....... | 62-289180--. |

COLUMN 1

Line 35, "data" should be deleted.
Line 36, "of," should read --of data,--.

COLUMN 3

Line 30, "block to" should read --block is to--.

COLUMN 4

Line 40, "close too much," should read --too close--.

UNITED STATES PATENT AND TRADEMARK OFFICE
CERTIFICATE OF CORRECTION

PATENT NO. : 5,337,406
DATED : August 9, 1994
INVENTOR(S) : HIROSHI TAKAKURA, ET AL.

It is certified that error appears in the above-indentified patent and that said Letters Patent is hereby corrected as shown below:

COLUMN 10

Line 14, "the-basis" should read --the basis--.
    Line 30, "con," should be deleted.
    Line 31, "hand" should read --command--.
    Line 36, "con," should be deleted.
    Line 37, "hand" should read --command--.
    Line 41, "con, hand" should read --command--.

COLUMN 12

Line 3, "frame. When" should read --frame when--.

COLUMN 13

Line 22, "con, hand" should read --command--.
    Line 55, "con, hand" should read --command--.
    Line 59, "con," should read --command--.
    Line 60, "hand" should be deleted.

COLUMN 15

Line 21, "con, hand" should read --command--.
    Line 23, "con, hand" (both occurrences) should read --command--.
    Line 25, "con, hand" should read --command--.
    Line 27, "con, hand" should read --command--.
    Line 67, "con, hand" should read --command--.

UNITED STATES PATENT AND TRADEMARK OFFICE
CERTIFICATE OF CORRECTION

PATENT NO. : 5,337,406
DATED : August 9, 1994
INVENTOR(S) : HIROSHI TAKAKURA, ET AL.

It is certified that error appears in the above-indentified patent and that said Letters Patent is hereby corrected as shown below:

COLUMN 16

Line 17, "con, hand" should read --command--.

COLUMN 20

Line 42, "back-ground" should read --background--.

COLUMN 23

Line 38, "screen 1-3" should read --screen 11-3--.

COLUMN 26

Line 6, "creed" should read --crammed--.
    Line 66, "con, non" should read --common--.

COLUMN 28

Line 13, free," should read --frame,--.

COLUMN 29

Line 8, "KBD 108," should read --KBD 1-8,--.
    Line 14, "KBD 108," should read --KBD 1-8,--, and "PD 107" should read --PD 1-7--.
    Line 17, "KBD 108," should read --KBD 1-8,--.

COLUMN 36

Line 40, "to" should be deleted.

UNITED STATES PATENT AND TRADEMARK OFFICE
CERTIFICATE OF CORRECTION

PATENT NO. : 5,337,406
DATED : August 9, 1994
INVENTOR(S) : HIROSHI TAKAKURA, ET AL.

It is certified that error appears in the above-indentified patent and that said Letters Patent is hereby corrected as shown below:

COLUMN 39

Line 2, "claim 32" should read --claim 32,--.
    Line 16, "claim 34" should read --claim 34,--.
    Line 18, "date" should read --data--.
    Line 20, "claim 34" should read --claim 34,--.
    Line 35, "claim 37" should read --claim 37,--.
    Line 39, "claim 37" should read --claim 37,--.
    Line 42, "claim 37" should read --claim 37,--.
    Line 49, delete line in its entirety.
    Line 65, "claim 41" should read --claim 41,--.

COLUMN 40

Line 25, "claim 45" should read --claim 45,--.
    Line 29, "claim 45" should read --claim 45,--.
    Line 48, "claim 48" should read --claim 48,--.

COLUMN 41

Line 2, "claim 50" should read --claim 50,--.
    Line 12, "claim 50" should read --claim 50,--.
    Line 27, "claim 54" should read --claim 54,--.

UNITED STATES PATENT AND TRADEMARK OFFICE
CERTIFICATE OF CORRECTION

PATENT NO. : 5,337,406
DATED : August 9, 1994
INVENTOR(S) : HIROSHI TAKAKURA, ET AL.

It is certified that error appears in the above-indentified patent and that said Letters Patent is hereby corrected as shown below:

<u>COLUMN 42</u>

```
Line  4, "claim 56" should read --claim 56,--.
Line  8, "claim 57" should read --claim 57,--.
Line 12, "claim 57" should read --claim 57,--.
Line 35, "claim 60" should read --claim 60,--.
Line 39, "claim 60" should read --claim 60,--.
```

Signed and Sealed this

Thirty-first Day of January, 1995

Attest:

BRUCE LEHMAN

*Attesting Officer*   *Commissioner of Patents and Trademarks*